US012280587B2

(12) United States Patent
Baran et al.

(10) Patent No.: US 12,280,587 B2
(45) **Date of Patent: *Apr. 22, 2025**

(54) MANUFACTURING LIGHT FIELD PRINTS

(71) Applicant: Fathom Optics Inc., Somerville, MA (US)

(72) Inventors: Thomas Anthony Baran, Somerville, MA (US); Matthew Waggener Hirsch, Somerville, MA (US)

(73) Assignee: Fathom Optics Inc., Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,134

(22) Filed: Jan. 6, 2023

(65) Prior Publication Data

US 2023/0405988 A1 Dec. 21, 2023

Related U.S. Application Data

(63) Continuation of application No. 17/315,101, filed on May 7, 2021, now Pat. No. 11,577,504, which is a (Continued)

(51) Int. Cl.
*B41F 33/16* (2006.01)
*B41F 5/24* (2006.01)
*B41M 3/14* (2006.01)

(52) U.S. Cl.
CPC ................ *B41F 33/16* (2013.01); *B41F 5/24* (2013.01); *B41M 3/144* (2013.01)

(58) Field of Classification Search
CPC . B41F 5/24; B41F 33/16; B41M 3/14; B41M 3/148; B41M 3/144
See application file for complete search history.

(56) References Cited

U.S. PATENT DOCUMENTS 5,004,669 A 4/1991 Yamada et al.
5,051,327 A 9/1991 Osawa et al.
(Continued)

FOREIGN PATENT DOCUMENTS

CN 105259664 A 1/2016
CN 106494077 A 3/2017
(Continued)

OTHER PUBLICATIONS

U.S. Appl. No. 18/132,615, filed Apr. 10, 2023, Baran et al.
(Continued)

*Primary Examiner* — David H Banh
(74) *Attorney, Agent, or Firm* — Wolf, Greenfield & Sacks, P.C.

(57) ABSTRACT

Techniques for manufacturing a light field print using a printing press. The techniques include: identifying at least one characteristic of the printing press at least in part by printing at least one calibration pattern; obtaining content to be rendered using the light field print, the content comprising multiple scene views; generating, based at least in part on the content and the at least one characteristic of the printing press, a front target pattern and a back target pattern; and using the printing press to: print the front target pattern on a first side of a substrate; and print the back target pattern on a second side of the substrate.

20 Claims, 45 Drawing Sheets

Related U.S. Application Data continuation of application No. 16/059,950, filed on Aug. 9, 2018, now Pat. No. 11,007,772.

(60) Provisional application No. 62/543,368, filed on Aug. 9, 2017.

(56) References Cited

U.S. PATENT DOCUMENTS

| | | | | |
|---|---|---|---|---|
| 5,206,707 | A | 4/1993 | Ott | |
| 5,503,952 | A | 4/1996 | Suzuki et al. | |
| 5,598,058 | A | 1/1997 | LaPointe | |
| 5,663,312 | A | 9/1997 | Chaturvedula | |
| 5,821,028 | A | 10/1998 | Maejima et al. | |
| 6,549,308 | B1 | 4/2003 | Camahort | |
| 6,906,762 | B1 | 6/2005 | Witehira et al. | |
| 7,342,721 | B2 | 3/2008 | Lukyanitsa | |
| 7,742,215 | B2 | 6/2010 | Hagood, IV | |
| 8,651,678 | B2 | 2/2014 | Lanman et al. | |
| 8,848,006 | B2 | 9/2014 | Wetzstein et al. | |
| 8,865,374 | B2 | 10/2014 | Sarnataro | |
| 10,070,118 | B2 | 9/2018 | Baran et al. | |
| 10,645,375 | B2 | 5/2020 | Baran et al. | |
| 10,999,572 | B2 | 5/2021 | Baran et al. | |
| 11,007,772 | B2 | 5/2021 | Baran et al. | |
| 11,577,504 | B2 * | 2/2023 | Baran | B41F 5/24 |
| 11,652,980 | B2 | 5/2023 | Baran et al. | |
| 2002/0163482 | A1 | 11/2002 | Sullivan | |
| 2005/0030329 | A1 | 2/2005 | Sanger | |
| 2006/0256385 | A1 | 11/2006 | Takebe et al. | |
| 2006/0274066 | A1 | 12/2006 | Ying et al. | |
| 2007/0146389 | A1 | 6/2007 | Distler | |
| 2007/0177006 | A1 | 8/2007 | De Zwart et al. | |
| 2008/0309756 | A1 | 12/2008 | Verburgh et al. | |
| 2009/0003515 | A1 | 1/2009 | Naidu et al. | |
| 2010/0079676 | A1 | 4/2010 | Kritt et al. | |
| 2010/0086285 | A1 | 4/2010 | Sasaki et al. | |
| 2011/0019056 | A1 | 1/2011 | Hirsch et al. | |
| 2011/0236105 | A1 | 9/2011 | Noguchi et al. | |
| 2011/0267558 | A1 | 11/2011 | Hsu et al. | |
| 2011/0299761 | A1 * | 12/2011 | Myokan | G06T 7/85 382/154 |
| 2011/0304865 | A1 * | 12/2011 | Ariga | H04N 1/4095 358/1.9 |
| 2012/0009525 | A1 | 1/2012 | Clube et al. | |
| 2012/0038957 | A1 * | 2/2012 | Umezawa | H04N 1/6033 358/504 |
| 2012/0092634 | A1 | 4/2012 | Solak et al. | |
| 2012/0099029 | A1 | 4/2012 | Nejat et al. | |
| 2012/0140131 | A1 | 6/2012 | Lanman et al. | |
| 2012/0162298 | A1 | 6/2012 | Rozenstein et al. | |
| 2012/0293411 | A1 | 11/2012 | Leithinger et al. | |
| 2012/0300041 | A1 | 11/2012 | Hamashima | |
| 2013/0003090 | A1 * | 1/2013 | Sato | H04N 1/60 358/1.9 |
| 2013/0015778 | A1 | 1/2013 | Li et al. | |
| 2013/0095418 | A1 | 4/2013 | Solak | |
| 2013/0169677 | A1 | 7/2013 | Rosset et al. | |
| 2013/0169896 | A1 | 7/2013 | Iwahashi et al. | |
| 2013/0235434 | A1 | 9/2013 | Akiyama et al. | |
| 2013/0335463 | A1 | 12/2013 | Chiang et al. | |
| 2014/0092229 | A1 | 4/2014 | Ludwig | |
| 2014/0098423 | A1 | 4/2014 | Uchimoto et al. | |
| 2014/0146223 | A1 | 5/2014 | Eromaki et al. | |
| 2014/0146388 | A1 | 5/2014 | Kautz et al. | |
| 2014/0211451 | A1 | 7/2014 | Wang | |
| 2014/0300869 | A1 | 10/2014 | Hirsch et al. | |
| 2015/0234190 | A1 | 8/2015 | Schowengerdt | |
| 2015/0248046 | A1 | 9/2015 | Schowengerdt | |
| 2015/0294143 | A1 | 10/2015 | Wells et al. | |
| 2016/0042501 | A1 | 2/2016 | Huang et al. | |
| 2017/0054966 | A1 | 2/2017 | Zhou et al. | |
| 2017/0085867 | A1 * | 3/2017 | Baran | H04N 13/302 |
| 2017/0272737 | A1 | 9/2017 | Jacobs et al. | |
| 2017/0300722 | A1 | 10/2017 | Foerster et al. | |
| 2019/0054734 | A1 | 2/2019 | Baran et al. | |
| 2019/0098290 | A1 | 3/2019 | Baran et al. | |
| 2020/0244948 | A1 | 7/2020 | Baran et al. | |
| 2021/0258562 | A1 | 8/2021 | Baran et al. | |
| 2021/0370666 | A1 | 12/2021 | Baran et al. | |

FOREIGN PATENT DOCUMENTS

| | | | |
|---|---|---|---|
| JP | S59-124550 | A | 7/1984 |
| JP | S62-234935 | A | 10/1987 |
| JP | H11-511702 | A | 10/1999 |
| JP | H11-327065 | A | 11/1999 |
| JP | 2002-137530 | A | 5/2002 |
| JP | 2003-101778 | A | 4/2003 |
| JP | 2007-098726 | A | 4/2007 |
| JP | 2011-230413 | A | 11/2011 |
| JP | 2012-003121 | A | 1/2012 |
| JP | 2013-010339 | A | 1/2013 |
| KR | 10-2014-0067156 | A | 6/2014 |
| WO | WO 96/23663 | A1 | 8/1996 |
| WO | WO 2010/101601 | A1 | 9/2010 |
| WO | WO 2015/100301 | A1 | 7/2015 |

OTHER PUBLICATIONS

PCT/US2016/052166, Feb. 2, 2017, International Search Report and Written Opinion.

PCT/US2016/052166, Mar. 29, 2018, International Preliminary Report on Patentability.

PCT/US18/46107, Oct. 25, 2018, International Search Report and Written Opinion.

EP 16847403.9, Apr. 24, 2019, Extended European Search Report.

EP 18843258.7, Apr. 26, 2021, Extended European Search Report.

EP 16847403.9, Aug. 3, 2021, Communication pursuant to Article 94(3) EPC.

International Search Report and Written Opinion for International Application No. PCT/US2016/052166 dated Feb. 2, 2017.

International Preliminary Report on Patentability for International Application No. PCT/US2016/052166 dated Mar. 29, 2018.

International Search Report and Written Opinion for International Application No. PCT/US18/46107 dated Oct. 25, 2018.

Extended European Search Report for European Application No. 16847403.9 dated Apr. 24, 2019.

Extended European Search Report for European Application No. 18843258.7 dated Apr. 26, 2021.

Communication pursuant to Article 94(3) EPC dated Aug. 3, 2021 in connection with European Application No. 16847403.9.

Cusdin, Flexography: Principles & Practices. 1999. 5th edition. vol. 1. 940 pages.

Dey et al., Digital Pre-Compensation for Faulty D/A Converters: the "Missing Pixel" Problem. Proceedings, 2003 ICASSP. 4 pages.

Hirsch et al., Lumii: DIY Light Field Prints. ACM Siggraph 2016 Studio. Jul. 2016 ACT. 3 pages.

Ives, A Novel Stereogram. Journal of the Franklin Institute 153: 51-52. 1902.

Lanman et al., Content-Adaptive Parallax Barriers: Optimizing Dual-Layer 3D Displays Using Low-Rank Light Field Factorization. ACM Transactions on Graphics (TOG) 29.6 (2010): 163.

Liao et al., Perceptually Optimized Dual-layer Light Filed 3D Display Using a Moire-aware Compressive Factorization. SID 2016 Digest, 2016. 235-8.

Oppenheim et al., Discrete-Time Signal Processing, Third Edition. Upper Saddle River, NJ: Prentice-Hall, Inc., 2010. 4 pages.

Wetzstein et al., Layered 3D: Tomographic Image Synthesis for Attenuation-based Light Field and High Dynamic Range Displays. In ACM Transactions on Graphics (ToG), vol. 30, No. 4, p. 95. ACM, 2011.

Wetzstein et al., Tensor Displays: Compressive Light Field Synthesis using Multilayer Displays with Directional Backlighting. ACM Trans. Graph. 31.4 (2012): 80. 11 pages.

Wetzstein, Synthetic Light Field Archive. http://web.media.mit.edu/~gordonw/SyntheticLightFields/ Accessed Aug. 12, 2015. 7 pages.

(56) References Cited

OTHER PUBLICATIONS

Zwicker et al., Antialiasing for Automultiscopic 3D Displays. Rendering Techniques 2006: 17th Eurographics Workshop on Rendering, Jun. 2006, pp. 73-82.

* cited by examiner

600

$$\underset{\underline{x}_1,\ldots,\underline{x}_M}{\text{minimize}} \quad g(\underline{e}_1,\ldots,\underline{e}_N)$$

$$\text{subject to} \quad \underline{e}_1 = f_1(\underline{x}_1,\ldots,\underline{x}_M)$$

$$\vdots$$

$$\underline{e}_N = f_N(\underline{x}_1,\ldots,\underline{x}_M)$$

$$\ell_1 \leq \underline{x}_1 \leq u_1$$

$$\vdots$$

$$\ell_M \leq \underline{x}_M \leq u_M$$

FIG. 6

900

$$\begin{aligned} \underset{\underline{x}_1, \ldots, \underline{x}_M}{\text{minimize}} \quad & g(\underline{e}_1, \ldots, \underline{e}_N) + p_1(\underline{x}_1) + \cdots + p_M(\underline{x}_M) \\ \text{subject to} \quad & \underline{e}_1 = f_1(\underline{x}_1, \ldots, \underline{x}_M) \\ & \vdots \\ & \underline{e}_N = f_N(\underline{x}_1, \ldots, \underline{x}_M) \end{aligned}$$

FIG. 9

1100

$$\begin{aligned}
\underset{\underline{x}_j}{\text{minimize}} \quad & g(\underline{e}_1, \ldots, \underline{e}_N) \\
\text{subject to} \quad & \underline{e}_1 = f_{j,1}(\ldots, \underline{x}_j, \ldots) \\
& \quad \vdots \\
& \underline{e}_N = f_{j,N}(\ldots, \underline{x}_j, \ldots) \\
& \ell_j \leq \underline{x}_j \leq u_j
\end{aligned}$$

FIG. 11

MANUFACTURING LIGHT FIELD PRINTS

CROSS REFERENCE TO RELATED APPLICATIONS

This application claims priority under 35 U.S.C. § 120 and is a continuation of U.S. application Ser. No. 17/315,101, filed May 7, 2021, titled "MANUFACTURING LIGHT FIELD PRINTS," which claims priority under 35 U.S.C. § 120 and is a continuation of U.S. application Ser. No. 16/059,950, filed Aug. 9, 2018, titled "MANUFACTURING LIGHT FIELD PRINTS," which claims the benefit under 35 U.S.C. § 119 of U.S. Provisional Patent Application No. 62/543,368, filed on Aug. 9, 2017, titled "On the Design and Manufacturing of Printed and Digital Multi-Layer Displays," which is hereby incorporated by reference in its entirety.

BACKGROUND

There are a number of techniques for producing printed documents with 3D effects. For example, holographic foils have been in widespread use for verifying the authenticity of high value documents and goods. When a hologram is desired on printed material, a heat or pressure activated adhesive is used to combine printed material with a holographic foil. Alternatively, holographic effects may be achieved by using specialised machinery to transfer diffractive fringes to a special radiation curable ink. Outside of holography, 3D effects may be produced using lenticular printing, which relies on patterning a paper or film and coupling it with a one- or two-axis lens array.

SUMMARY

Some embodiments provide for a method of manufacturing a light field print using a printing press. The method comprises: identifying at least one characteristic of the printing press at least in part by printing at least one calibration pattern; obtaining content to be rendered using the light field print, the content comprising a plurality of scene views; generating, based at least in part on the content and the at least one characteristic of the printing press, a front target pattern and a back target pattern; and using the printing press to: print the front target pattern on a first side of a substrate; and print the back target pattern on a second side of the substrate.

Some embodiments provide for a method of manufacturing a light field print using a printing press. The method comprises: identifying at least one characteristic of the printing press at least in part by printing at least one calibration pattern; obtaining content to be rendered using the light field print, the content comprising a plurality of scene views; generating, based at least in part on the content and the at least one characteristic of the printing press, a front target pattern and a back target pattern; and using the printing press to: print the front target pattern on a side of a first substrate; and print the back target pattern on a side of a second substrate. In some embodiments the first and second substrate may be the same substrate, such that the front target pattern and the back target pattern are printed on different sides of the same substrate. In some embodiments, the first and second substrate are different substrates.

Some embodiments provide for a method of manufacturing a light field print using a printing press. The method comprises: obtaining (e.g., accessing) information specifying at least one characteristic of the printing press, the information obtained at least in part by printing at least one calibration pattern using the printing press; obtaining content to be rendered using the light field print, the content comprising a plurality of scene views; generating, based at least in part on the content and the at least one characteristic of the printing press, a front target pattern and a back target pattern; and causing the printing press to: print the front target pattern on a side of a first substrate; and print the back target pattern on a side of a second substrate. In some embodiments, the causing includes sending the front target pattern and the back target pattern to the printing press. In some embodiments, the causing may further include sending a command to the printing press to print the front target pattern and the back target pattern.

Some embodiments provide for a system comprising at least one computer hardware processor; and at least one non-transitory computer-readable storage medium storing processor executable instructions that, when executed by the at least one computer hardware processor, causes the at least one computer hardware processor to perform: obtaining information specifying at least one characteristic of the printing press, the information obtained at least in part by printing at least one calibration pattern using the printing press; obtaining content to be rendered using the light field print, the content comprising a plurality of scene views; generating, based at least in part on the content and the at least one characteristic of the printing press, a front target pattern and a back target pattern; and causing the printing press to: print the front target pattern on a side of a first substrate; and print the back target pattern on a side of a second substrate. In some embodiments, the system includes the printing press.

Some embodiments provide for at least one non-transitory computer-readable storage medium storing processor executable instructions that, when executed by the at least one computer hardware processor, causes the at least one computer hardware processor to perform: obtaining information specifying at least one characteristic of the printing press, the information obtained at least in part by printing at least one calibration pattern using the printing press; obtaining content to be rendered using the light field print, the content comprising a plurality of scene views; generating, based at least in part on the content and the at least one characteristic of the printing press, a front target pattern and a back target pattern; and causing the printing press to: print the front target pattern on a side of a first substrate; and print the back target pattern on a side of a second substrate.

In some embodiments, identifying at least one characteristic of the printing press comprises printing the at least one calibration pattern using the printing press.

In some embodiments, identifying the at least one characteristic of the printing press at least in part by printing the at least one calibration pattern comprises identifying at least one characteristic selected from the group consisting of: achievable registration tolerance in at least one direction along the substrate, a degree of alignment of the printing press, minimum line width in at least one direction along the substrate, spectral attenuation of the substrate without ink thereon, spectral attenuation of an ink on the substrate, spectral attenuation of a combination of inks on the substrate, and dot gain.

In some embodiments, identifying the at least one characteristic of the printing press includes identifying at least one characteristic selected from the group consisting of: resolution of the printing press, resolution of platesetter associated with the printing press, thickness of the substrate, index of refraction for the substrate, and flexographic distortion factor for the printing press. In some embodiments, one or more such characteristics may be identified without printing a calibration pattern.

In some embodiments, identifying at least one characteristic of the printing press comprises: identifying one or more values indicative of a dot gain for at least one color channel of the printing press using a printed version of the at least one calibration pattern.

In some embodiments, the at least one calibration pattern includes a set of oriented line sweeps for each of multiple different color channels of the printing press; and the identifying comprises identifying a dot gain for each of the color channels or printing stations of the printing press using the printed version of the set of oriented line sweeps that was printed by the printing press.

In some embodiments, the at least one calibration pattern includes a first set of oriented line sweeps for a first color channel of the printing press, wherein the first set of oriented line sweeps includes a first patch of lines with a first spacing and a second patch of lines with a second spacing different from the first spacing.

In some embodiments, the at least one calibration pattern includes a second set of oriented line sweeps for a second color channel of the printing press, wherein the second set of oriented line sweeps includes a third patch of lines with the first spacing and a fourth patch of lines with the second spacing. In some embodiments, the first set of oriented line sweeps includes at least one patch of lines oriented along a web direction and at least one patch of lines oriented across the web direction.

In some embodiments, identifying the at least one characteristic of the printing press comprises: identifying a degree of alignment of the printing press using a printed version of the at least one calibration pattern that was printed by the printing press. In some embodiments, the at least one calibration pattern includes at least one alignment mark designed to indicate front-back misalignment of the printing press. Some embodiments further include aligning the printing press using the identified degree of alignment of the printing press.

In some embodiments, the printing press is a flexographic printing press, and identifying the at least one characteristic of the printing press comprises identifying a flexo distortion factor for the printing press, and generating the front and back target pattern is performed further based on the identified flexo distortion factor.

Some embodiments further include obtaining information specifying at least one blurring transformation. In some embodiments, generating the front target pattern and the back target pattern is performed further based on the information specifying the at least one blurring transformation.

In some embodiments, generating the front target pattern and the back target pattern includes: obtaining a plurality of display views corresponding to the plurality of scene views; and applying the at least one blurring transformation to at least one of the plurality of display views and a corresponding at least one of the plurality of scene views.

In some embodiments, generating the front target pattern and the back target pattern includes: generating initial front and back patterns; and iteratively updating at least one of the initial front and back patterns to obtain the front and back patterns.

In some embodiments, the iteratively updating comprises: updating the initial front and back patterns to obtain updated front and back patterns based, at least in part, on the plurality of scene views and the information specifying the at least one blurring transformation.

In some embodiments, updating the initial front and back patterns comprises: determining, using the at least one characteristic of the printing press and the initial front and back patterns, a first set of display views corresponding to display views that would be generated if the initial front and back patterns were printed using the printing press; determining, using the at least one blurring transformation, a measure of error between the first set of display views and the plurality of scene views; and updating the initial front and back patterns based on the measure of error between the first set of display views and the plurality of scene views.

In some embodiments, updating the initial front and back patterns based on the measure of error between the first set of display views and the plurality of scene views comprises: multiplicatively updating the initial front and back target patterns subject to non-negativity constraints on the front and back patterns.

In some embodiments, obtaining content including a plurality of scene views comprises obtaining a set of scene views corresponding to a respective set of positions of a viewer of the light field print.

In some embodiments, generating the front and back target patterns comprises: generating initial front and back target patterns using the plurality of scene views; and obtaining the front and back target patterns at least in part by modifying the initial front and back target patterns using the identified at least one characteristic to compensate for effects of dot gain. In some embodiments, compensating the initial front pattern for effects of dot gain comprises applying spatial linear filtering to the initial front pattern.

In some embodiments, using the printing press to print the front and back target patterns comprises sending the front and back target patterns to the printing press using 1-bit TIFF format.

In some embodiments, the printing press is an analog printing press. In some embodiments, the printing press is a flexographic printing press or an offset printing press. In some embodiments, the printing press is a SIMULTAN press or any other suitable press in which both sides of a substrate are printed on during the same pass through the press.

In some embodiments, the printing press is a digital printing press.

In some embodiments, the printing press is configured to print the front and back patterns using an energy-curable ink.

In some embodiments, the printing press is a dual-sided press with a reversing station. In some embodiments, the substrate is at least partially (e.g., fully) transparent.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale.

FIG. 6 shows an example optimization problem that may be solved as part of generating target patterns for a light field print, in accordance with some embodiments of the technology described herein.

FIG. 9 shows another example of an optimization problem that may be solved as part of generating target patterns for a light field print, in accordance with some embodiments of the technology described herein.

FIG. 11 shows another example of an optimization problem that may be solved as part of generating target patterns for a light field print, in accordance with some embodiments of the technology described herein.

DETAILED DESCRIPTION

Figure 1:
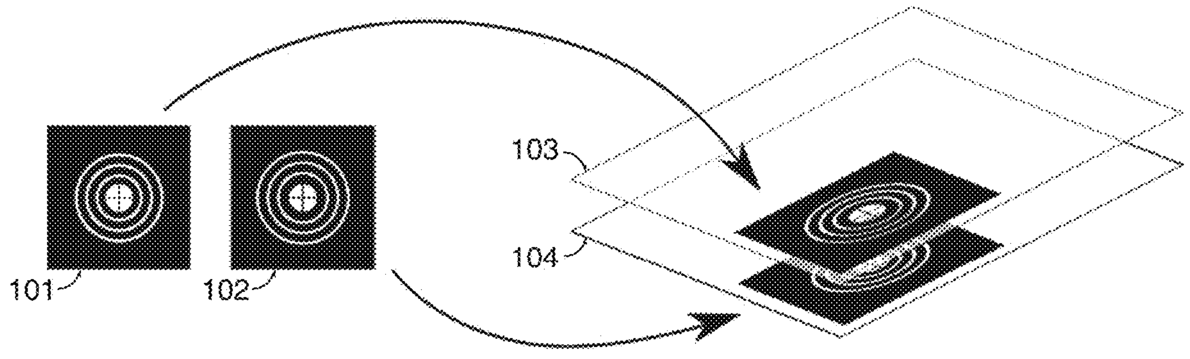
FIG. 1 illustrates front and back patterns for an alignment mark, in accordance with some embodiments of the technology described herein.

The inventors have developed techniques of manufacturing light field prints using printing presses for presenting 3D information to viewers of the light field prints. The manufactured light field prints may be used in document security, brand protection, and other applications. The techniques involve manufacturing light field prints by printing multiple specialized computed patterns on a substrate (e.g., at least a partially transparent film). In some embodiments, the computed patterns may be printed on the front and back side of the same substrate using a printing press. In other embodiments, the computed patterns may be printed on multiple different substrates, which may be stacked (e.g., laminated, layered, adhered, etc.). The printed patterns together serve to modify the color and intensity of light rays traveling in different directions from the surface of the substrate, which in turn creates a visual illusion of depth that extends beyond the physical thickness of the printed substrate itself. The printed patterns may also produce other visual effects that vary as a function of view angle. In this way, the printed patterns are functionally related to the substrate on which they are printed—the substrate produces a desired light field image, when viewed, as a result of the target patterns printed thereon.

The inventors have recognized that the process of manufacturing printed patterns intended for light field rendition is more demanding than that of creating printed patterns for conventional 2D printing. In light field printing, for example, features well below the visual acuity of the human eye may create effects that alter the visible performance of the resulting light field print. For example, generating computed patterns based only on the content they should render when printed, and printing such patterns using a printing press results in low-quality light field prints, which may even fail to create a visual illusion of depth altogether. To address these challenges, the inventors have developed techniques for producing high-quality light field prints using various types of printing presses with standard media. As described in detail herein, to produce a high-quality light field print using a printing press, in some embodiments, one or more characteristics of the printing press are measured (e.g., using one or more calibration sheets or in any other suitable way) and these measured characteristics are taken into account when generating the patterns that are printed to form the light field prints.

The techniques developed by the inventors enable using printing presses to achieve high-volume printing of light field prints. High-volume production lowers the cost of producing individual light field prints, which in turn makes light field prints an economically feasible (and otherwise improved) alternative to conventional techniques for security printing and brand protection, which are described below.

Conventional techniques for security printing and brand protection involve using holographic foils. As discussed above, when a hologram is desired on printed material, a heat or pressure activated adhesive is used to combine printed material with the holographic foil. This has several negative consequences for manufacturing printed goods with holographic images. One consequence is that two separate material streams must be combined, requiring a dedicated stage in a printing press for applying the foils. Another consequence is that the print producer must bear the costs, supply chain complexities, and uncertainties of stocking a material good from a holographic foil vendor. Aside from the expense of holographic foils, the techniques for creating the holographic foils are widely known and counterfeited for high-value products and documents. By contrast, the techniques for generating light field prints described herein may be used to generated light field prints, which are not easy to counterfeit and which may be generated at a substantially lower cost than holographic foils.

Another conventional technique for creating holographic effects on a print involves using specialized machinery to transfer diffractive fringes to a special radiation curable ink. However, such techniques do not confer a strong security advantage, since they generate prints with insufficient resolution to create a specific recognizable image. Instead, a generic rainbow effect is created. By contrast, the techniques for manufacturing light field prints described herein do not require any special ink or roller to imprint holographic fringes, and are capable of producing unique non-rainbow features that are visible under white light and area sources.

Aside from holography, 3D effects may be created using lenticular printing, which involves patterning a paper or film and coupling it with a one- or two-axis lens array. Lenticular printing has not seen widespread adoption in packaging because it requires thick plastic lenses, and careful calibration of the lens manufacturing process, such as extrusion, with the printing process to couple the lens perfectly with the printed backing. For these reasons, it is considered too expensive or impractical for most packaging applications. In addition, it is relatively easy to produce lenticular prints in small quantities with consumer hardware making lenticular printing undesirable for use in document security.

UV curable inks can be used to print directly on the back of a lenticular lens sheet. However, this process suffers the same thickness, cost, and alignment challenges as does coupling a printed backing to the lens sheet. Another conventional technique is micro-lenticular printing, which has the potential of reducing the cost manufacturing lenticular prints. Micro-lenticular printing can be used to print very small lenses, using a clear UV-curable-polymer-based ink and specialized press equipment. The microlenses are typically printed on top of printed patterns. However, the small size of the lenses relative to a printable dot places sampling constraints on the reproduced images, generally limiting the output to repeated patterns with a small virtual depth, or simple geometric shapes The techniques developed by the inventors for manufacturing light field prints using high-volume digital and analog printing presses directly addresses the above-described problems of expense and security plaguing conventional techniques. Expense is greatly reduced by eliminating a physical good (e.g., the holographic foil, lens sheet) from the print production line, and the associated steps in production, such as storing, spooling, stamping, and disposing of waste. Security is enhanced by creating more readily noticeable effects, integrating the light field print into larger areas of the document, printing the security features directly onto the document, and by enabling economical use of patterns on a wider variety of printed documents.

Accordingly some embodiments provide for a method of manufacturing light field prints on a substrate using a printing press. The method includes: (1) identifying at least one characteristic of the printing press at least in part by printing at least one calibration pattern (e.g., by using the printing press or another press similar to the printing press); (2) obtaining content to be rendered using the light field print, the content comprising a plurality of scene views (e.g., corresponding to a respective set of positions of a viewer of the light field print); (3) generating, based at least in part on the content and the at least one characteristic of the printing press, a front target pattern and a back target pattern; and (4) using the printing press to: print the front target pattern on a first side of a substrate; and print the back target pattern on a second side of the substrate. In some embodiments, the substrate may be at least partially (e.g., fully) transparent.

In some embodiments, one or more calibration patterns may be printed by a printing press and the resulting printed calibration patterns may be used to identify one or more printing press characteristics including, but not limited to, achievable registration tolerance in at least one direction along the substrate (e.g., along two orthogonal directions along the substrate such as, for example, the direction of movement of the substrate in the printing press and the direction orthogonal to the direction of movement of the substrate), a degree of alignment of the printing press, minimum line width in at least one direction along the substrate (e.g., along two orthogonal directions along the substrate), spectral attenuation of the substrate without any ink thereon, spectral attenuation of an ink on the substrate, spectral attenuation of a combination of inks on the substrate (e.g., the combination resulting from printing two different color inks on top of one other on the same side of the substrate, printing one ink on one side of a substrate and printing another in on the other side of the substrate at the same location), and dot gain for each of one or more channels of the printing press.

It should be appreciated that although, in some embodiments, one or more characteristics of the printing press may be obtained by printing calibration patterns, in other embodiments, one or more characteristics of the printing press may be obtained without using calibration patterns. For example, some characteristics of the printing press may be obtained from documentation (e.g., a manual, a press specification, etc.) or an operator of the printing press. Non-limiting examples of such characteristics include: resolution of the printing press, resolution of the plate setter associated with the printing press, thickness of the substrate used by the printing press to print, index of refraction for the substrate, and the flexo distortion factor (sometimes termed the "dispro" factor) for the printing press. In some embodiments, the values of one or more characteristics (e.g., substrate index of refraction, flexo distortion factor, substrate thickness, etc.) obtained without using a calibration pattern may be verified by printing a calibration pattern.

Returning to the discussion of using calibration patterns to measure printing press characteristics, in some embodiments, identifying at least one characteristic of the printing press by printing at least one calibration pattern includes identifying one or more values indicative of a dot gain for at least one color channel of the printing press using a printed version of the at least one calibration pattern. In some embodiments, the at least one calibration pattern includes a set of oriented line sweeps for each of multiple different color channels of the printing press, and identifying at least one characteristic of the printing press includes identifying a dot gain for each of the color channels of the printing press using the printed version of the set of oriented line sweeps that was printed by the printing press.

In some embodiments, each set of oriented line sweeps may include multiple patches of lines for each of one or more (e.g., all) color channels of the printing press, with spacing among the lines changing between patches. For example, in some embodiments, the at least one calibration pattern includes a first set of oriented line sweeps for a first color channel of the printing press, and the first set of oriented line sweeps includes a first patch of lines with a first spacing and a second patch of lines with a second spacing different from the first spacing. The at least one calibration pattern may further include a second set of oriented line sweeps for a second color channel of the printing press, wherein the second set of oriented line sweeps includes a third patch of lines with the first spacing and a fourth patch of lines with the second spacing.

In some embodiments, the first set of oriented line sweeps includes at least one patch of lines oriented along a web direction and at least one patch of lines oriented across the web direction.

In some embodiments, calibration patterns may be used to determine a degree to which the printing press is aligned or misaligned. For example, printing calibration patterns may be used to determine front-to-back alignment of the printing press and/or alignment among different printing press stations. Proper printing press alignment is important for obtaining high-quality light field prints. For example, when front and back target patterns are properly aligned with one another, the target patterns may together modify the color and intensity of light rays traveling in different directions from the surface of the light print, which in turn creates a visual illusion of depth. On the other hand, when the front and back target patterns are not properly aligned with one another, they may fail to create a perceived depth. When each of the target patterns is printed using ink from multiple color channels, station-to-station alignment of the printing press is also important to achieve to within a specified tolerance.

Accordingly, in some embodiments, identifying at least one characteristic of the printing press by printing at least one calibration pattern includes identifying a degree of alignment of the printing press using a printed version of the at least one calibration pattern that was printed by the printing press. In some embodiments, the at least one calibration pattern includes at least one alignment mark designed to indicate front-back misalignment of the printing press when printed.

In some embodiments, the identified degree of alignment may be used to align the printing press, which may be done manually (e.g., by an operator of the printing press after looking at the printed alignment mark) or automatically (e.g., using a visual servo system configured to automatically control alignment of the printing press).

In some embodiments, the printing press may be a flexographic printing press and manufacturing a light field print using such a printing press may involve determining a flexo distortion factor for the printing press (e.g., from the specification of the printing press or by printing an appropriate calibration pattern), and generating the front and back target patterns based on the identified flexo distortion factor.

In some embodiments, generating the front and back target patterns may be performed based on information specifying at least one blurring transformation. For example, in some embodiments, the generating may include: obtaining a plurality of display views corresponding to the plurality of scene views in the content; and applying the at least one blurring transformation to at least one of the plurality of display views and a corresponding at least one of the plurality of scene views.

In some embodiments, the front and back target patterns may be generated iteratively. For example, the generating may include: generating initial front and back patterns; and iteratively updating one or both of the initial front and back patterns to obtain the front and back patterns. The iteratively updating may include updating the initial front and back patterns to obtain updated front and back patterns based, at least in part, on the plurality of scene views and the information specifying the at least one blurring transformation.

In some embodiments, updating the initial front and back patterns may include: (1) determining, using the at least one characteristic of the printing press and the initial front and back patterns, a first set of display views corresponding to display views that would be generated by a light field print formed using the initial front and back patterns if they were printed using the printing press; (2) determining, using the at least one blurring transformation, a measure of error between the first set of display views and the plurality of scene views; and (3) updating the initial front and back patterns based on the measure of error between the first set of display views and the plurality of scene views. In some embodiments, updating the initial front and back patterns based on the measure of error between the first set of display views and the plurality of scene views includes multiplicatively updating the initial front and back target patterns subject to non-negativity constraints on the front and back patterns.

In some embodiments, the identified one or more characteristics of the printing press may be used to generate the front and back target patterns. In some embodiments, one or more of the characteristics may be used to compute the front and back target patterns during each of one or more iterations during which the target patterns are computed. For example, the front and back target patterns may be computed using values for one or more of the following characteristics: achievable registration tolerance in at least one direction along the substrate, a degree of alignment of the printing press, minimum line width in at least one direction along the substrate, spectral attenuation of the substrate without ink thereon, spectral attenuation of an ink on the substrate, spectral attenuation of a combination of inks on the substrate, dot gain, resolution of the printing press, resolution of plate setter associated with the printing press, thickness of the substrate, index of refraction for the substrate, and the printing press flexo distortion factor.

In some embodiments, one or more of the characteristics may be used to post-process front and back patterns generated using the iterative process described herein in order to compensate the iteratively generated target patterns for various aspects of the printing press. For example, the front and back patterns may be compensated for the dot gain of the printing press across one or more color channels and/or the flexo distortion factor for the printing press.

Accordingly, in some embodiments, generating the front and back target patterns comprises: generating initial front and back target patterns using the plurality of scene views; and obtaining the front and back target patterns at least in part by modifying the initial front and back target patterns using the identified at least one characteristic to compensate for effects of dot gain. In some embodiments, compensating the initial front pattern for effects of dot gain comprises applying spatial linear filtering to the initial front pattern. Aspects of generating front and back target patterns are further described herein including with reference to FIGS. 5-16.

In some embodiments, using the printing press to print the front and back target patterns includes sending the front and back target patterns to the printing press using 1-bit TIFF format. In some embodiments, the front and back target patterns may be combined with content (e.g., artwork) in a different format, and the combination of the patterns with the content may be sent to the printing press as a PDF with device CMYK format.

It should be appreciated that the techniques described herein for printing light field prints on printing presses may be used for manufacturing light field prints using any of numerous types of printing presses. For example, in some embodiments, the printing press may be a digital press such as for example, a dry toner-based press, an inkjet-based press, or a liquid toner-based press. As another example, in some embodiments, the printing press may be an analog printing press such as, for example, a flexographic printing press or an offset printing press. In some embodiments, the printing press may be a SIMULTAN press or any other printing press in which both sides of a substrate are printed on during the same pass through the press.

In some embodiments, the printing press is a dual-sided press with a reversing station and/or a turn bar.

In some embodiments, the printing press is configured to print the front and back patterns using an energy-curable ink, for example, a polymer energy-curable ink.

It should be appreciated that the techniques introduced above and discussed in greater detail below may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

As may be appreciated from the foregoing, in some embodiments, the process of manufacturing a light field print generally involves the following four stages: (1) configuring a printing press; (2) characterizing aspects of the printing press; (3) generating target patterns; and (4) printing the generated target patterns on the printing press.

In some embodiments, during the first stage, the printing press may be calibrated to perform two-sided printing so that the front and back impressions are aligned with one another, and such that each color station of the printing press is aligned with the previous color station.

In some embodiments, during the second stage, one or more characteristics of the printing press, including the media and ink used by the printing press, may be identified so that they can used for generating target patterns used for printing light field prints. In some embodiments, the characteristics of the printing press may be determined by printing one or more specialized calibration patterns, as described herein. Characteristics of the press to be determined include, but are not limited to, dot gain, or ink spreading, front-back alignment tolerance, and optical absorption and spectra of the inks on the media. It should be noted that information about alignment of the printing press obtained using calibration patterns may be used to adjust alignment of the printing press, and as such the first and second stages are not necessarily performed independently of one another, in some embodiments.

In some embodiments, during the third stage, front and back target patterns are computed by solving a constrained optimization problem using the content to be rendered and the information obtained during the printing press characterization stage. Optimization techniques for computing target patterns are described herein including with reference to FIGS. 5-16. Aspects of optimization techniques for computing target patterns are described in U.S. Pat. Pub. No. 2017/0085867, published Mar. 23, 2017, titled "MULTI-VIEW DISPLAYS AND ASSOCIATED SYSTEMS AND METHODS", incorporated by reference herein in its entirety. The characteristics of the printing press, including that of the media and ink, may be physically modeled in the forward problem of the optimization such that the resulting patterns create the desired visual effect when reproduced by the printing press.

In some embodiments, during the fourth stage, the generated front and back target patterns are sent to the printing press to be imprinted on media. The printing press prints the front and back patterns on two sides of the same medium (e.g., a plastic film). In some embodiments, the target patterns are provided to the printing press "pre-screened" data (e.g., using 1-bit TIFF format) so that the target patterns are be printed dot-for-dot without additional screening, dithering, or resampling.

Printing Presses

In some embodiments, the techniques described herein for manufacturing light field prints may be used with analog printing presses. The most common analog printing press used in packaging applications is a flexographic ("flexo") printing press, which uses a flexible relief plate to imprint material, typically stored on a web or roll. Though it is possible to generate light field prints using sheet-fed flexo presses, a flexo press fed by a continuous web of plastic may be preferable, as it is easier to keep the web in tight register than a sheet.

Another type of analog printing press that may be used to manufacture light field prints, in some embodiments, is an offset printing press. Offset printing presses are found commonly in packaging and many higher-quality print disciplines, such as security printing. An offset printing plate is also a relief plate, but is not flexible unlike the relief plate of a flexo press. Offset press plates are generally capable of representing smaller features and printing them onto a substrate more reliably than a flexo press, though a great deal of variation exists among manufacturers and with the age and condition of a press. An offset press specifically designed for accurate front-back aligned printing known as a SIMULTAN press is well adapted to printing light field patterns, as it ensures tight front-back register.

The inventors have recognized that, in some embodiments in which an offset or flexo press is used to print the target patterns, energy curable inks (e.g., UV curable inks, electron beam curable inks, and/or energy curable polymer inks) should be used to print the patterns on the medium. Light field prints are generally printed using plastic substrates, and energy curable inks adhere to plastic substrates better than solvent-based inks, and maintain a smaller feature size, since less ink spreading occurs on the substrate.

As also discussed above, the techniques described herein for manufacturing light field prints may be used with digital printing presses. Indeed, digital printing platforms are rapidly displacing analog flexo or offset processes in many printing applications. There are a number of advantages and disadvantages to working with digital presses for manufacturing light field prints. The overhead cost of turning on a digital press is lower than most analog presses, meaning it is more appropriate for short-run print jobs. Importantly, it is possible to print variable data on documents created in a digital press. In the case of light field printing this means it is possible to create a unique light field pattern on each individual document created on a digital press, which is advantageous for security applications.

Press Configuration and Alignment

As discussed herein, the inventors have recognized that a printing press should be precisely aligned to manufacture light field prints. In particular, it is important to maintain register between printing stations of a printing press and between the front and back of media that the press is printing on. The inventors have developed an alignment mark that can be reproduced on a dual-side print to create an indicator that magnifies small misalignments between the layers. The alignment mark, when printed, provides an indicator that may be used to align the printing press to within specification. For example, the alignment mark may be generated by using two printed patterns on the same substrate, and the images resulting from the interaction between the two patterns may be used to guide an operator or automated machine to modify printing press settings until the two patterns are aligned.

In some embodiments, the printed alignment mark may be used to manually align a printing press. For example, the printed alignment mark may be viewed by an operator of the printing press who may manually adjust the printing press based on the misalignments magnified in the printed version of the alignment mark.

In some embodiments, the printed alignment mark may be used to automatically align a printing press. Press manufacturers have developed a variety of mechanisms for maintaining register between printing stations and between the front and back of media. Modern analog presses are servo controlled with each press station servoing to patterns printed at previous stations to keep register. The servos are controlled by an optical feedback system. Accordingly, in some embodiments, a computer vision system may be configured to process a printed alignment mark and to align multiple printing stations of a printing press by servoing to the printed alignment mark.

FIG. 1 illustrates an example alignment mark, which may be used to identify the presence of misalignment, in accordance with some embodiments of the technology described herein. As shown in FIG. 1, the alignment mark may be formed from a front pattern 101 and a back pattern 102, which patterns are printed on layers 103 and 104, respectively. In some embodiments, the layers 103 and 104 may be two separate layers, which subsequently may be coupled to form a light field print of the alignment mark. In some embodiments, the layers 103 and 104 may be two different sides of the same substrate such that the front pattern 101 and the back pattern 102 are printed on top and bottom sides of the same media.

Figure 3:
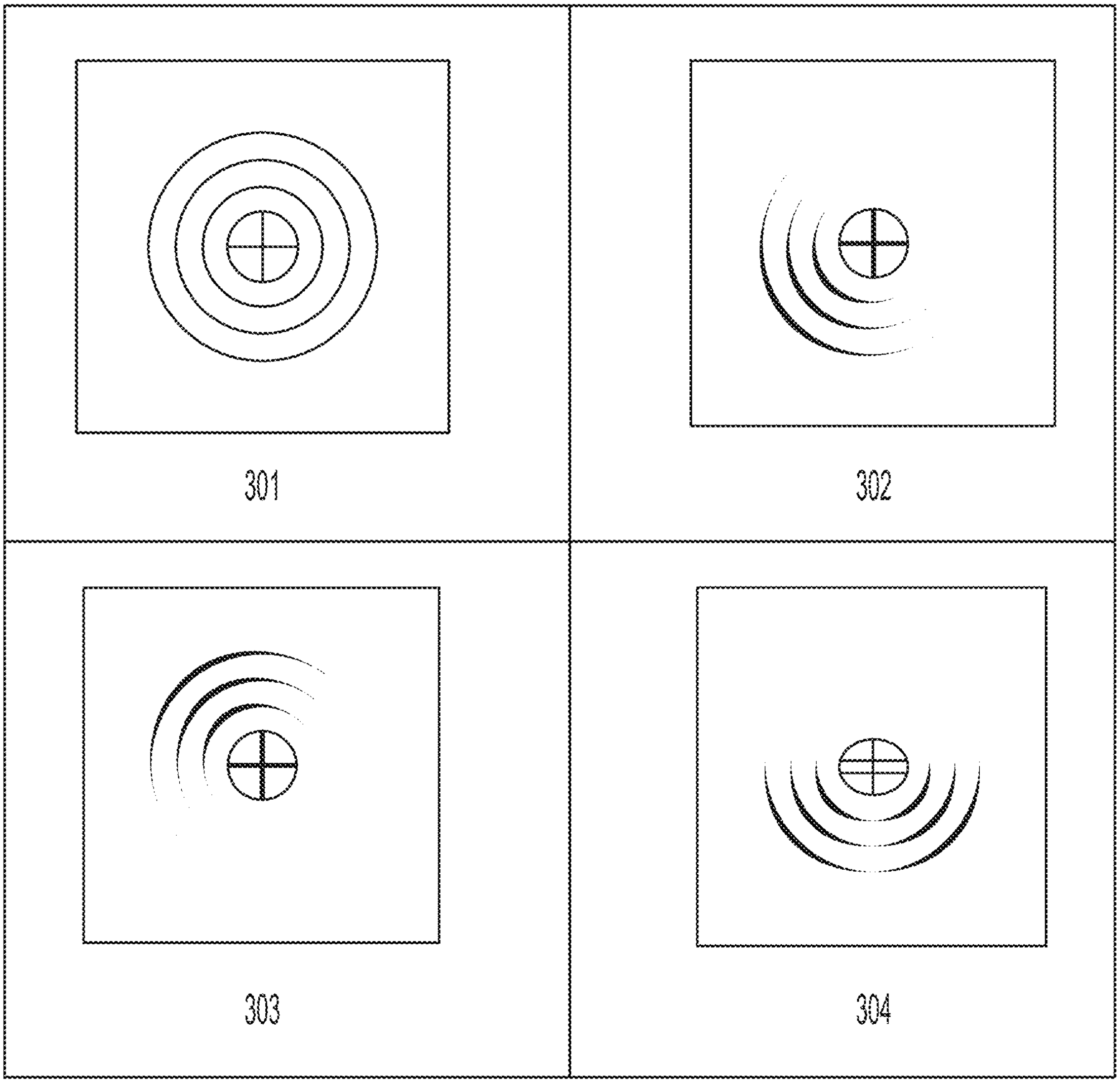
FIG. 3 illustrates an example of how the alignment mark of FIG. 1 may be used to produce the visual effects of alignment and misalignment, according with some embodiments of the technology described herein.

In some embodiments, the interactions between the printed patterns of the alignment mark generate easily-visible shapes that can be used to precisely diagnose and correct for any misalignment printing press. As shown in the alignment marks 301, 302, 303 and 304 shown in FIG. 3, the interaction between the patterns indicates both the coarse alignment center (location of the cross) and the direction of the movement needed to correct for misalignment. In particular, the center crosses should align, and the top layer should be moved in the direction where the banded wedge pattern appears. For example, as shown in FIG. 3, alignment mark 301 indicates that there is no misalignment. As another example, alignment mark 302 indicates that the printing press should be adjusted so that the layer on which the top mark is printed is moved in the bottom left direction. As another example, alignment mark 303 indicates that the printing press should be adjusted so that the layer on which the top mark is printed is moved in the top left direction. As another example, alignment mark 304 indicates that the printing press should be adjusted so that the layer on which the top mark is printed is moved downward.

The occlusion-based alignment patterns shown in FIGS. 1 and 3 may be used in aligning layers in a multi-layer print, in various ways. In some embodiments, the various patterns may be embedded in the layer images to be aligned, then printing the rear layer image, adhering it to a spacing material, then printing the front layer image and positioning it on top of the spacer material. A proper alignment of the patterns would thereby ensure that the printed front layer image is aligned as intended with respect to the printed rear layer image.

Another way to utilize the various alignment patterns is in aligning the coordinate system of a previously-printed image to the coordinate system of a flat-bed printer, for the purpose of printing a second image on the reverse side of media at a precise location. In this case, the first set of alignment patterns similar to those depicted in FIG. 1 could be printed on the surface of the bed, the second set of alignment patterns similar to those depicted in FIG. 1 could be reverse-printed on one side of media along with an associated layer image, and the media could be flipped to the reverse side and the various patterns aligned.

Alignment patterns similar to those depicted in FIG. 1 may also be used in performing geometric corrections due to layer misalignment in the manufacture of digital multilayer displays, e.g. glasses-free 3D displays. In this case, an operator, automated system, end user or other individual or system may adjust digital geometric correction parameters while the patterns are displayed on two layers of the multilayer display, having also been run through the geometric correction transforms. When the appropriate correction parameters are selected, the patterns have the appearance of being properly aligned, as indicated by the alignment mark 301 shown in FIG. 3.

In addition, since it is advantageous to configure a printing press to print aligned on the front and back of the media, the inventors have recognized that it is important to flip the media in a controlled way to avoid introducing or exacerbating misalignment. For example, in flexographic printing, a turn bar is often used to flip the media during the print run so that the reverse side can be printed. Unless very high tension is used on the web the media will tend to shift across the web on the turn bar, which in turn will cause undesirable cross-web misalignment between the top and bottom of the media. For this reason, in some embodiments, a printing press employed for printing light fields uses a reversing station, which is fed much like any standard press station, but uses additional rollers to bring the media into position to be rear-printed before returning to the original orientation.

Press Calibration

As described herein, in some embodiments one or more characteristics of a printing press may be measured by printing one or more calibration patterns using the printing press. In turn, the identified characteristics may be used when generating front and back target patterns that form the light field print. The calibration patterns may be used to measure numerous types of characteristics including, but not limited to, achievable registration tolerance in at least one direction along the substrate (e.g., along two orthogonal directions along the substrate such as, for example, the direction of movement of the substrate in the printing press and the direction orthogonal to the direction of movement of the substrate), a degree of alignment of the printing press, minimum line width in at least one direction along the substrate (e.g., along two orthogonal directions along the substrate), spectral attenuation of the substrate without any ink thereon, spectral attenuation of an ink on the substrate, spectral attenuation of a combination of inks on the substrate (e.g., the combination resulting from printing two different color inks on top of one other on the same side of the substrate, printing one ink on one side of a substrate and printing another in on the other side of the substrate at the same location), and dot gain for each of one or more channels of the printing press. In some embodiments, the calibration patterns printed may include one or more patches that can be evaluated using a colorimeter.

Figure 2:
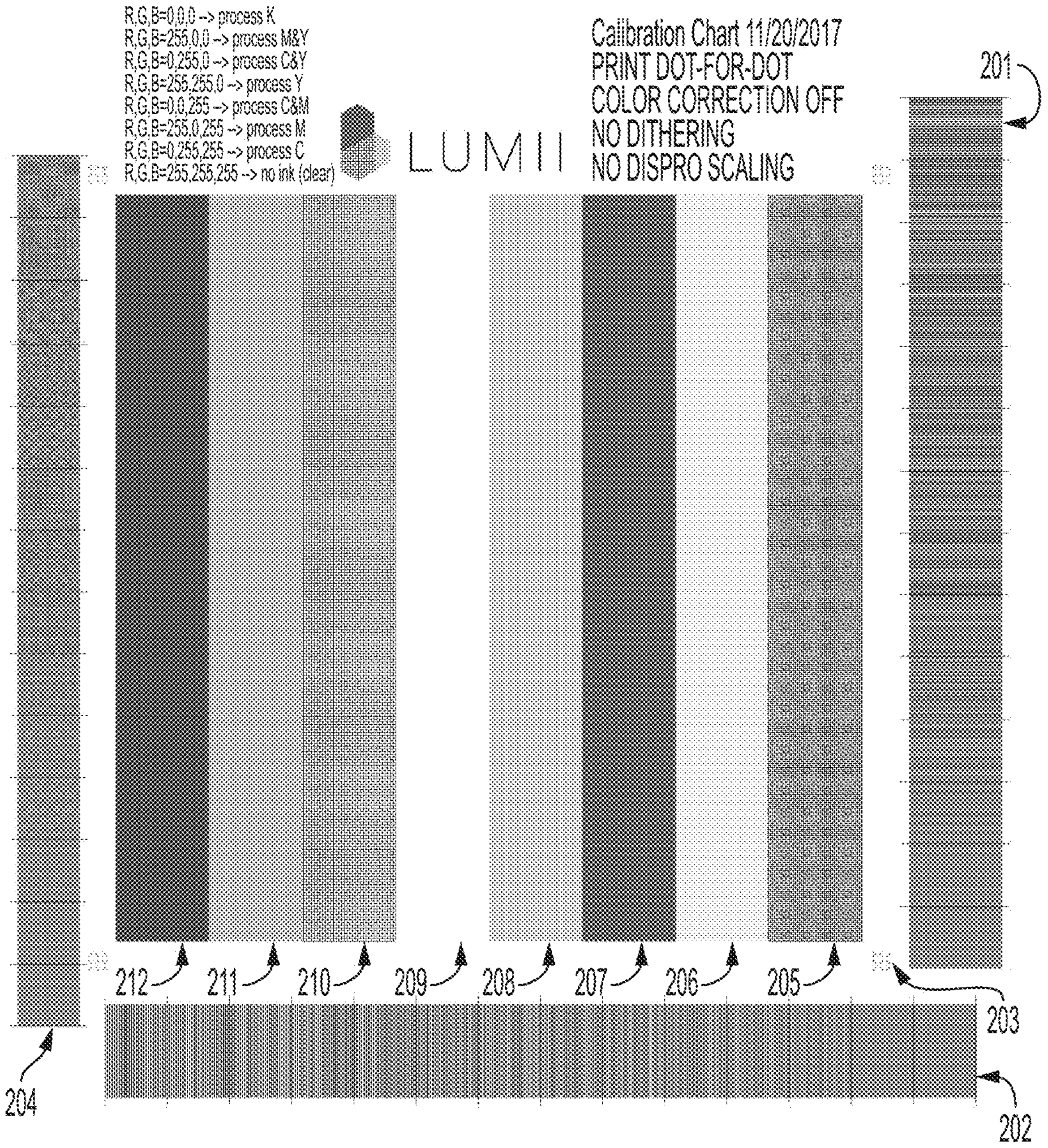
FIG. 2 illustrates a calibration sheet including multiple calibration patterns, in accordance with some embodiments of the technology described herein.

FIG. 2 illustrates an example calibration sheet comprising multiple calibration patterns that may be used to measure one or more characteristics of a printing press that printed the calibration sheet, in accordance with some embodiments. The calibration sheet illustrated in FIG. 2 includes: oriented line sweeps in the black channel including horizontal line sweeps 201 and vertical line sweeps 202, dot shape check patterns 203, a checkerboard sweep 204 in the black channel, and multiple color bars including a black bar 205, a yellow bar 206, a magenta bar 207, a cyan bar 208, a white bar 209, a blue bar 210, a green bar 211, and a red bar 212.

In some embodiments, a calibration sheet comprising one or more calibration patterns (e.g., the calibration sheet illustrated in FIG. 2), may be represented as a digital file or set of digital files, where one pixel in the digital file represents a single color channel in the press and causes the press to create a spot of the minimum specified spot size of the press to be calibrated. In some embodiments, each digital calibration file may be in 1-bit binary format suitable for passing to a press process designed for pre-screened data. In some embodiments, the calibration file(s) may include 1-bit tagged image file format (TIFF) images. In the case of an analog press (e.g., an offset or flexo press), the file(s) representing the calibration sheet may be fed into an imagesetter or platesetter to create press plates. The press plates may then be imprinted using the production configuration of the press to create the calibration sheet. In the case of a digital press, the file(s) representing the calibration sheet may be printed directly onto media to create the calibration sheet directly.

As may be seen from the illustrative calibration sheet of FIG. 2, in some embodiments, a calibration sheet may include groups of independent features to measure different properties of the press media and ink that are of interest for creating light field prints. For example, in some embodiments, a calibration sheet may include oriented line sweeps (e.g. oriented line sweeps 201 and 202 in FIG. 2) for evaluating the dot gain of each of one or more of the color channels of the printing press. Each oriented line sweep may include a strip of patches, each patch including lines oriented in a specific direction of interest (e.g., along the web direction in the press and across the web direction in the press).

In some embodiments, the spacing of the lines in each patch may vary. For example, in some embodiments, pitch of the lines in each patch of an oriented line sweep pattern doubles at each patch. As a specific example, the first patch of an oriented line sweep may alternate printed lines (where ink is deposited on the media) and clear lines (where no ink is deposited on the media) at a one pixel pitch. Recall that one pixel in the pattern represents the smallest specified feature size of the press. The next patch in the oriented line sweep doubles the pitch from the first to two printed lines and two clear lines alternating over the area of the patch. Subsequent patches continue to double the number of printed and clear lines alternating over the area of each patch. In some embodiments, an oriented line sweep may comprise between 5 and 15 (e.g., 10) such patches. In some embodiments, it may be possible to measure the dot gain characteristics of the printing press using fewer than 10 patches.

In some embodiments, an oriented line sweep pattern may be reproduced once per color channel in each orientation of interest. For example, a printing press using process color on the back of the media and a black channel on the front of the media would have 5 color channels: rear cyan, rear magenta, rear yellow, rear black, and front black. The typical calibration pattern for this press would contain 10 oriented line sweep patterns having one across-web oriented line sweep for each color channel and one along-web oriented line sweep for each color channel.

In some embodiments, in order to better characterize dot gain of the printing press it is also advantageous to print frequency sweeps comprising checkerboard patterns per color channel, such as, for example, frequency sweeps 204 shown in the illustrative calibration sheet of FIG. 2.

In the case where a press has no dot gain, the average intensity of each square of the line sweep or checkerboard sweep pattern, when printed, will be approximately 50%. However, in the presence of a print subject to dot gain the average intensity of the squares comprising smaller features will be lower. For example, in a press with a small amount of dot gain the average intensity of the square in the line sweep comprising two pixel features may be 30%. While it is standard practice in printing to estimate this darkening effect heuristically, where each desired average intensity level is mapped to a lighter, commanded intensity level, this heuristic model is not sufficient for incorporation into the forward model used for pattern formation described herein. The inventors, recognizing this, have devised a linear convolutional model that seeks to estimate the parameters of an ellipsoid dot shape from the printed calibration pattern.

In one embodiment, the printed image $I_p$ may be represented as $I_p=I*k$, where "*" is the convolution operator, I is the image transmitted to the printing press, and k is a kernel representing the shape of the dot created by the printing press. Assuming that the dot kernel is an ellipsoid with major and minor axes aligned to the horizontal and vertical of the printed calibration sheet, printing frequency sweeps in the horizontal and vertical axes makes it possible to independently evaluate the two axes of the dot kernel ellipse. The problem is separable into two one-dimensional problems for the horizontal and vertical: $I_{ph}=I_h*k_h$ and $I_{pv}=I_v*k_v$. The images $I_{ph}$ and $I_{pv}$ ore exactly those images printed in the calibration pattern. The one dimensional problem is amenable to solving for the kernel k by a number of methods, for example, the pseudoinverse: $k_h=I_{ph}/I_h$. In this embodiment, an estimate for the horizontal axis of the ellipsoid in the dot model is obtained as $k_h$ and an estimate for the vertical axis of the ellipsoid in the dot model is obtained as $k_v$.

In some embodiments, the parameters for the ellipsoid dot model are determined by visual or instrument inspection of the oriented line frequency sweeps printed in the calibration pattern. In some such embodiments, the forward, linear convolution dot gain model is run with a variety of parameters on a computer processor, and the results are displayed on a screen or by printout. The model parameters may be iteratively changed, either with a human-in-the-loop or automatically using a standard optimization method until the predicted output matches the output from the printed calibration pattern. If the printed calibration is to be read by instrument, such as a colorimeter or densitometer, it is important to provide a diffuse layer between the pattern and the instrument so that the local high frequency variation of the calibration pattern does not interfere with taking a consistent measurement.

In some embodiments, when it is possible to estimate likely values for the dot model, multiple calibration patterns can be pre-compensated using methods described herein, using a variety of estimates for the dot gain of the printing press. In some embodiments, when the multiple calibration patterns are printed on the press, the model parameters used to generate the pattern resulting in line and checkerboard frequency sweeps closest to constant 50% intensity across the frequency range may be used to correct generated patterns before they are sent to the press. In some embodiments, it may be advantageous to print frequency sweeps at different densities to help better tune the press.

In addition to or instead of estimating dot gain using the dot gain, printing calibration patterns may also be used to evaluate printing press alignment and, in particular, to measure front-back and station-to-station register tolerances. As described above, FIG. 1 shows a set of alignment patterns which can be printed, one per media side, and will create an observable effect, as shown in FIG. 3, with even small sub-pixel or single-pixel deviations in position of the front and back printing. The scale of the alignment pattern in the calibration pattern will determine the sensitivity and range of position measurement. In some embodiments, the alignment pattern (e.g., the alignment pattern illustrated in FIG. 1) may be printed at multiple scales in the calibration pattern to diagnose misalignments of various sizes. In some embodiments, the alignment pattern pairs may be printed for each pair of front and back color channels used by the press. In the above example, in which process color inks are used on the back of the media and black ink is used on the front of the media, the calibration pattern may contain 48 alignment pattern pairs (front and back). One cluster of 12 alignment pattern pairs would be printed in each corner of the calibration pattern to diagnose misalignment in different regions of the print. Each cluster of alignment patterns would contain a pair of marks for each front and back color channel, in this case rear black to front black, rear cyan to front black, rear magenta to front black and rear yellow to front black. Each of these sets of four pairs would then be replicated over three scales, small, medium, and large. The selected smallest scale would depend on the physical dot size of the press. For example, ¼ inch sized patterns are appropriate for the smallest scale pattern at 2400 dpi. In turn, the medium and large scale patterns double and triple the size of the smallest scale pattern.

In some embodiments, in order to measure the pigments in the inks used for each color channel of the printing press, the calibration pattern also includes patches of solid colors (e.g., ½ inch patches). For example, the calibration sheet of FIG. 2 includes solid color patches 205-212. In cases where the press configuration calls for creating light field prints using colors other than black on opposing sides of the print, it is advantageous to print overlaid color patches for each pair of colors to measure the color channels in combination. Once the calibration pattern has been printed color values can be read directly using a standard colorimeter such as an Xrite X1 Pro colorimeter. Color values in a known color space, such as XYZ space can be used in the forward model for pattern formation.

Pattern Generation

The techniques for generating target patterns for light field prints developed by the inventors may also be used to generate signals for controlling other types of multi-view 3D displays including displays having one or more active optical layers. When the 3D display includes one or more active optical layers (e.g., a layer including light emitting diodes (LEDs), single- and multi-layer LCD screens, fluorescent backlight, organic LED (OLED) backlight, an OLED layer, a layer comprising electronically focusable lenses, and multilayer polarization rotators), the signals may be termed actuation signals. In the context of passive light field displays, such as light field prints, when creating actuation signals for a printing device to create a light field print we refer to the actuation signals as target patterns (e.g., front and back target patterns). The inventors have developed various techniques to generate for generating target patterns (in the passive printing context) and actuation signals (in the active layer context), which techniques are described below. The techniques for generating target patterns and actuation signals include optimization techniques described herein including, for example, any of the techniques described with reference to FIGS. 3-18.

The goal of an optimized light field display is essentially to exploit redundancy caused by both the structure of the data to be displayed and external factors including the response of the human visual system and display optics, in order to represent light field images optically for a human observer. When considered through simple linear analysis such systems seem, at first glance, to violate simple counting arguments—in the case of light field synthesis the display appears to create more independent rays than there are independent image elements.

In fact, such displays produce an output with the same number of degrees of freedom as the display hardware. The bandwidth or algebraic rank of the output will be limited by the degrees of freedom of the display hardware. Another way to see this is by observing that the number of free parameters in the display system scales with the number of image elements, but the parameter space of the display system can be large when a suitable non-linear mapping between pixel states (or equivalently the actuation signals driving the pixel states) and output light ray intensities is created.

As described herein, an optimized light field display (e.g., a light field print) may be any display that generates content obtained by solving at least one optimization problem (e.g., using an iterative optimization algorithm or any other type of optimization algorithm). In some embodiments, when an image is desired from the display, an optimization problem may be posed, given the current state of the display, current state of the viewer, and current knowledge of the desired display appearance, which optimization problem, when solved either explicitly or implicitly, by a computer or other means, will result in a display state that causes the display to output an image, which image may be an optimal approximation of the desired display appearance. In this case an image is often a 4D light field, but does not have to be. (The desired output image can be a 3D light field, 2D image, 5D light field, vision correcting light field, accommodation cue light field, or many other desired display functions).

Optimized displays may employ the real-time or on-line content-based optimization techniques described herein. For pre-recorded images that will be viewed under predictable circumstances, it is possible for the optimization problem to be posed in advance, and the solution to the optimization problem may be generated (e.g., computing by solving the optimization problem using an iterative gradient-based or other optimization algorithm) and stored for later retrieval and display. Because the output of such displays is also the result of an optimization algorithm we consider displays that function in this way to be optimized displays. In contrast, many lay-people use the term “optimized” to mean “tuned” or “adjusted” by some human-in-the-loop or open-loop method. For example, a technician might be said to “optimize” the gamma value of a television display for a customer, when in practice the technician is adjusting a parameter in a predetermined gamma correction software module to a value referenced in a service manual. This does not mean that the television is an optimized display in the sense of the way in which this term is used herein, because there is no optimization problem is solved to produce the output of the television. As another example, a display manufacturer might solve a formal optimization problem to determine the values of a color lookup table, or even the parameters of an algorithm, both for the purpose of converting a 96-bit high-dynamic-range (HDR) image to a 16-bit HDR image to be shown on a HDR display. Such an HDR is not an optimized display in the sense of the way in which this term is used herein, because the output of the display is not itself determined through formal optimization, even though an optimization technique was used to tune a function of the display.

One compelling reason to use an optimized display, from a hardware design perspective, is that the display gains flexibility of form and function with respect to conventional, fixed pipeline designs. Accordingly, in some embodiments, an optimized display may be treated as a system with a number of degrees of freedom, wherein the degrees of freedom can be applied, through optimization methods, to create synthetic light fields with desired properties, such as high spatio-angular resolution, wide field of view, high display brightness, high temporal refresh rate, and good perceptual image quality (or fidelity). Moreover, a display driven by real-time optimization can adapt to changing viewing conditions as said viewing conditions change. Non-limiting examples of conditions to which the display may wish to adapt includes viewer position, ambient light intensity, ambient light direction, number of viewers changing display content (such as a real-time light field video stream), defects of the viewer’s visual system, device power consumption requirements, device orientation, and viewer eye spacing.

How various factors in combination influence the quality of the image shown on an optimized display is complex to predict. Another of the key benefits of optimized displays described herein is that as desired the factors that influence display quality can be traded-off against one another to maintain a desired level of display quality. Though each type of display hardware will have its own set of factors that influence display quality, the case of an optimized two-layer multiplicative light field display is typical of optimized displays. In the case of the optimized two-layer multiplicative light field display the following factors may influence the displayed image quality for physical light field image[1]: view disparity, layer positioning (e.g., the proximity of a virtual object in the desired scene to the physical location of a display layer), scene brightness (e.g., how bright is the overall scene being displayed as a fraction of the maximum display brightness), computational time (e.g., the time available after rendering a scene to determine the display layer patterns), and available power (e.g., the amount of device power available for computation and backlight).

[1] Non-physical light fields, which represent light ray paths inconsistent with physical light propagation, have a related set of quality influencing factors.

View disparity may be influenced by the field-of-view of the display (e.g., the viewing cone over which images are intended to be viewed), scene depth (e.g., the amount that objects in the scene extend into the display away from the viewer or out of the display towards the viewer), and depth of field (DOF). The failure of a display to render the correct view disparity in physical scenes manifests as a spatial blur that occurs in regions of the scene that extend far from the plane of the screen. This is known as DOF as the effect mimics the effect of the same name in camera systems. Though all automultiscopic displays have some degree of DOF, optimized displays in accordance with some embodiments of the technology described here may achieve better DOF for a given operating point than conventional displays. Rendering views with a closer angular spacing is one way to increase the perceived quality of the DOF blur.

It is useful to develop an understanding of how actuation signals driving a multi-layer display, or equivalently, how generated patterns printed on opposing sides of a clear substrate change the functionality of the substrate by creating, with the substrate, an angularly varying distribution of intensity, thereby enabling multi-view and light field display applications. Considering light rays travelling through both printed target patterns of a light field print within the angular cone supported by the light field print's field of view, each region on the first target pattern of the light field print will interact with a subset of said light rays, and each region of the second target pattern of the light field print will interact with a subset of said light rays. Considering one first such region on the first pattern, and one second such region on the second pattern, where the first region and the second region are located spatially near to one another, there will be a subset of light rays that pass through both the first and second region. The direction of this subset of light rays will be determined by the relative locations of the first and second regions. The intensity of this subset of light rays will be the product of the attenuation value of the first region and the second region. To achieve the desired intensity of the light ray travelling in the direction determined by the locations of the first and second region it is necessary to set the attenuation values of the first and second regions to any combination of values whose mathematical product is the desired light ray intensity, where said attenuation values are set either through the generated patterns printed on a printed light field display or the use of actuation signals in a multi-layer display.

The problem of setting a multitude of directional intensities is complicated by the fact that a pair of attenuation value set for a first and second region on the first and second target patterns of a light field print in order to set the intensity of the light ray traveling in the direction determined by the first and second region will also affect a multitude of light rays traveling in different directions and intersecting the first region and a third region on the second pattern of the display, or a multitude of light rays travelling in different directions and intersecting the second region and a fourth region on the first pattern. It is the job of the optimization framework described herein to select a consistent set of attenuation values, encoded in generated patterns (or commanded by actuation signals), for the first and second display layers such that each light ray traveling in a direction determined by passing through one first target pattern of a light field print (e.g., on one side of a substrate) and one second region on the second target pattern of the light field print (e.g., on another side of the same substrate) will have approximately the desired intensity.

It is common to see angularly varying effects when two high resolution patterned surfaces are brought into proximity. In optics these effects have often been called Moiré. An alternative way to conceptualize why it is possible to create angularly varying effects using optimized actuation signals or generated patterns it may be useful to consider the analogy to Moiré effects. In this view, the methods described herein produce a programmable Moiré effect.

Once the press has been properly characterized as described herein the optical transport function of the printed patterns can be simulated to form the forward model of the press in the optimization problem used to form patterns for light field printing.

Specific press equipment may require special consideration at this stage. Because the desired light field effects are achieved using precise dot placement, the patterns formed in this stage may not be altered or resampled later. Therefore some aspects of the printing workflow are changed, in some embodiments, to accommodate this unique feature of light field printing. For flexo presses, the radius of the roller used to mount the flexo plate will induce a small distortion along the web direction, known as dispro-factor. A print workflow may distort the data sent to the platesetter in order to compensate for the dispro-factor. Because this is not possible with light field printing, the dispro-factor should be identified at the time of pattern formation and incorporated into the input design. If the dispro-factor is 1% along the web direction the input design may be shrunk accordingly along the web direction before pattern formation.

The inventors have recognized that many of the algorithmic considerations necessary for producing a light field print are generalizable to producing a static, automultiscopic 3D display. The following description of the procedure for pattern formation describes the procedure generally for all automultiscopic, angularly varying displays, including those intended for production in a print setting. In places where the procedure for print differs or contains additional steps from the general procedure it has been noted as such.

Figure 4A:
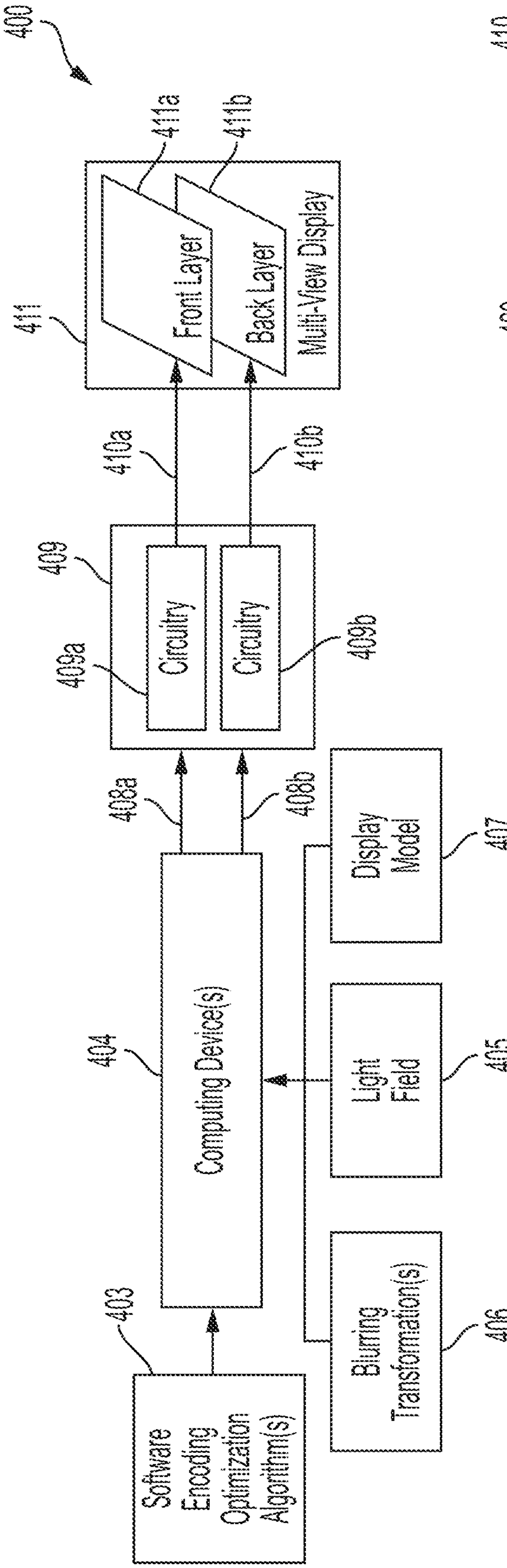
FIG. 4A shows an illustrative system for generating actuation signals for controlling a multi-view display and controlling the multi-view display using the generated actuation signals, in accordance with some embodiments of the technology described herein.

FIG. 4A shows an illustrative system 400 for generating actuation signals for controlling a multi-view display and controlling the multi-view display using the generated actuation signals, in accordance with some embodiments of the technology described herein. As shown in FIG. 4A, computing device(s) 404 is/are configured to generate actuation signals and provide the generated actuation signals to electro-optic interface circuitry 409, which uses the provided actuation signals (sometimes termed "actuation patterns") to generate display interface signals and drive the multi-view display 411 using the generated display interface signals.

As shown in the illustrative embodiment of FIG. 4A, multi-view display 411 comprises a front layer 411*a* and a back layer 411*b*. In some embodiments, layers 411*a* and 411*b* may both be active layers. In other embodiments, front layer 411*a* may be an active layer and back layer 411*b* may be a passive layer or vice versa. Non-limiting examples of an active layer include a single layer LCD screen, a multi-layer LCD screen, a layer comprising light emitting diodes (LEDs), a fluorescent or organic LED (OLED) backlight, an OLED layer, a layer comprising one or more electronically focusable lenses, and multilayer polarization rotators. An active layer may include one or multiple active optical elements that may be electronically controlled. Non-limiting example of such active optical elements include pixels, transistors, light emitting diodes, color filters, liquid crystals, and/or any other electronically actuated components configured to emit and/or aid in emitting light or configured to selectively block and/or aid in selectively blocking light. Non-limiting examples of a passive layer includes a polarizer, a diffuser, a brightness-enhancing film, a layer having a coating, a wave retarders, a color filter, a holographic layer, a parallax barrier layer, and a lenslet array. It should be appreciated that the front and back layers 411*a* and 411*b* may include any other arrangement of optical elements creating a linear or nonlinear parameterization of ray space. In embodiments where the layers 411*a* and 411*b* are active layers, the layers 411*a* and 411*b* may comprise the same number of active optical elements or a different number of active optical elements, as aspects of the technology described herein are not limited in this respect.

As shown in FIG. 4A, computing device(s) 404 generate(s) actuation signals 408*a* and 408*b* used for controlling the optical behavior of layers 411*a* and 411*b* of multi-view display 411. Computing device(s) 404 provide(s) actuation signals 408*a* to first electro-optic interface circuitry 409*a* that, in response to receiving actuation signals 408*a*, generates display interface signals 410*a* to drive the front layer 411*a*. The display interface signals 410*a* may comprise a display interface signal for each of one or more (e.g., all) of the optical elements in front layer 411*a*. Actuation signals 408*a* may comprise an actuation signal for each of one or more (e.g., all) of the optical elements in front layer 411*a*. Computing device(s) 404 also provide actuation signals 408*b* to second electro-optic interface circuitry 409*b* that, in response to receiving actuation signals 408*b*, generates display interface signals 410*b* to drive the back layer 411*b*. The display interface signals 410*b* may comprise a display interface signal for each of one or more (e.g., all) of the optical elements in back layer 411*b*. Actuation signals 408*b* may comprise an actuation signal for each of one or more (e.g., all) of the optical elements in front layer 411*b*. A multi-view display is not limited to including only two layers, as illustrated in the illustrative embodiment of FIG. 4A and may include any suitable number of layers including any suitable number of active layers (e.g., 0, 1, 2, 3, 4, 5, etc.) and/or any suitable number of passive layers (e.g., 0, 1, 2, 3, 4, 5, etc.), as aspects of the technology described herein are not limited in this respect. In embodiments where a multi-view display includes N active layers (where N is an integer greater than two), the computing device(s) 404 may be configured to generate N sets of actuation signals and provide them to electro-optical circuitry 409 that, in response generates N sets of display interface signals and uses the generated sets of display interface signals to drive the N active layers of the multi-view display.

In some embodiments, computing device(s) 404 may include one or multiple computing devices each being of any suitable type. Each computing device may include one or multiple processors. Each processor may be a central processing unit (CPU), a graphics processing unit (GPU), a digital signal processor (DSP), an FPGA, an ASIC, any other type of hardware processor, or any suitable combination thereof. When computing device(s) 404 include multiple computing devices, the multiple computing devices may be located at one physical location or may be distributed among different physical locations. The multiple computing devices may be configured to communicate with one another directly or indirectly.

In some embodiments, including the illustrative embodiment shown in FIG. 4A, computing device(s) 404 may be configured the generate actuation signals (e.g., actuation signals 408*a* and 408*b*) based on: (a) information 405 specifying a desired light field to be reproduced by multi-view display 411; (b) information 406 specifying of one or more blurring transformations; and (c) information 407 specifying a model of the multi-view display 411. The computing device(s) 404 may generate actuation signals based on these inputs by using software 403 encoding one or more optimization algorithms for solving one or more optimization problems to obtain actuation signals based on these inputs. The software 403 may comprise processor instructions that, when executed, solve the optimization problem(s) to obtain actuation signals based on the above-described inputs. The software 403 may be written in any suitable programming language(s) and may be in any suitable format, as aspects of the technology described herein are not limited in this respect.

Accordingly, in some embodiments, the actuation signals 408*a* and 408*b* may be obtained as solutions to an optimization problem that is formulated, at least in part, by using: (a) information 405 specifying a desired light field to be reproduced by multi-view display 411; (b) information 406 specifying of one or more blurring transformations; and (c) information 407 specifying a model of the multi-view display 411. Examples of such optimization problems and techniques for generating solutions to them are described herein including with reference to FIGS. 5-16.

Accordingly, in some embodiments, the content generated by multi-view display 411 may be obtained by solving at least one optimization problem (e.g., by one or more optimization algorithms including, for example, one or more iterative optimization algorithms). As such, multi-view display 411 may be referred to as an "optimized display." An optimized display may be any display that generates content obtained by solving at least one optimization problem.

In some embodiments, information 405 specifying a desired light field to be reproduced by multi-view display 411 may include one or multiple scene views. The scene views may be of a natural scene or synthetic scene, and may be representative of a naturally occurring light field or of a light field that may not bear much resemblance to a naturally occurring light field. The latter case could correspond, by way of example and not limitation, to a scene having multiple distinct views showing essentially independent two-dimensional content in each view. In some embodiments, each scene view may correspond to a respective position of a viewer of the multi-view display apparatus.

In some embodiments, the information 405 specifying one or more scene views may include an image (e.g., a PNG file, a JPEG file, or any other suitable representation of an image) for each of one or more (e.g., all) of the scene views. The image may be a color image or a grayscale image and may be of any suitable resolution. In some embodiments, the image of a scene view may be generated by 3D generation software (e.g., AUTOCAD, 3D STUDIO, SOLIDWORKS, etc.). The information 405 specifying the scene views may specify any suitable number of views (e.g., at least two, at least ten, at least fifty, at least 100, at least 500, between 2 and 1000, between 10 and 800, or in any other suitable combination of these ranges), as aspects of the technology provided herein are not limited in this respect.

In some embodiments, information 406 specifying of one or more blurring transformations may comprise any suitable data (e.g., numerical values) embodying the blurring transformation. The data may be stored in one or more data structure(s) of any suitable type, which data structure(s) may be part of the representation. Additionally or alternatively, the information specifying a blurring transformation may include processor-executable instructions (e.g., software code in any suitable programming language, one or more function calls to one or more application programming interfaces and/or software libraries, etc.) that, when executed, apply the blurring transformation to an image (e.g., by operating on a data structure encoding the image). It should be appreciated that information 406 may specify one or multiple blurring transformations in any suitable way, as aspects of the technology described herein are not limited in this respect. The information 406 may specify blurring transformations of any suitable type including any of the types of blurring transformations described herein.

In some embodiments, information 407 specifying a model of the multi-view display 411 may include information characterizing one or more physical characteristics of the multi-view display 411. Information 407 may include information about any physical characteristics of the multi-view display 411 that influence the way in which the multi-view display generates images. For example, in some embodiments, information 407 may include information indicating a distance between the front layer and the back layer, a relative location of the front layer to the back layer, resolution of the front layer, resolution of the back layer, size of the front layer, size of the back layer, information about the response of any color filters in the front layer and/or the back layer, a representation of spectral cross-talk between color channels of the front layer and the back layer and/or any other suitable information characterizing one or more physical characteristics of the multi-view display.

In some embodiments, multi-view display 411 may include one or more multiplicative panel layers (e.g., one or more LCD panels with integrated polarizers, as well as liquid crystal on silicon (LCOS) and digital micro-mirror devices (DMD) or other electromechanical devices), and information 407 may include information indicating the effect of the multiplicative panel layer(s) on light passing through layers of the multi-view display 411. In some embodiments, multi-view display 411 may include one or more additive panel layers (e.g., optically combined LCDs, OLEDs, and LED elements), and information 407 may include information indicating the effect of the additive panel layer(s) on light passing through layers of the multi-view display 411. In some embodiments, multi-view display 411 may include one or more polarization-rotating layers (e.g., LCD panels without polarizers), and information 407 may include information indicating the effect of the polarization-rotating layers on light passing through layers of the multi-view display 411.

In some embodiments, information 407 may include information indicating the effect of one or multiple projection systems part of multi-view display 411. In some embodiments, information 407 may include information indicating perspective effects of multi-view display 411, which effects may be representable as on-axis and off-axis projections. In some embodiments, information 407 may include a representation of generally non-uniform subpixel tiling patterns, associated with reproducing various color channels in various layers. In some embodiments, information 407 may include a representation of spectral cross talk between red, green, blue, or other color channels. In some embodiments, information 407 may include a representation of the effective minimum and maximum intensity levels attainable by the display elements. In some embodiments, information 407 may include information characterizing non-linear response characteristics (if any) of any multiplicative and/or additive display elements in multi-view display 411. In some embodiments, information 407 may include information about perturbations in position of one or more components of multi-view display 411 (e.g., as a consequence of manufacturing). In some embodiments, information 407 may include information about physical movements of display element positions (e.g., when the multi-view display 411 includes one or more motorized elements). In some embodiments, information 407 may include a representation of the time-domain dynamics of optical elements in the multi-view display 411. By way of example and not limitation, said time-domain dynamics may characterize pixel state rise and fall time.

In some embodiments, information 407 may include a representation of constraints in the electro-optical interface circuitry 409 associated with transforming the actuation signals provided to display interface signals. By way of example and not limitation, the constraints represented may reflect the allowable subsets of pixel states that may be updated in a given clock cycle. By way of example and not limitation, it is possible to use a subset of row and column drivers, so that a subset of pixels can be updated at a rate that is higher than the equivalent full-refresh frame rate of the display element. Further non-limiting examples of display driver circuitry constraints that may be represented include constraints reflecting the allowable precision with which values may be assigned to a particular pixel or set of pixels. By way of example and not limitation, said pixel states may be specified as some number of bits per color channel per pixel.

In some embodiments, information 407 may include information characterizing one or more passive optical phenomena associated with the multi-view display 411. For example, in some embodiments, multi-view display 411 may include one or more passive layers (different from layers 411*a* and 411*b*), and information 407 may include information characterizing the effects of the passive layer(s) on light passing through layers of the multi-view display 411. Such passive layers may include one or more optical diffusers, one or more reflective elements including specular and diffuse reflective elements, one or more optical films, one or more lenslet arrays, one or more holographic layers (e.g., diffractive holographic backlights). Such passive layers may be located in front of, in between two of, or behind any of the active layers in the multi-view display 411. Additionally or alternatively, information 407 may include information characterizing diffractive effects between optical elements, for example, due to pixel aperture patterns, wavelength-dependent effects of any optical films, wavelength-dependent effects of wave retarders (e.g., ½ wave plates), angle-dependent intensity responses including, for example, angle-dependent brightness, and contrast and/or gamma characterizations.

In some embodiments, information 407 may comprise a mapping between actuation signals used to drive a multi-view display and the display views generated by the multi-view display in response to the actuation signals. The mapping may be generated using (and, as such, may represent and/or reflect) any of the information described above as being part of information 407. For example, the mapping may be generated using: information characterizing one or more physical characteristics of the multi-view display 411; information indicating a distance between the front layer and the back layer, a relative location of the front layer to the back layer, resolution of the front layer, resolution of the back layer, size of the front layer, size of the back layer, information about the response of any color filters in the front layer and/or the back layer, a representation of spectral cross-talk between color channels of the front layer and the back layer; information indicating the effect of the multiplicative, additive, and/or polarization rotating panel layer(s) on light passing through layers of the multi-view display 411; information indicating the effect of one or multiple projection systems part of multi-view display 411; information indicating perspective effects of multi-view display 411; representation of generally non-uniform sub-pixel tiling patterns, associated with reproducing various color channels in various layers; a representation of spectral cross talk between red, green, blue, or other color channels; a representation of the effective minimum and maximum intensity levels attainable by the display elements; information characterizing non-linear response characteristics of any multiplicative and/or additive display elements in multi-view display 411; information about perturbations in position of one or more components of multi-view display 411; information about physical movements of display element positions (e.g., when the multi-view display 411 includes one or more motorized elements; a representation of the time-domain dynamics of optical elements in the multi-view display 411; constraints in the electro-optical interface circuitry 409 associated with transforming the actuation signals provided to display interface signals; information characterizing one or more passive optical phenomena associated with the multi-view display 411; information characterizing diffractive effects between optical elements; and/or any information about any physical characteristics of the multi-view display 411 that influence the way in which the multi-view display generates images.

In some embodiments, the mapping between actuation signals used to drive a multi-view display and the display views generated by the display may be generated (e.g., computed), and stored for subsequent use, and accessed when they are to be used. In such embodiments, the mappings may be stored in any suitable format and/or data structure(s), as aspects of the technology described herein are not limited in this respect. In some embodiments, the mapping may be generated and used right away, without being stored.

In some embodiments, the mapping may be generated using one or more software packages. The software package(s) may take as input and/or parameters any of the above described information 407 to generate display views from actuation signals. For example, in some embodiments, the mapping may be generated using a rendering package or framework (e.g., 3D Studio, Blender, Unity, three.js, NVIDIA Optix, POVRay, or custom or other packages, which may make use of various graphics frameworks such as OpenGL, OpenGL ES, WebGL, Direct3D, CUDA, or general-purpose CPU libraries) in rendering a model of the display in the state corresponding to the use of the actuation signals, using a camera projection to obtain the view from the particular view location of interest. The projection may be a perspective projection, an off-axis projection, or an orthographic projection.

In embodiments where the actuation signals result in light being selectively emitted from the rear layer and light being selectively attenuated in the front layer, the rear layer may be rendered as a plane textured with a first actuation signal, followed by a rendering of the front layer as a plane textured with a second actuation signal, blended with the rendering of the rear layer using multiplicative blending. In such embodiments, performing a rendering of the scene using a camera projection whose viewpoint coincides with the desired location of the display viewpoint may result in the computation of the associated display view. In some embodiments where the display model is more complex (e.g., involving a model of reflective layers, diffuse layers, spectral cross-talk between color channels, diffractive effects, or internal reflections between layers) the mapping from the actuation signals to the display views may be generated using optics modeling routine or software (e.g., NVIDIA Optix, Maxwell, or custom-written software).

Figure 4B:
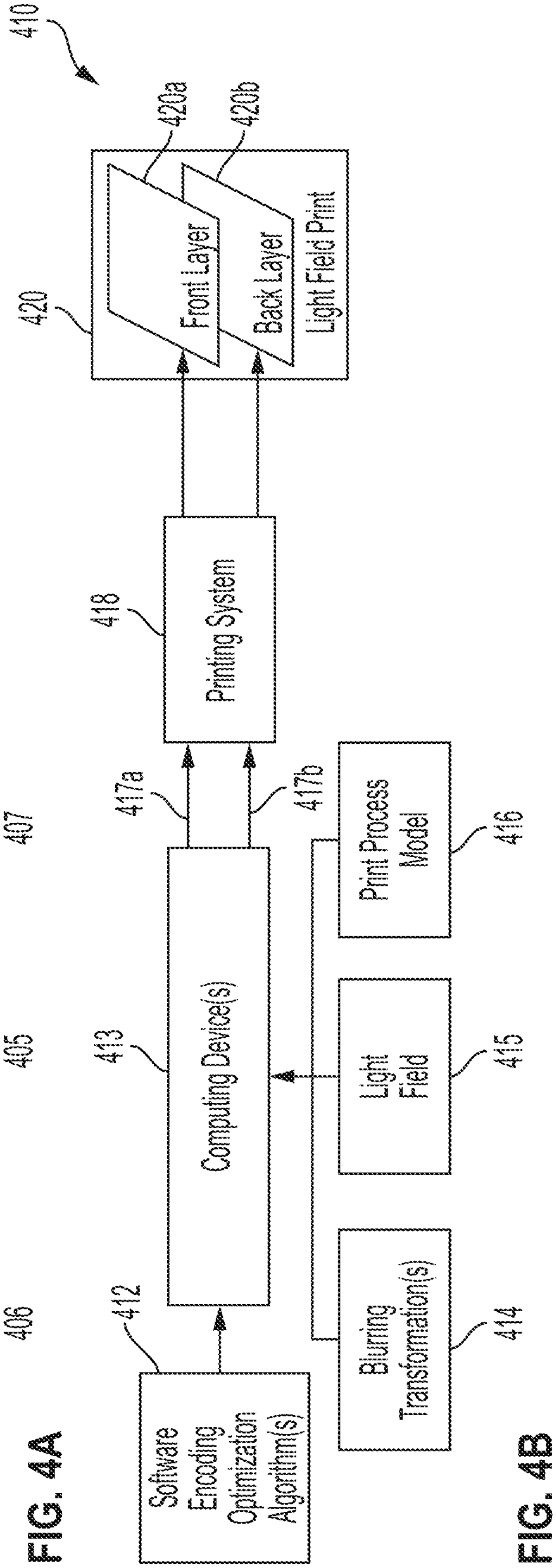
FIG. 4B shows an illustrative system for generating patterns to be printed on layers of a light field print and printing the generated patterns on the layers of the light field print, in accordance with some embodiments of the technology described herein.

FIG. 4B shows an illustrative system 410 for generating patterns to be printed on layers of a light field print and printing the generated patterns on the layers of the light field print, in accordance with some embodiments of the technology described herein. As shown in FIG. 4B, computing device(s) 413 is/are configured to generate actuation signals and provide the generated actuation signals to a printing system 418, which prints the provided actuation signals (sometimes termed "actuation patterns" or "target patterns") on layers printed media, which are arranged into a layered passive display arrangement such as light field print 420.

As shown in the illustrative embodiment of FIG. 4B, light field print 420 comprises a front layer 420*a* and a back layer 420*b*. Each of these layers may include one or more transparent film and/or other transparent materials on which generated target patterns may be printed by printing system 418. Additionally, in some embodiments, light field print 420 may include one or more other layers including, but not limited to, one or more optical spacers, one or more diffusers, one or more lenslet arrays, one or more holographic layers, one or more color filters, and/or one or more active backlights.

As shown in FIG. 4B, computing device(s) 413 generate(s) target patterns 417*a* and 417*b* for depositing onto layers 420*a* and 420*b*. Computing device(s) 413 provide(s) the generated target patterns to printing system 418, which prints the target patterns onto the layers 420*a* and 420*b*. The printing system 418 may be a printing press of any suitable type including any of the types described herein. In some embodiments, the printing system 418 may be laser toner-based printing system, laser drum-based printing system, an inkjet printing system, a chromogenic or other photographic printing system, a digital printing press, an analog printing press, a digital offset printing system, and/or any other type of printing system that may be used to print target patterns on one or more layers used to assemble a light field print.

A light field print is not limited to having only two layers, as illustrated in the illustrative embodiment of FIG. 4B, and may include any suitable number of layers (e.g., 1, 2, 3, 4, 5, 6, 7, etc.), as aspects of the technology described herein are not limited in this respect. In embodiments where a light field print includes N layers (where N is an integer greater than two), the computing device(s) 413 may be configured to generate N target patterns and provide them to printing system 418, which prints the generated target patterns on the N layers, which layers may be subsequently assembled into a light field print. In some embodiments, a light field print may be assembled from multiple independently printed layers, or printed on opposing sides of a single clear substrate, or both layers may be printed on top of a substrate with an optional clear varnish layer printed between them, or any combination of the above.

In some embodiments, computing device(s) 413 may include one or multiple computing devices each being of any suitable type. Each computing device may include one or multiple processors. Each processor may be a central processing unit (CPU), a graphics processing unit (GPU), a digital signal processor (DSP), an FPGA, an ASIC, any other type of hardware processor, or any suitable combination thereof. When computing device(s) 413 include multiple computing devices, the multiple computing devices may be located at one physical location or may be distributed among different physical locations. The multiple computing devices may be configured to communicate with one another directly or indirectly.

In some embodiments, including the illustrative embodiment shown in FIG. 4B, computing device(s) 413 may be configured the generate target patterns (e.g., target patterns 417*a* and 417*b*) based on: (a) information 415 specifying a desired light field to be reproduced by light field print 420; (b) information 414 specifying of one or more blurring transformations; and (c) information 416 specifying a model of the printing process performed by printing system 418. The computing device(s) 413 may generate target patterns based on these inputs by using software 412 encoding one or more optimization algorithms for solving one or more optimization problems to obtain target patterns based on these inputs. The software 412 may comprise processor instructions that, when executed, solve the optimization problem(s) to obtain target patterns based on the above-described inputs. The software 412 may be written in any suitable programming language(s) and may be in any suitable format, as aspects of the technology described herein are not limited in this respect.

Accordingly, in some embodiments, the target patterns 417*a* and 417*b* may be obtained as solutions to an optimization problem that is formulated, at least in part, by using: (a) information 415 specifying a desired light field to be reproduced by light field print 420; (b) information 414 specifying of one or more blurring transformations; and (c) information 416 specifying a model of the printing process performed by printing system 418. Examples of such optimization problems and techniques for generating solutions to them are described herein including below with reference to FIGS. 5-18.

In some embodiments, information 415 specifying a desired light field to be reproduced by a light field print may include one or multiple scene views and, for example, may include any of the information described above in connection with information 405 in FIG. 4A. In some embodiments, information 414 specifying of one or more blurring transformations may include any of the information described above in connection with information 406 in FIG. 4A.

In some embodiments, information 416 specifying a model of the printing process performed by printing system 418 may include information characterizing the printing process including, but not limited to, layer geometry information, color model information, print resolution information, information specifying the type of printing system used, information characterizing how much ink bleed results from the printing process, information characterizing how much dot gain results from the printing process, information indicating the maximum allowable ink density of the printing medium, information indicating the dot pitch of the prints generated by the printing process. In some embodiments, the information 416 may include one or more characteristics of a printing press, examples of which and techniques for obtaining which are described herein.

As described herein, in some embodiments, one or more blurring transformations may be used to generate target patterns for a light field print. In some embodiments, applying a blurring transformation to an image (e.g., a scene view, a display view, an error view, or any other suitable image) may include convolving the image with the band-limiting transformation in the spatial domain or multiplying the 2D Fourier transform (or other frequency transform) of the band-limiting transformation with a corresponding transformation of the image.

In some embodiments, a blurring transformation may comprise a band-limiting function. The band-limiting function may be a 2D function. In some embodiments, a band-limiting function may have a 2D Fourier transform whose magnitude, on average or asymptotically, may decrease with increasing spatial frequency.

In some embodiments, a blurring transformation may be any linear or nonlinear function that, when applied to an image, reduces the amount of high-frequency content and/or fine detail in the image.

In some embodiments, a blurring transformation may be any function that applies a model of the human visual system to an image. For example, a blurring transformation may be any function that applies a model of human visual acuity to an image. As another example, a blurring transformation may be any function that applies a model of human contrast sensitivity to an image.

In some embodiments, a blurring transformation may comprise a spatial and/or temporal band-limiting function representing an approximation of the band-limited behavior of the human vision system. For example, a blurring transformation may comprise a band-limiting function tailored to the long term vision characteristics of a specific individual (e.g., the specific vision deficiencies of the individual). As another example, a blurring transformation may comprise a band-limiting function tailored to the short-term vision characteristics of an individual viewer (e.g., taking into account the viewer's specific viewing position or instantaneous accommodation focal length).

In some embodiments, applying a blurring transformation to an image comprises spatially convolving (or performing any equivalent calculation in the spatial or other domain such as, for example, multiplication in the Fourier domain) the image with another function.

For example, applying a blurring transformation to an image may comprise spatially convolving the image with a point spread function of an optical system (e.g., a camera, optics of a human eye, optical effects of sending light through a very small home the size of a pixel). As a specific example, applying a blurring transformation to an image may comprise spatially convolving the image with a kernel representing a shape of an aperture or a frequency-domain representation of the shape of the aperture. As another example, applying a blurring transformation to an image may comprise spatially convolving the image with a two-dimensional, spatially discrete point spread response, for which the sum of the response, taken over all discrete entries, is greater than or equal to the €$_2$-norm of the response, taken over all discrete entries. As yet another example, applying a blurring transformation to an image may comprise spatially convolving the image with a two-dimensional Gaussian function.

In some embodiments, applying a blurring transformation to an image may comprise applying a binary morphological transformation (e.g., an erosion, a dilation, a morphological opening, and a morphological closing) to the image. In some embodiments, applying a blurring transformation to an image may comprise applying a rank filter (e.g., a median filter, a majority filter, etc.) to the image.

In some embodiments, a blurring transformation may represent the effects due to diffractive interactions between layers of a light field print and/or effects due to one or more optical diffusers or other passive layers. Additional aspects of blurring transformations are described in U.S. Pat. Pub. No. 2017/0085867, published Mar. 23, 2017, titled "MULTI-VIEW DISPLAYS AND ASSOCIATED SYSTEMS AND METHODS", incorporated by reference herein in its entirety.

As described herein, in some embodiments, an optimization-based approach may be used to generate target patterns for manufacturing a light field print. In some embodiments, the optimization-based approach may be iterative.

Figure 5:
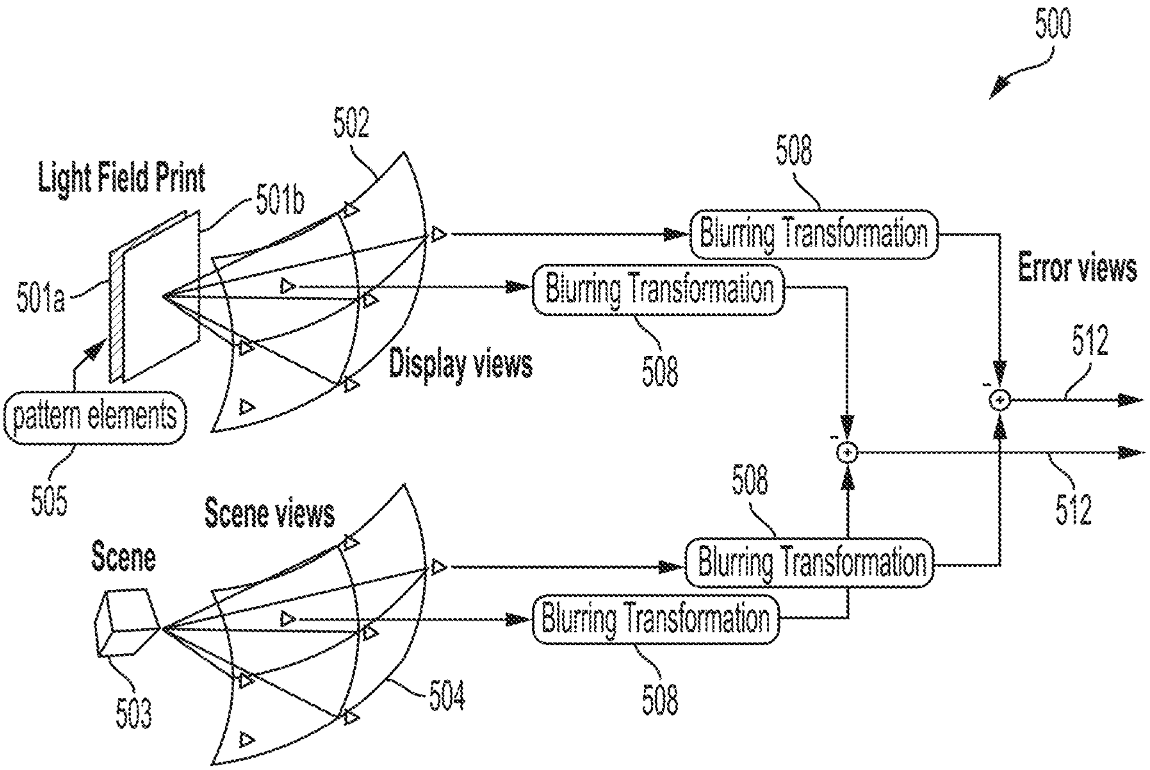
FIG. 5 is an illustrative block diagram of the processing performed to generate patterns for a light field print, in accordance with some embodiments of the technology described herein.

In some embodiments, the approach may be as follows. First, at an initialization stage, a first set of target patterns is generated. This set of target patterns may be generated fresh or based on using one or more previously-obtained target patterns. The first set of target patterns is then used to determine a first set of display views that would be generated by a light field print if the target patterns were printed to form a light field print, and the display views are compared to the scene views (which specify the desired light field to be produced by the light field print) to generate error views. A display view may be generated for each scene view. The display views may be determined at least in part by using information about the physical characteristics of the printing device (e.g., printing press) (e.g., information 416 described with reference to FIG. 4B). In some embodiments, the error views may be generated further based upon using one or more blurring transformations. In some embodiments, prior to being compared to generate the error views, each of the display views and scene views may be transformed by a suitable blurring transformation (e.g., as shown in FIG. 5). In some embodiments, when the blurring transformations applied to the display and scene views are identical and linear, the blurring transformation may be applied to the error views instead of being applied to the display views and scene views.

In turn, the error views may be used to determine how to update the values of the first set of target patterns to obtain a second set of target patterns (in order to reduce the error between the display views and the scene views). The second set of target patterns is then used to determine a second set of display views that would be produced by a light field print if it were manufactured using the second set of target patterns, and a second set of error views is generated by comparing the second set of display views with the scene views. The second set of error views is then used to determine how to update the values of the second set of target patterns to obtain a third set of target patterns in order to further reduce the error between the display vies and the scene views. This iterative process may be repeated until the error between the display views and the scene views falls below a predetermined threshold, a threshold number of iterations has been performed, a threshold amount of time has elapsed, or any other suitable stopping criteria has been satisfied.

Although the above illustrative iterative optimization technique was described with respect to generating target patterns for printing light field prints, it should be appreciated that analogous techniques may be used to generate actuation signals for controlling active displays. Similarly, in descriptions below, the optimization techniques described with reference to FIGS. 5-17 may be applied to generating not only target patterns for manufacturing light field prints, but also actuation signals for active displays.

FIG. 5 is an illustrative block diagram 500 of the processing performed to generate target patterns for a light field print, in accordance with some embodiments of the technology described herein. In particular, FIG. 5 illustrates a step of an iterative optimization technique for identifying the set of target patterns based on a comparison between a set of display views 502 of a light field print 501 having layers 501*a* and 501*b*, which display views are denoted by $d_k$ (k=1, . . . , N) with N representing the number of views, and a set of corresponding scene views 204, which are denoted by $s_k$ (k=1, . . . , N), of a virtual scene 503. The scene views may of any suitable type including the types described herein. For example, the scene views may be of a natural scene or synthetic scene, and may be representative of a naturally occurring light field or of a light field that may not bear much resemblance to a naturally occurring light field. The latter case could correspond, by way of example and not limitation, to a scene having multiple distinct views showing essentially independent two-dimensional content in each view.

In some embodiments, there may be a one-to-one correspondence between the display and scene views. In other embodiments, there may not be such a one-to-one correspondence. For example, the scene views may correspond to the display views when moving in the horizontal direction only, whereas moving in the vertical direction, an ensemble of display views may correspond to a single scene view. As another example, when comparing scene and display views by moving in the horizontal direction, the scene view location may advance at some fraction of (e.g., half) the rate as the rate of the display view location.

As shown in FIG. 5, blurring transformation(s) 508 may be applied to the display views 502 and the scene views 504 and the resulting blurred display views and blurred scene views may be compared to generate error views 512, denoted by $e_k$ (k=1, . . . , N). In some embodiments, the same blurring transformation may be applied to all display views and all scene views. In other embodiments, one blurring transformation $T_i$ may be applied to a display view $d_i$ and a corresponding scene view $s_i$ and a different blurring transformation $T_j$ may be applied to another display view $d_j$ and its corresponding scene view $s_j$. The blurring transformation(s) 508 may include any of the types of blurring transformations described herein.

The display views may be generated using a set of target patterns 505, denoted by $x_k$(k=1, . . . , M), where M indicates the number of target patterns. The display views may be generated at least in part by using information characterizing the printing press, including the ink and medium, examples of which information are provided herein.

In some embodiments, as may be appreciated from FIG. 5, at each iteration of an optimization algorithm, the goal may be to update the target patterns 505 based on the error views 512 to reduce the overall amount of error between blurred versions of the display views and blurred versions the scene views. This means that, the non-blurred display view can (and in practice will) have a large amount of high-frequency content, which is removed via the application of the blurring transformations 508. Put another way, an error function that weights low-frequency content more significantly, may encourage the target patterns to cause the light field print to generate high-frequency content since the high frequency content will not count toward the error function as significantly. In some embodiments, the blurring transformation(s) 508 may encourage this by weighting low-frequency content so that the error penalty is higher at in lower frequencies, and so that the error penalty is smaller at higher frequencies.

Additional aspects of the optimization techniques which may be used to generate target patterns for manufacturing a light field print are described below with reference to FIGS. 6-16.

FIG. 6 shows an example optimization problem 600 that may solved as part of generating patterns for printing on one or more layers of a light field print, in accordance with some embodiments of the technology described herein.

As shown in FIG. 6, the optimization problem 600 may be used to determine the target patterns $x_k$ by minimizing (exactly or approximately) the cost function $g(e_1, \ldots, e_N)$, subject to the listed constraints, which include upper bounds $u_k$ and lower bounds $l_k$ on the target patterns. Such constraints would be enforced element-wise. In the optimization problem 300, the functions $f_k(\ldots)$, k=1, . . . , N, represent the mapping from the target patterns $x_k$ to the view error signals $e_k$, such as the view error signals shown in FIG. 2. In this sense, the functions $f_k(\ldots)$ generally incorporate, for example, (1) the implicit mappings from the target patterns $x_k$ to the display views $d_k$; (2) the values of the desired scene views $s_k$; and (3) the blurring transformations and differencing functions shown in FIG. 5.

Figure 7:
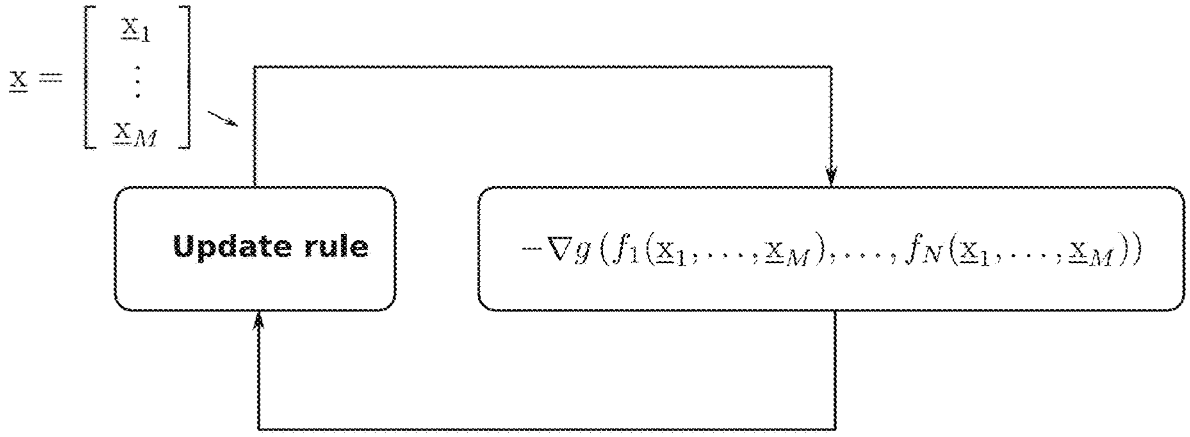
FIG. 7 illustrates aspects of a gradient descent technique for generating one or more solutions to the optimization problem shown in FIG. 6, in accordance with some embodiments of the technology described herein.

In some embodiments, the optimization problem 600 may be solved using an iterative gradient-based technique to obtain the target patterns $x_k$, as is depicted schematically in FIG. 7. As illustrated, the gradient technique comprises using a gradient of the functions $f_k(\ldots)$ to iteratively update values of the target patterns using an update rule.

Figure 8:
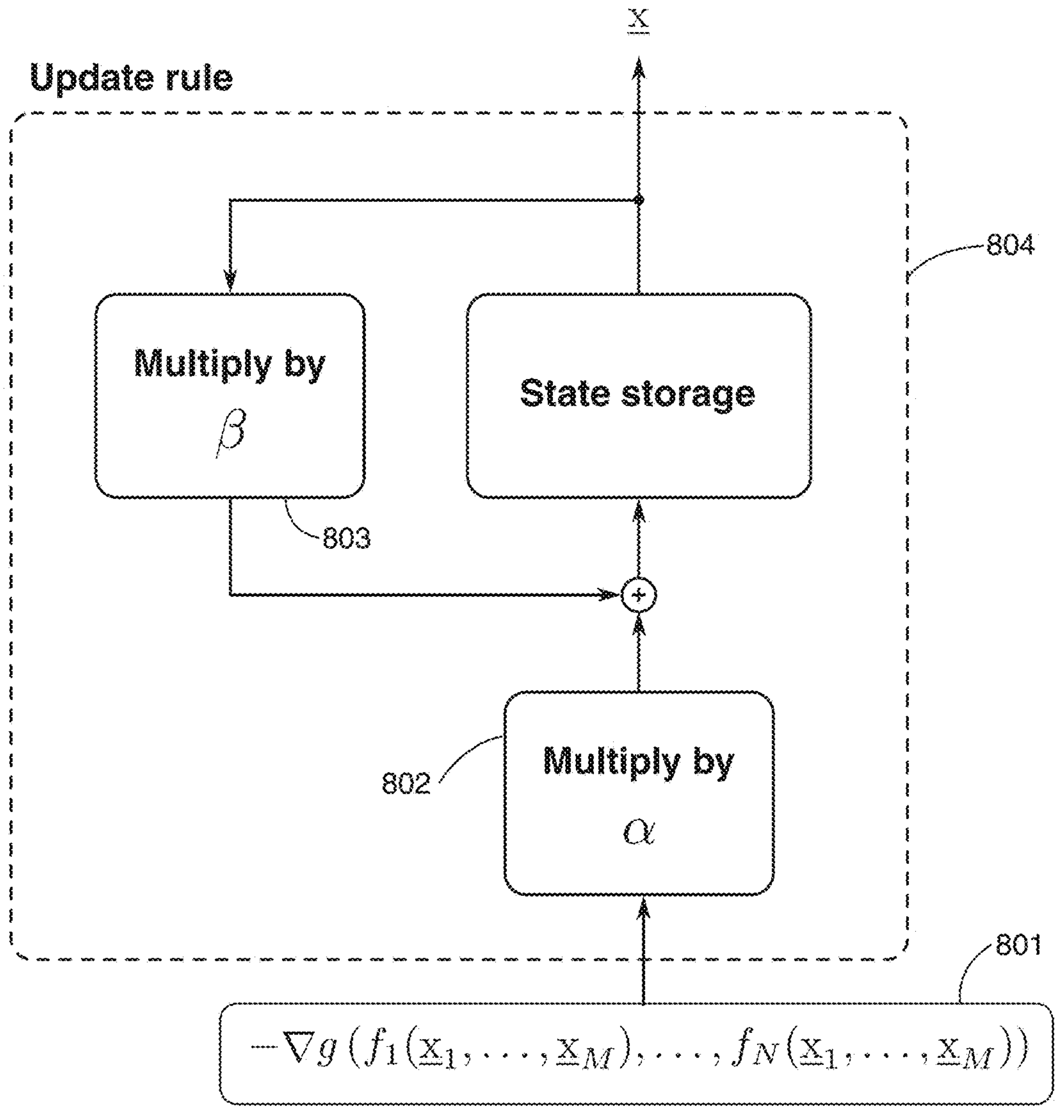
FIG. 8 illustrates an example of an update rule that may be used for generating one or more solutions to the optimization problem shown in FIG. 6, in accordance with some embodiments of the technology described herein.

FIG. 8 illustrates an example of an update rule 804 that may be used as part of the gradient-based technique of FIG. 7 in some embodiments. The upper and lower bounds $u_k$ and $l_k$ shown in FIG. 6, which constrain the target patterns $x_k$, may be enforced by the update rule 804 by beginning with a set of variables $x_k$ 801 that are known to meet the constraints, and dynamically selecting values $\alpha$ 802 and $\beta$ 803 that result in a state evolution always satisfying these constraints.

FIG. 9 shows another optimization problem 900 that may solved as part of generating patterns for printing on one or more layers of a light field print, in accordance with some embodiments of the technology described herein. The optimization problem 900 may be obtained by replacing the upper and lower bounds in the optimization problem 600 by penalty terms in the cost function. The penalty terms would be selected so that the constraints are met as the state evolves or as the system reaches steady-state. In the illustrative optimization problem 900, the penalty terms are the penalty functions $p_k(x_k)$.

Figure 10:
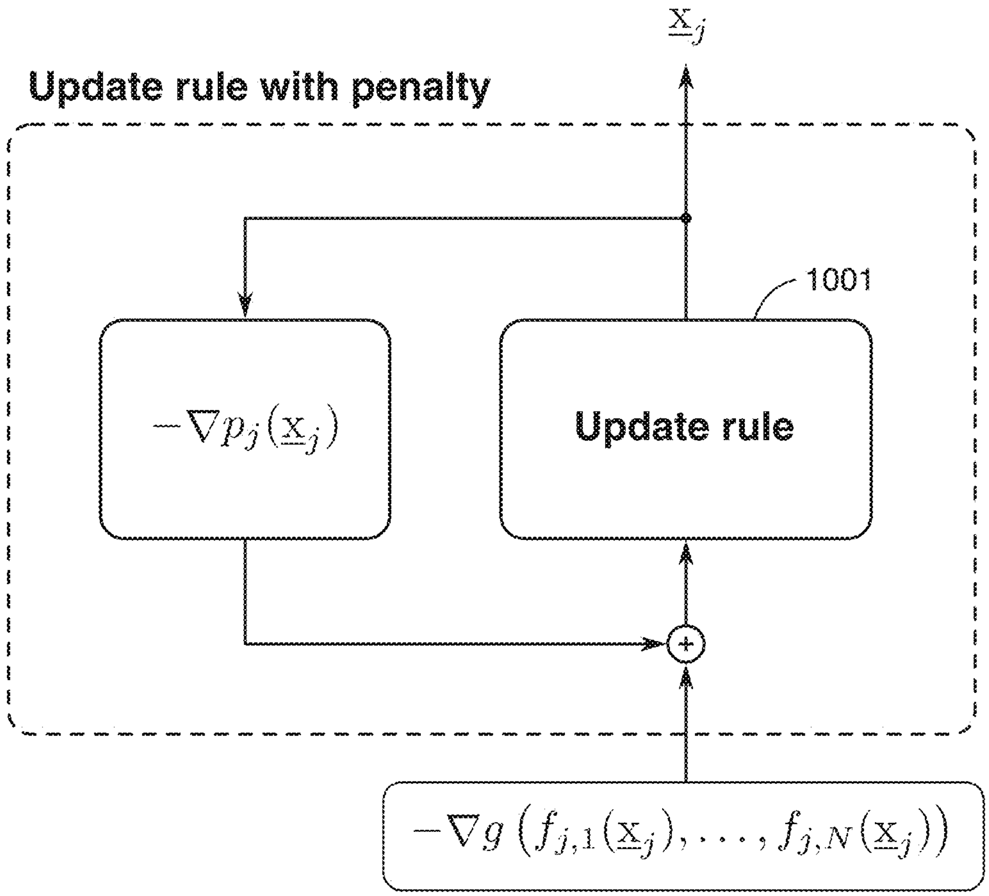
FIG. 10 illustrates aspects of a gradient descent technique for generating one or more solutions to the optimization problem shown in FIG. 9, in accordance with some embodiments of the technology described herein.

In some embodiments, the optimization problem 900 may be solved by a gradient-based iterative technique illustrated in FIG. 10. As shown in FIG. 10, this technique makes use of an update rule 1001 and incorporates a gradient of the penalty term. The update rule 1001 may be any suitable update rule and, for example, may be the update rule 804 shown in FIG. 8.

Still referring to FIG. 10, the following defines our notation for the functions $f_{j,k}(\ldots)$:

$$f_{j,k}(x_j)=f_k(\ldots, x_j, \ldots)$$

Accordingly, each $f_{j,k}(\ldots)$ is defined as being that function obtained by beginning with $f_k(\ldots)$ and holding all but the argument in position j fixed. The particular fixed values of those variables not in position j would retain the previously-defined values of those variables, as defined elsewhere within the global problem scope. This definition is used without loss of generality and facilitates discussion in the following section.

In some embodiments, the processing required for determining values of the target patterns by solving one or more optimization problems (e.g., by finding an exact or an approximate solution) may be performed in a distributed manner by multiple computing devices. Discussed below are techniques, developed by the inventors, in which the optimization algorithms developed by the inventors may be distributed, in some embodiments. The topology of the distributed hardware and software is implied by these descriptions.

In some embodiments, an optimization problem (e.g., such as optimization problems 600 and 900) may be "partitioned" (that is, a technique for solving the optimization problem may be designed in a way that facilitates its implementation in a distributed environment) by holding a subset of the target patterns $x_k$ constant and performing some number of iterations to optimizing the values of remaining subset of target patterns. After this point, a different subset of the target patterns $x_k$ may be selected, and the process would be repeated until desired values for the target patterns are obtained.

FIG. 11 illustrates an optimization problem 1100 formulated so as to facilitate the distribution implementation of a gradient-based iterative optimization technique for solving the optimization problem 600. In some embodiments, a solution (exact or approximate—finding the global or a local minimum) of the optimization problem 600 may be obtained by sequentially updating each of the actuation signals as shown in Table 1.

TABLE 1

| Iterative technique for identifying a solution to optimization problem 600. |
|---|
| 1. Choose j = 1. |
| 2. Select initial values $x_j$ consistent with the upper and lower constraints listed in FIG. 6. |
| 3. Find a global or local minimum of the optimization problem listed in FIG. 11 using any of the techniques described herein, or compute a finite number of iteration steps toward an acceptable solution. The obtained value of $x_j$ would be used implicitly by all other functions $f_{j,k}(x_j)$ until the value of $x_j$ is otherwise re-defined. |
| 4. Choose the next integer value of j between 1 and M, returning eventually from M to 1. |
| 5. Go to step 3. |

Figure 12:
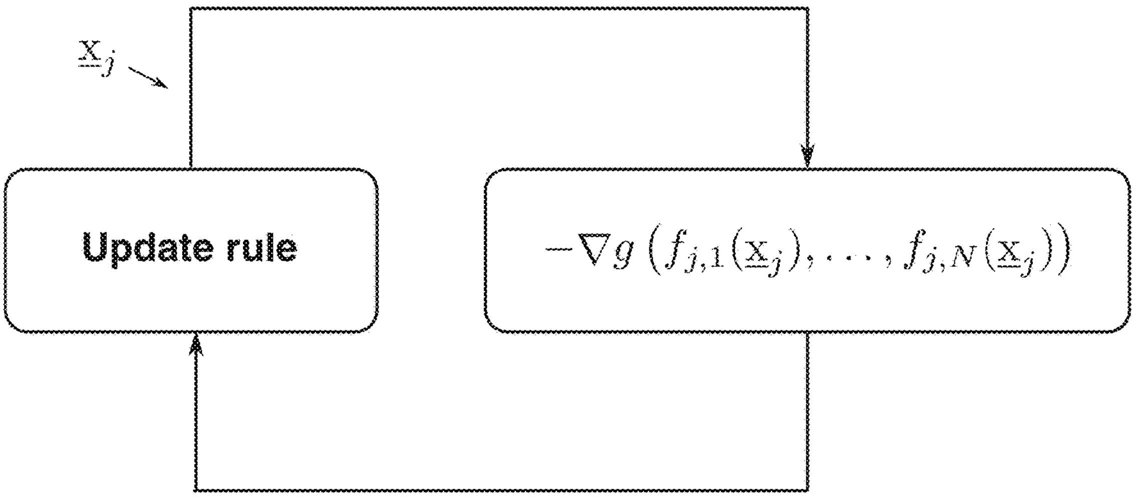
FIG. 12 illustrates aspects of a gradient descent technique for generating one or more solutions to the optimization problem shown in FIG. 11, in accordance with some embodiments of the technology described herein.

An iterative gradient-based optimization algorithm that could be used, in some embodiments, to finding a local or global minimum of the optimization problem 1100 shown in FIG. 11, or alternatively that could be used in taking a finite number of iteration steps toward such a solution, is depicted schematically in FIG. 12.

Figure 13:
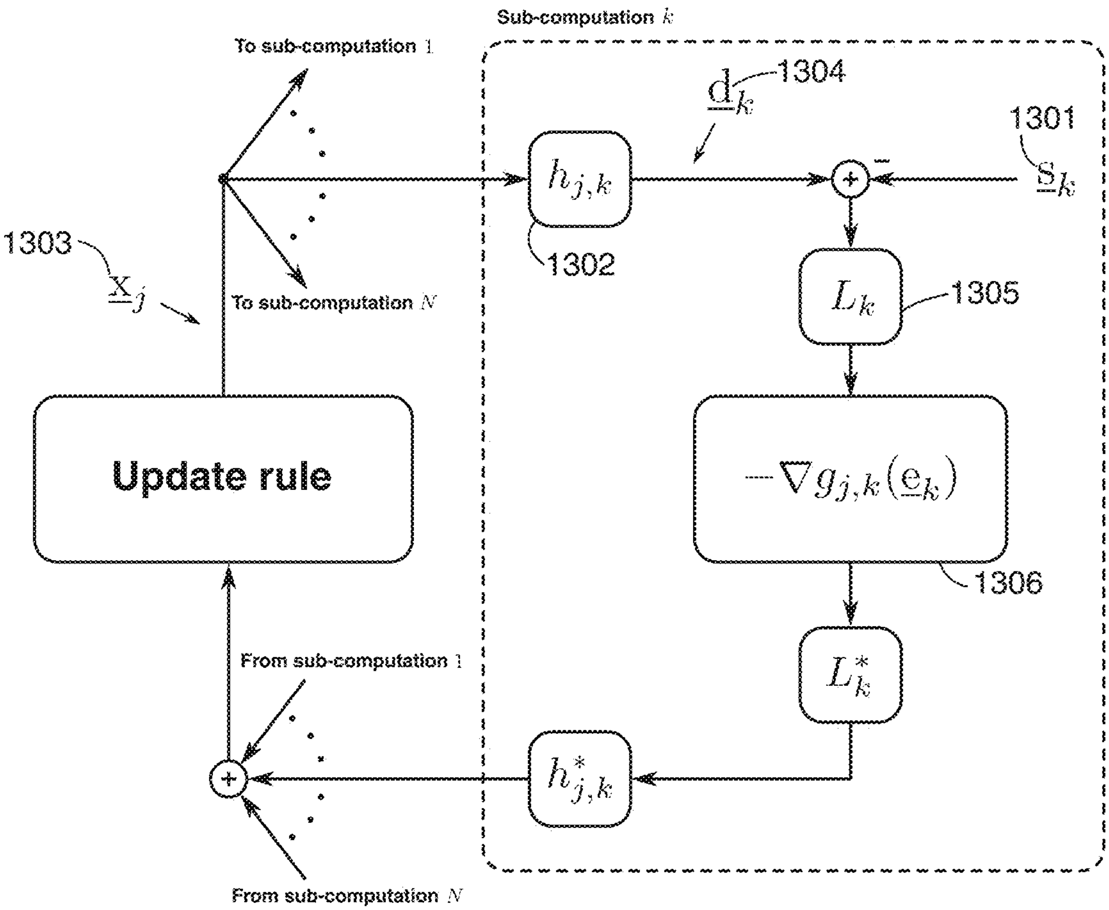
FIG. 13 illustrates aspects of another technique that may be used to generate one or more solutions to the optimization problem shown in FIG. 11, in accordance with some embodiments of the technology described herein.

In some embodiments, to further partition and distribute computation, additional mathematical structure in the formulation of the optimization problem 1100 may be utilized. For example, with reference to FIG. 11, selecting the functions $f_{j,k}(x_j)$ as $$f_{j,k}(x_j)=L_k(h_{j,k}(x_j)-s_k),$$

with each function $h_{j,k}(\ldots)$ and $L_k(\ldots)$ being a linear map, would result in the further decomposition of the optimization algorithm, as shown schematically in FIG. 13.

In FIG. 13, a superscript asterisk denotes the adjoint map, which in the case of matrices would reduce to the matrix transpose. Note that in this formulation, the variables $s_k$ 1301 may represent the scene views, the functions $h_{j,k}(\ldots)$ 1302 may represent the mappings from the target patterns $x_j$ 1303 to the display views $d_k$ 1304, and the functions $L_k(\ldots)$ 1305 may represent the linear maps implementing a blurring transformation (which, in some embodiments, may be realized explicitly as convolution with a blur kernel).

As shown in FIG. 13, the functions $g_{j,k}(e_k)$ (1306) are taken to individually sum to an overall cost term as listed in the optimization problem 1100 of FIG. 11, where:

$$g(e_1, \ldots e_N) = g_{j,1}(e_1) + \ldots + g_{j,N}(e_N)).$$

In this sense, the individual functions $g_{j,k}(e_k)$ may be linear or nonlinear penalty functions, whose gradients would be computed as depicted in FIG. 13. It is straightforward to show, for example, that choosing $g_{j,k}(e_k)=\|e_k\|_\gamma^\gamma$ would result in an algorithm where a local minimum of $\|g_{j,k}(e_k)\|_\gamma^\gamma$ is obtained, with indicating the $\gamma$-norm.

In some embodiments, quadratic penalty functions $g_{j,k}(e_k)$ may be employed. When the functions $g_{j,k}(e_k)=\|e_k\|_\gamma^\gamma$ are quadratic (e.g., $\gamma=2$) and if the intent is to enforce a lower bound on the target patterns $x_j$ corresponding to non-negativity, a multiplicative update rule may be used in some embodiments.

Figure 14:
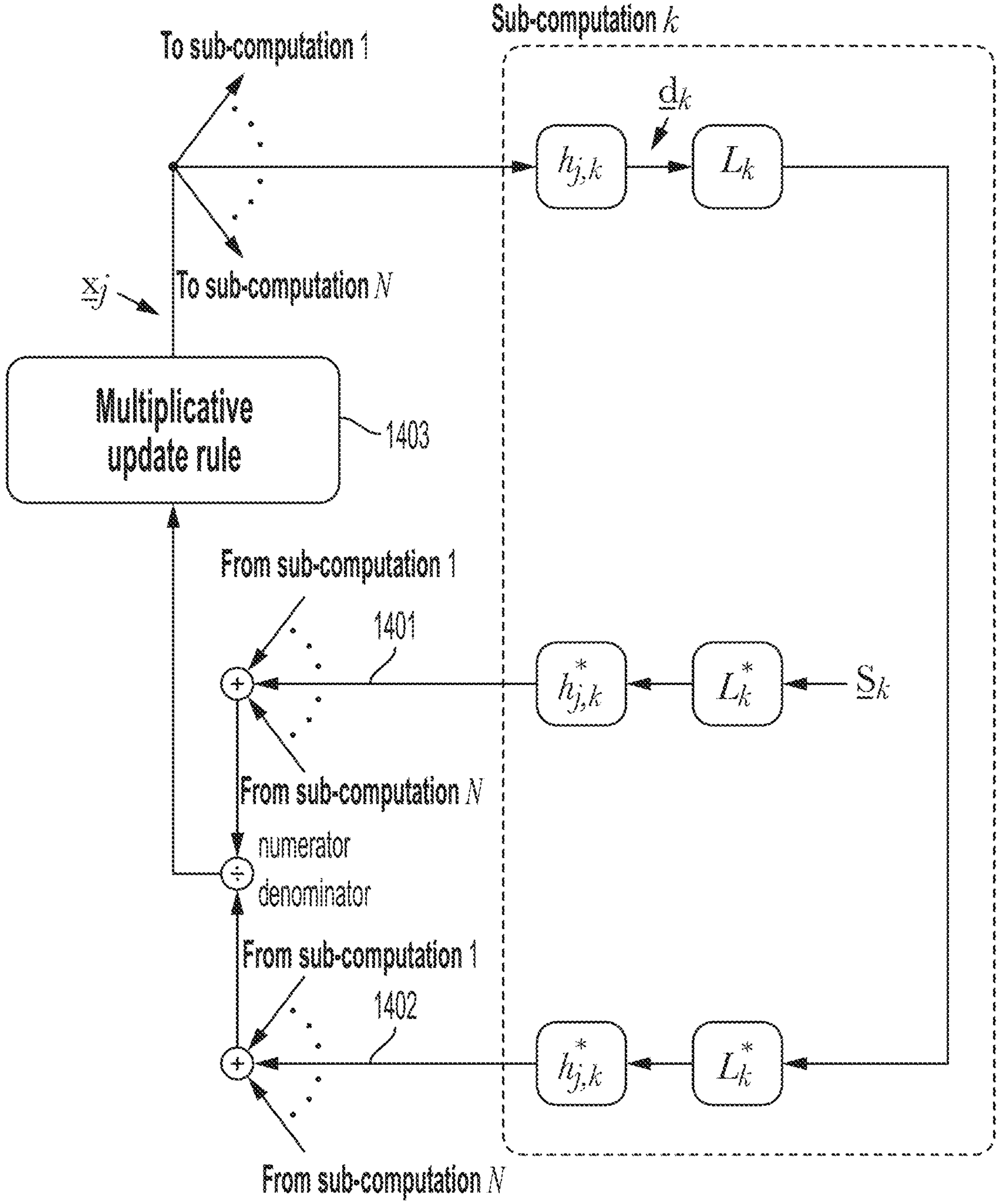
FIG. 14 illustrates aspects of a technique that may be used to generate one or more solutions to the optimization problem shown in FIG. 11 in which a multiplicative update rule enforcing non-negativity of the actuation signals is employed, in accordance with some embodiments of the technology described herein.
Figure 15:
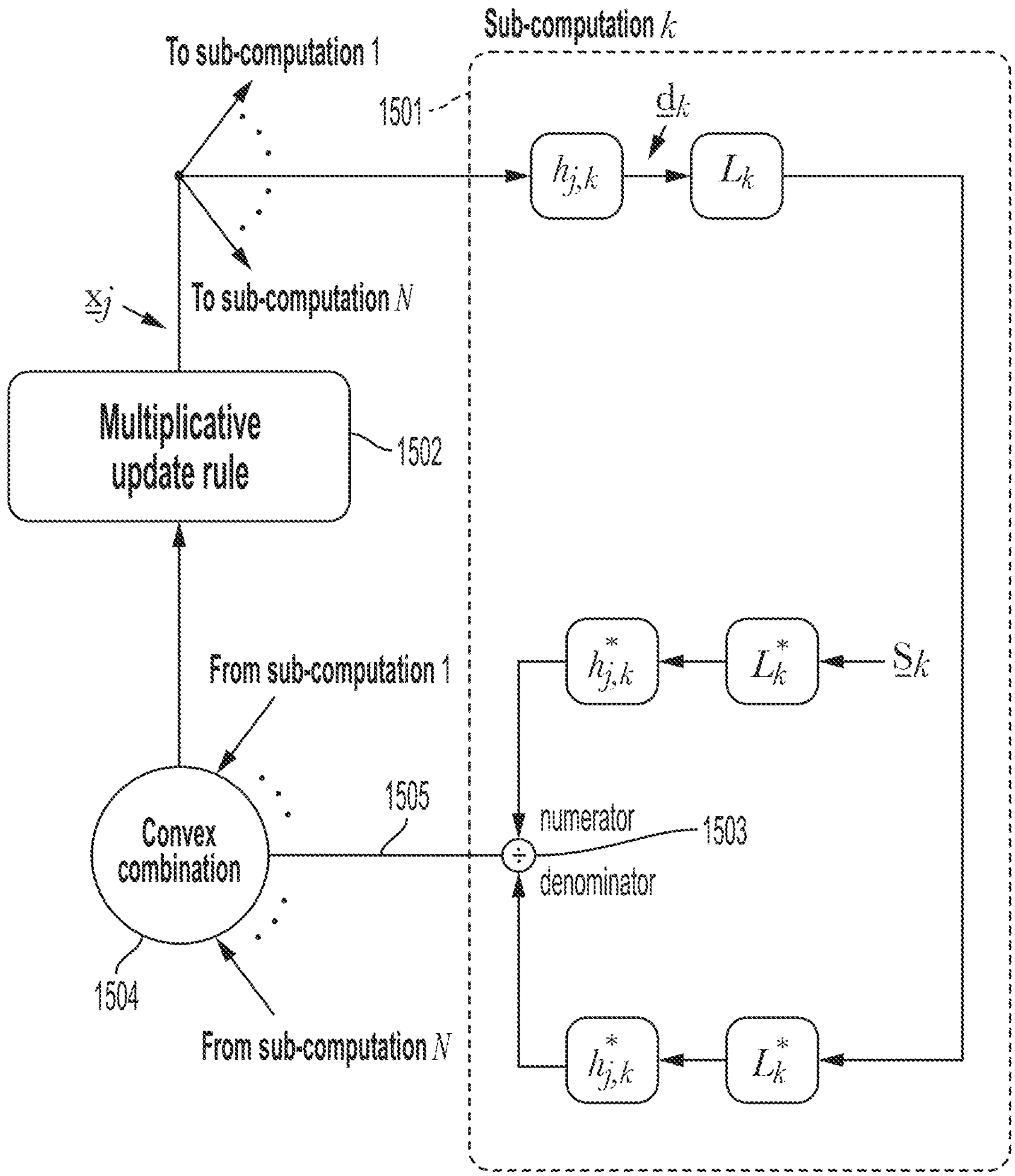
FIG. 15 illustrates aspects of another technique that may be used to generate one or more solutions to the optimization problem shown in FIG. 11 in which a multiplicative update rule enforcing non-negativity of the target signals is employed, in accordance with some embodiments of the technology described herein.

FIGS. 14 and 15 illustrate two techniques, which may be used in some embodiments, for finding a local or global minimum (or taking one or more steps toward such a solution) of the optimization problem 1100 shown in FIG. 11, utilizing a multiplicative update rule enforcing non-negativity of the target patterns $x_j$. As shown in FIG. 14, the numerator term 1401 and the denominator 1402 terms resulting from various sub-computations are combined additively and the individual sums are divided. As shown in FIG. 15, in each sub-computation 1501, a division 1503 among various signals is performed first, and a convex combination 1504 of the results of the individual sub-computations 1505 is taken, by way of example and not limitation, corresponding to a weighted average with the weights being nonnegative and summing to 1. A general form of the multiplicative update rules 1403 and 1502 utilized in FIGS. 14 and 15, respectively, is depicted schematically in FIG. 16.

Figure 16:
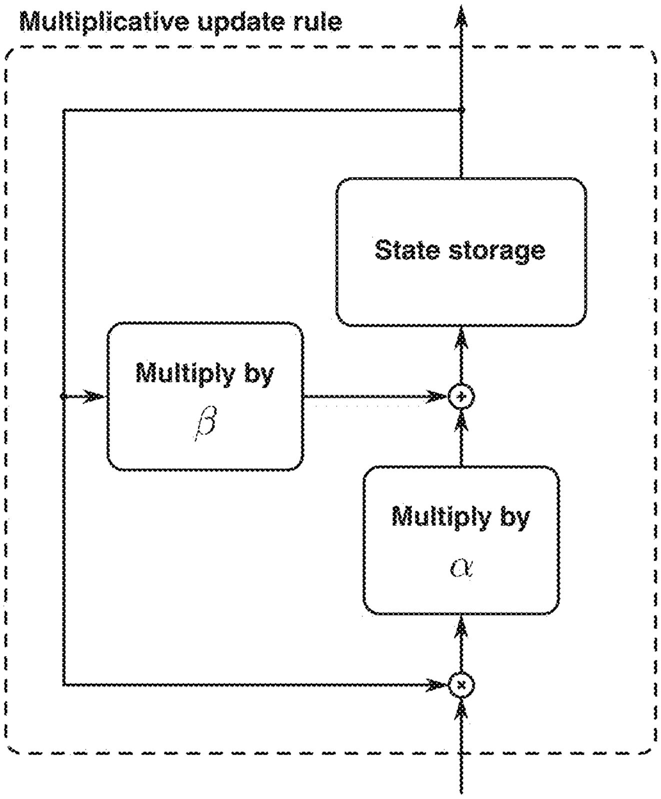
FIG. 16 further illustrates the multiplicative update rule shown in FIGS. 14 and 15, in accordance with some embodiments of the technology described herein.

Additional aspects of the FIGS. 5-16 may be appreciated through the following further explanation of certain diagram notations used therein. Arrows may represent the direction of signal flow with time. Signal flow may correspond to the synchronous or asynchronous passing of variables, which may generally take scalar values, or vector values denoting for example the flow of image data or collections of image data. The circled + symbol indicates generally vector addition or subtraction of input signals (e.g., as shown in FIG. 5). For any inputs to a circled + symbol having negative signs written at the input, these input signals are negated. After possible negation, all signals are summed to form the output signal. A dot on a signal line indicates signal duplication (e.g., as indicated after the output of "State storage" in FIG. 8). The symbol $\nabla$ denotes the gradient of a function (e.g., in FIG. 13 the square block that contains this symbol refers to applying the negative of the gradient of the functional $g_{j,k}(\ldots)$ to the signal $e_k$, which is the input to that block). In FIGS. 14 and 15, the circled ÷ symbol indicates element-wise division of generally vector-valued signals and the boxed symbols indicate application of the labeled linear map to the associated input signal. In FIG. 16, the circled x symbol indicates element-wise multiplication of generally vector-valued signals.

Table 2 illustrates pseudo-code that describes aspects of an iterative gradient-based optimization technique may be used to obtain a local or a global solution to an optimization problem in order to generate values for target patterns, in accordance with some embodiments.

TABLE 2

Pseudo-code describing aspects of an iterative gradient-based optimization technique for generating target patterns, in accordance with some embodiments.

0. (Initialize)
We denote the target pattern for a first layer as $x_1$ and the target pattern for a second layer as $x_2$. Each target pattern has a corresponding lower bound vector $l_i$ and upper bound vector $u_i$. Perform the following initialization:
  a. Initialize the elements of $x_1$ to a value greater than 0 for which $l_1 \le x_1 \le u_1$.
  b. Initialize the elements of $x_2$ to a value greater than 0 for which $l_2 \le x_2 \le u_2$.
1. (Compute gradient step for a first layer)
For each view image, indexed $k = 1, \ldots, N$:
  a. Compute view k of current display state, denoted $d_k$. The view of the display state $d_k$ will generally depend on the target patterns $x_1$ and $x_2$.
  b. Compute corresponding view k of scene, denoted $s_k$.
  c. Compute error view as $e_k = BL_s(s_k) - BL_d(d_k)$. The functions $BL_s$ and $BL_d$ are band-limiting transformations as discussed above.
  d. Compute the gradient step contribution $q_k^{(1)}$ due to view kas:
  $q_k^{(1)} = \alpha\ [PROJ^{(k)}_{v_k \to x_1}(BL^*_d(e_k))] * [PROJ^{(k)}_{x_2 \to x_1}(x_2)]$.
  Referring to this equation:
    (1) $PROJ^{(k)}_{x_2 \to x_1}(x_2)$ denotes the perspective projection of $x_2$ from the coordinate system of a second layer to the coordinate system of a first layer, with the camera center for the projection being the location of viewpoint k.
    (2) $BL^*_d$ denotes the adjoint operator corresponding to the band-limiting transform $BL_d$.
    (3) $PROJ^{(k)}_{v_k \to x_1}(BL^*_d(e_k))$ denotes the perspective projection of $BL^*_d(e_k)$ from the coordinate system of error view k to the coordinate system of a first layer, with the camera center for the projection being located at viewpoint k.
    (4) The symbol * denotes element-wise multiplication.
    (5) The variable $\alpha$ denotes the step size.
2. (Update target pattern for a first layer)
  a. Perform the following assignment:

$$x_1 := x_1 + \sum_{k=1}^{N} q_k^{(1)}$$

b. Enforce equality constraints, hard-limiting $x_1$ to fall in the range $l_1 \le x_1 \le u_1$.
3. (First layer loop) Go to step 1, and loop some finite number of times.
4. (Compute gradients for a second layer)
For each view image, indexed $k = 1, \ldots, N$:
  e. Compute view k of current display state, denoted $d_k$. The view of the display state $d_k$ will generally depend on the target patterns $x_1$ and $x_2$.
  f. Compute corresponding view k of scene, denoted $s_k$.
  g. Compute error view as $e_k = BL_s(s_k) - BL_d(d_k)$. The functions $BL_s$ and $BL_d$ are band-limiting transformations as discussed above.
  h. Compute the gradient step contribution $q_k^{(2)}$ due to view kas:
  $q_k^{(2)} = \alpha\ [PROJ^{(k)}_{v_k \to x_2}(BL^*_d(e_k))] * [PROJ^{(k)}_{x_1 \to x_2}(x_2)]$.
  Referring to this equation:
    (1) $PROJ^{(k)}_{x_1 \to x_2}(x_1)$ denotes the perspective projection of $x_1$ from the coordinate system of a first layer to the coordinate system of a second layer, with the camera center for the projection being the location of viewpoint k.
    (2) $BL^*_d$ denotes the adjoint operator corresponding to the band-limiting transform $BL_d$.
    (3) $PROJ^{(k)}_{v_k \to x_2}(BL^*_d(e_k))$ denotes the perspective projection of $BL^*_d(e_k)$ from the coordinate system of error view k to the coordinate system of a second layer, with the camera center for the projection being located at viewpoint k.
    (4) The symbol * denotes element-wise multiplication.
    (5) The variable $\alpha$ denotes the step size.

TABLE 2-continued

| Pseudo-code describing aspects of an iterative gradient-based optimization technique for generating target patterns, in accordance with some embodiments. |
|---|
| 5. (Update target pattern for a second layer)<br>a. Perform the following assignment:<br>$$x_2 := x_2 + \sum_{k=1}^{N} q_k^{(2)}$$<br>b. Enforce equality constraints, hard-limiting $x_2$ to fall in the range $l_2 \le x_2 \le u_2$.<br>6. (Second layer loop) Go to step 4, and loop some finite number of times.<br>7. (Overall loop) Go to step 1, and loop the overall iteration some finite number of times until completion. |

Figure 17:
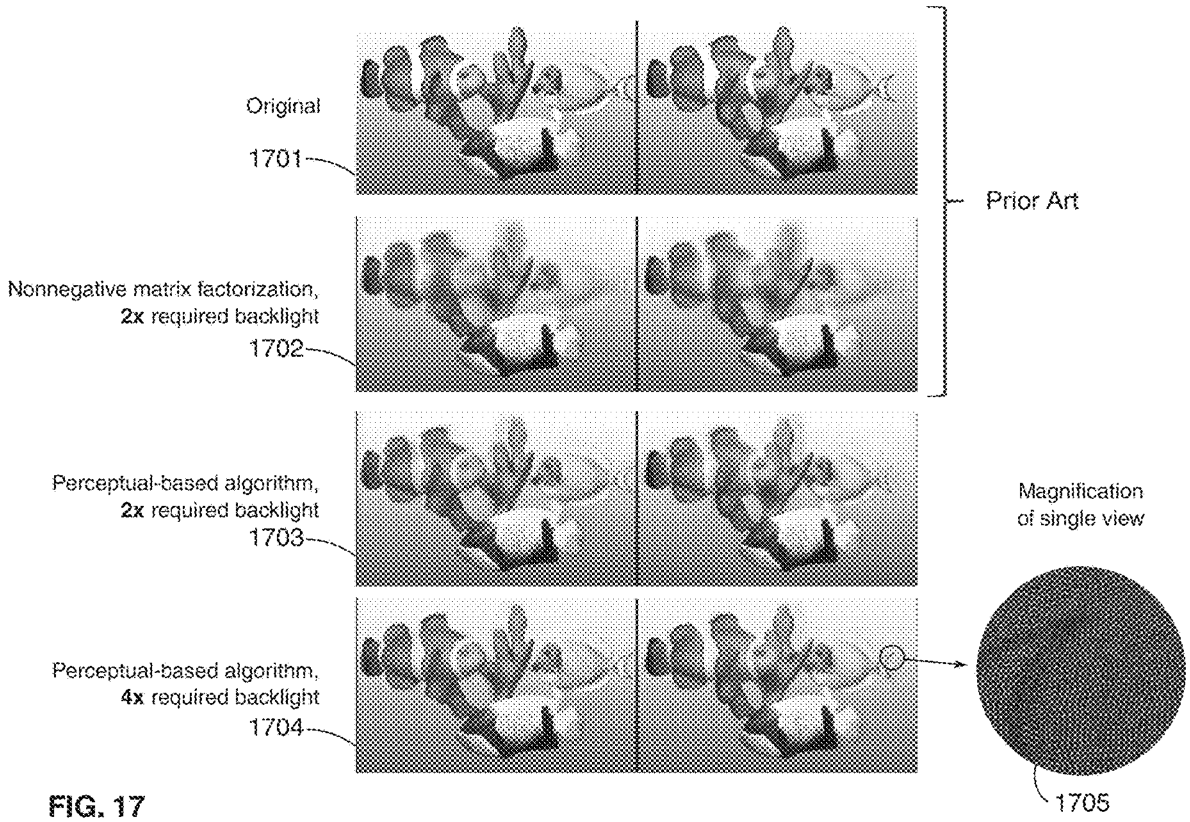
FIG. 17 illustrates simulated views generated by a multi-view display, such as a light field print, in accordance with some embodiments of the technology described herein.

FIG. 17 illustrates simulated views generated by a multi-view display in accordance with some embodiments of the technology described herein. Images 1701 show two views of a multi-view light field image comprising 15 views, which 15 views are specified as the input to all compared methods. Images 1702 show the results from running methods previously known to those skilled in the art which utilize nonnegative matrix factorization (NMF), or methods that reduce to NMF in the case of two layers. Images 1703 and 1704 show the performance achieved by some using techniques described herein, which utilize a perceptually-inspired cost function taking advantage of finite view bandwidth. Shown in 1703 and 1704 are simulations of two extreme views along the horizontal parallax direction of a 3×5 (15 view) light field with 10 degree horizontal FOV, presented on a simulated 47 cm×30 cm, two-layer display with a layer separation of 1.44 cm, at a viewer distance of 237 cm. Images 1703 and 1704 compare the performance of one embodiment of the disclosed methods as the scene brightness is varied. Light field data and display configuration were obtained from [G. Wetzstein. Synthetic Light Field Archive. http://web.media.mit.edu/~gordonw/SyntheticLightFields/. Accessed Aug. 12, 2015.]. For each approach 1702-1704, the required increase in display backlight brightness is listed, indicating that a large increase in backlight efficiency can be achieved as compared to a conventional barrier-based parallax display. Note that all presented results show performance for single-frame, non-time-multiplexed displays, in contrast to time multiplexed work that has been previously demonstrated. Depicted results are filtered to simulate observation by the human visual system, excluding magnified detail view 1705.

In the context of light field prints, the above comparison indicates that a thicker substrate would be required to generate light field prints using non-negative matrix factorization techniques, whereas the techniques described herein for generating target patterns enable manufacturing light field prints using thinner substrates used by existing industrial printers. Indeed, the improved performance of the techniques described herein is an enabling innovation in the area of light field printing. The thickness of the substrate required to achieve acceptable visual quality with previously published methods is prohibitive for high-volume industrial printing. By achieving higher visual quality with thinner substrates it becomes possible to create light field prints using the existing install-base of industrial printers, which is both economically and technically advantageous.

Figure 18:
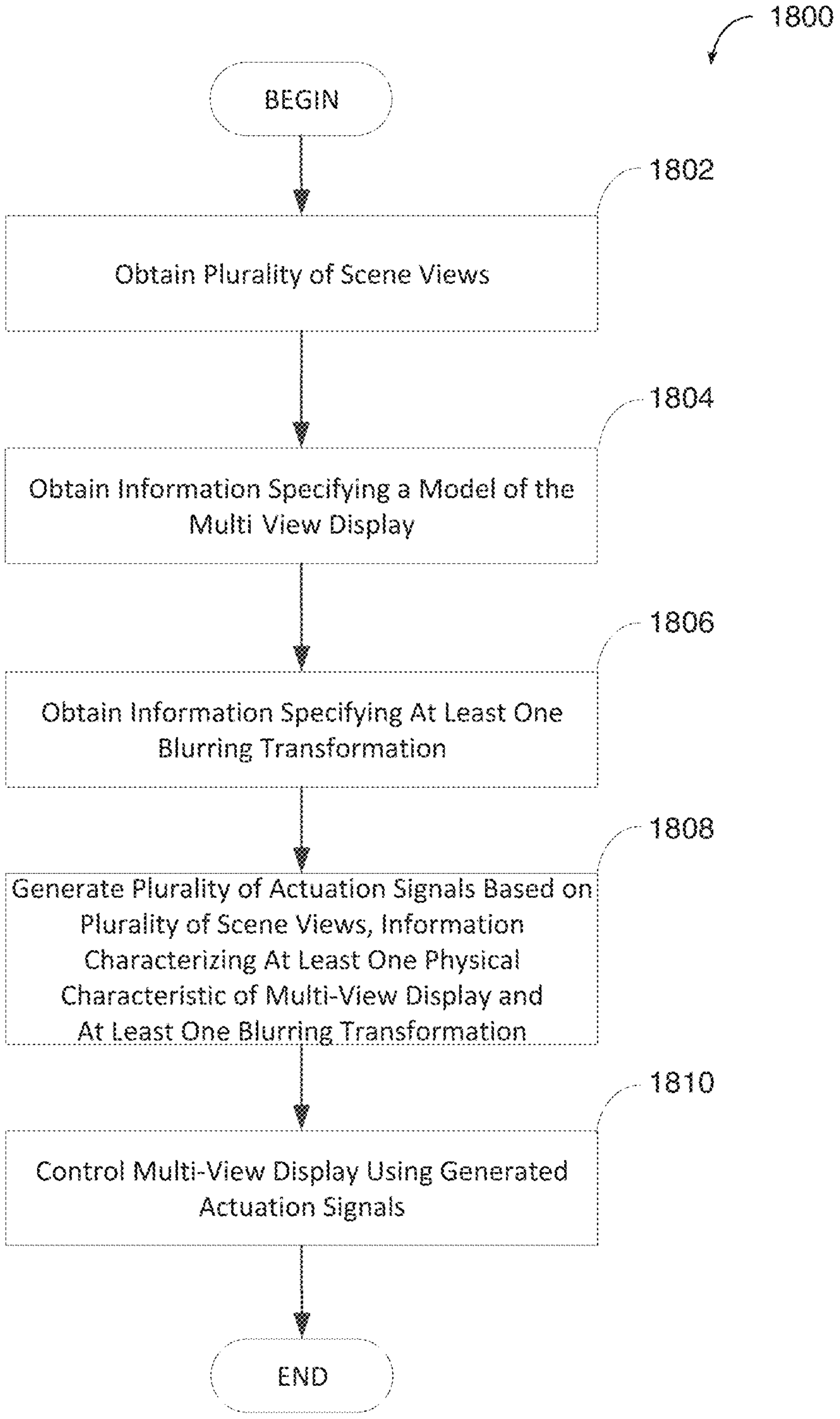
FIG. 18 is a flowchart of an illustrative process 1800 for generating actuation signals to control optical behavior of a multi-view display apparatus in accordance with some embodiments of the technology described herein.

FIG. 18 is a flowchart of an illustrative process 1800 for generating actuation signals to control optical behavior of a multi-view display apparatus, in accordance with some embodiments of the technology described herein. Process 1800 may be performed by any suitable device(s). For example, process 1800 may be performed by one or computing device(s) coupled to and/or part of the multi-view display. For example, process 1800 may be performed by computing device(s) 404 described with reference to FIG. 4A. As described herein, techniques for generating actuation signals for electronic displays may, in some embodiments, be employed for generating front and back target patterns for manufacturing light field prints.

Process 1800 begins at act 1802, where a plurality of scene views may be obtained. Each of the plurality of scene views may correspond to a location of a viewer of the multi-view display. The scene views may specify a desired light field to be generated by the multi-view display. As described herein, the scene views may be of a natural or a synthetic scene. Each scene view may comprise a grayscale and/or a color image of any suitable resolution for each of one or more (e.g., all) of the scene views. Any suitable number of scene views may be obtained at act 1802 (e.g., at least two, at least ten, at least fifty, at least 100, at least 500, between 2 and 1000, between 10 and 800, or in any other suitable combination of these ranges), as aspects of the technology provided herein are not limited in this respect.

In some embodiments, the scene views may be obtained by accessing and/or receiving one or more images from at least one image source (e.g., accessing stored images, receiving images from another application program or remote computing device). In some embodiments, the scene views may be obtained by first obtaining a description of a 3D scene (e.g., a 3D model of a scene) and then generating, as part of process 1800, the scene views based on the obtained description of the 3D scene.

Next, process 1800 proceeds to act 1804, where information specifying a model of the multi-view display may be obtained. This information may include any information about any physical characteristics of the multi-view display apparatus, which may influence the way in which the multi-view display generates images. The information obtained at act 1804 may include, for example, any of information 407 described with reference to FIG. 4A.

In some embodiments, the information obtained at act 1804 may include data specifying physical characteristics of the multi-view display numerically (e.g., using one or more values stored in one or more data structures of any suitable type) such that these data may be used to generate display views based on a set of actuation signals as part of an iterative optimization technique for identifying actuation signals (e.g., as described with reference to FIGS. 5-16). In some embodiments, the information obtained at act 1804 may be encoded in software code. The software code may also be used to generate display views based on a set of actuation signals as part of an iterative optimization technique for identifying actuation signals. In some embodiments, when such software code is executed it may be used to transform parameters (e.g., actuation signals, display views or other images, other variables) based on the physical characteristics embodied in the software code.

Next, process 1800 proceeds to act 1806, where information specifying at least one blurring transformation may be obtained. The information specifying the at least one blurring transformation may specify one or multiple blurring transformations and may include information of any suitable type including, for example, any of information 406 described with reference to FIG. 4A.

Next, process 1800 proceeds to act 1808, where a plurality of actuation signals may be generated based on the plurality of scene views obtained at act 1802, information specifying a model of the multi view display apparatus obtained at act 1804, and information specifying at least one blurring transformation obtained at act 1806. This may be done in any of the ways described herein and, for example, by using an iterative optimization techniques described with reference to FIGS. 5-16.

Next, process 1800 proceeds to act 1810, where the actuation signals generated at act 1808 may be used to control the multi-view display. This may be done in any suitable way. For example, in some embodiments, the generated actuation signals may be provided to electro-optical interface circuitry (e.g., circuitry 409 described with reference to FIG. 4A), and the electro-optical interface circuitry may drive the multi-view display based on the provided actuation signals. After act 1810, process 1800 completes.

It should be appreciated that the techniques described herein that use blurring transformations may be used in applications where the blurring transformation(s) do not relate to a perceptual effect (e.g., that of the human visual system) but rather relate to some band-limited effect in the medium receiving the light or other electromagnetic wave output from the display. In such applications, the light or electromagnetic wave emitted from the display may not be designed for consumption by a human eye, but rather by another physical medium or biological tissue. Non-limiting examples of such applications include:

- The use of band-limitedness in optimized displays for photolithography and stereolithography in 3D printing (e.g., where an optimized display may be used for emitting into a photosensitive resin). Here the band-limitedness would embody the lower limit on resolvable dot size in the resin.
- The use of band-limitedness in optimized displays for photographically exposing two-dimensional materials (e.g., used in a photogenic printing process or other photographic printing device). Here the band-limitedness would embody the lower limit on the resolvable dot size on the photographic medium.

Dot Gain Compensation

In some embodiments, the measured dot gain characteristics of a printing press may be used to generate patterns for printing on a substrate to form a light field print. However, in some embodiments, the measured dot gain characteristics may be used to post-process patterns after they are formed. This is termed dot gain compensation.

In some embodiments, assuming the linear convolution model described in the calibration section, dot gain compensation may be performed by: (1) creating a blurred representation of the data to be post processed; and (2) create the post-processed target patterns using the blurred representation. In some embodiments, the blurred representation may be created according to: $I_b=I*k_b$, where I is the image representing one layer of a light field print to be post-processed, k b is a blurring kernel of width b, and $I_b$ is the resulting blurred image after convolution. In some embodiments, the blurring kernel width may be estimated by printing one or more calibration patterns, as described herein. In some embodiments, the post-processed target pattern may be created using: $I_p=T_\alpha(I_b)$ where $T_\alpha(x)=\{1, x>\alpha, 0$ otherwise, where $I_p$ is the post-processed target pattern.

Printing

In some embodiments, a printing press may be used to print the front and back target patterns after they are generated. In some embodiments, the patterns may be printed "dot-for-dot" on the press. Many printing presses are configured to print in a mode intended for printing pre-screened data, or data that has already been binarized at the appropriate resolution for the printing press. In some embodiments, the generated target patterns may be delivered to a printing press using 1-bit TIFF format to take advantage of the capability of delivering pre-screened data to the printing press. In this format, it is possible to combine conventional print data that was screened for the press using a standard raster image processor (RIP) with light field print data that was effectively screened using light field optimization algorithms. This innovation allows light field printing to be easily integrated into the workflow already being used in the print industry.

In other embodiments, existing document standards such as PDF may be repurposed or new document standards may be defined to create an encapsulated data format specific to delivering the data necessary for light field printing to analog or digital printing presses or printers. Such a standard is considered a light-field-aware format. In some embodiments, the raster image processor for the printing press or platesetter may be manufactured with a specific mode capable of processing a light-field-aware document format that contains light field patterns. In said mode, the raster image processor processing the light-field-aware document format will not perform additional dithering or color management steps on the portion of the document containing patterns intended to represent a light field print. Such a format may advantageously verify the data integrity of the light field data, for example, ensuring that it is binary data and is not a continuous tone image.

Some printing presses or platesetters in common use today, though not capable of processing light-field-aware document formats, are capable of processing a PDF file with Device CMYK and/or spot color specifications, such that at least some colors represented in the document bypass the normal color processing performed by a raster image processor. The inventors, appreciating that it is desirable and advantageous to combine conventional one or two sided printed content with computed light field patterns in the same document, have recognized that it is possible to use said PDF documents to achieve this effect. This allows the workflows currently in use today to be repurposed to create light field prints without the need to effect software or hardware changes to the presses or processing equipment currently in use.

Accordingly, in some embodiments, 2D printed content and light field print patterns may be combined and send to a printing press. This may be achieved, in some embodiments, as follows: (1) calibrating the printing press for printing in accordance with the techniques described herein; (2) generating a target patterns in accordance with the techniques described herein; (3) obtaining additional 2D content to be printed on the document; (4) dithering with appropriate color management said 2D content to be printed; and (5) combining the dithered 2D content and light file content in one or more Device CMYK PDF files.

In some embodiments, data formats other than the Device CMYK PDF file format may be used to indicate to a raster image processor that data should bypass color management or other processing part of the printing process (e.g., for a printing press or other printing device). In some embodiments, it may be desirable for the existing raster image processor perform color management on some regions of the data representing two-dimensional (2D) and/or other non-angularly-varying content. In this case, the color channels representing the light field content may be specified as spot colors in any number of document formats, including PDF, and the data to be color managed by the raster image processor may be specified as a continuous tone image in the same document.

Further Description of Layered Light Field Display Arrangements

Further aspects of techniques for rapid, robust, and precise manufacturing of light field prints are described in this section.

Figure 19:
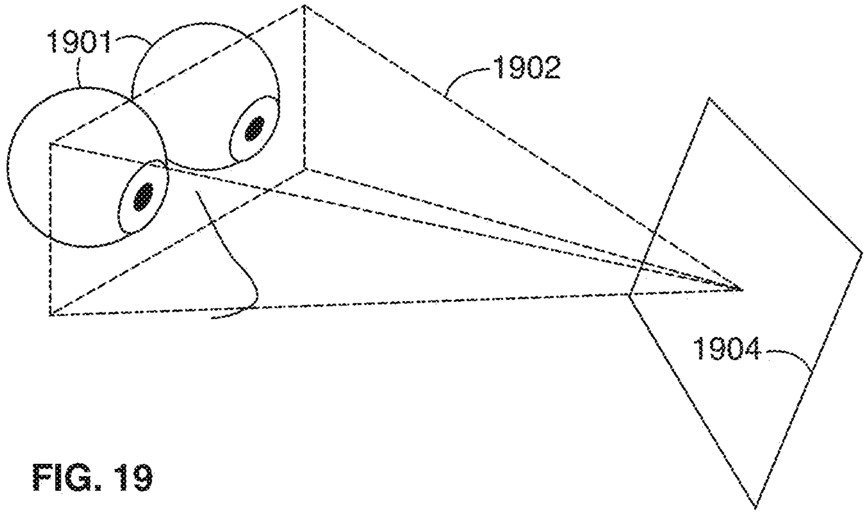
FIG. 19 illustrates a view cone for a viewer observing a multi-view display, in accordance with some embodiments of the technology described herein.

In an example illustrated in FIG. 19, a viewer 1901 may be observing a light field print 1904 implemented in accordance with some embodiments. In the pictured embodiment a single view frustum 1902 (also described as a view cone) denotes the angular region in which viewers may view a 3D scene.

Figure 20:
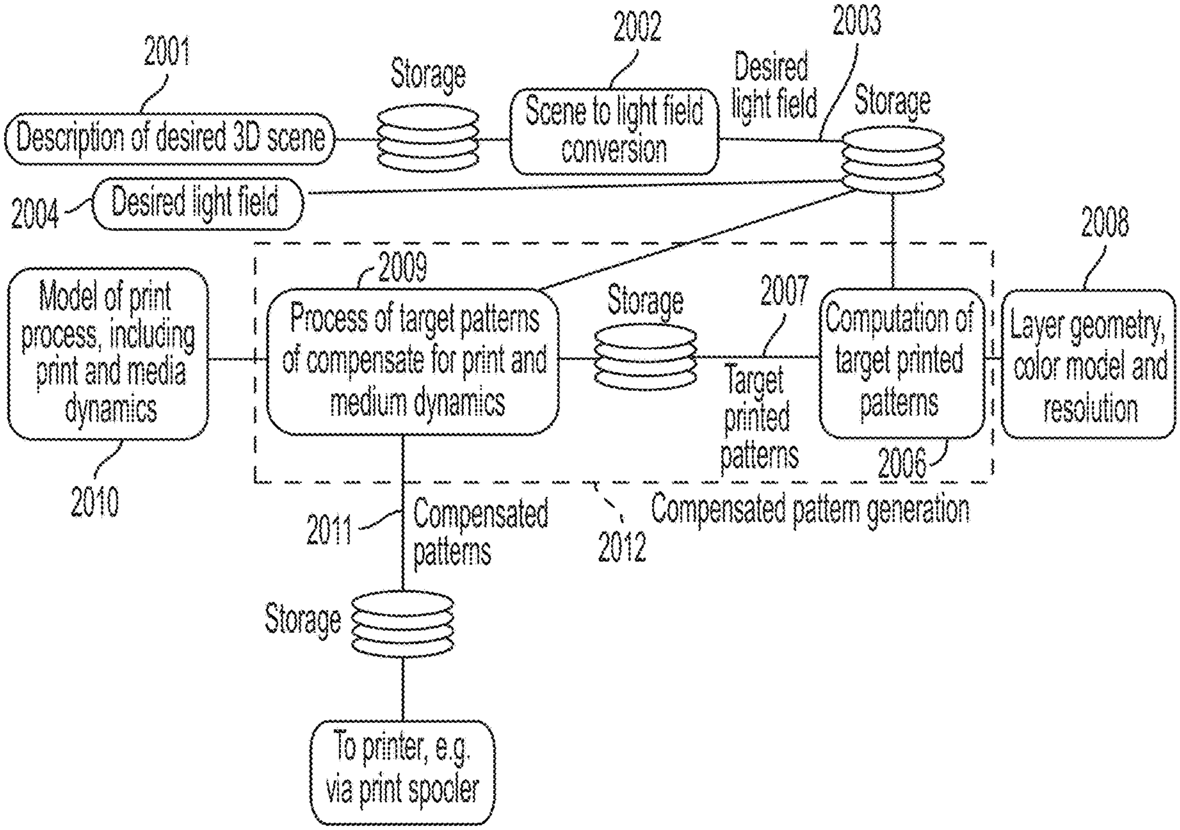
FIG. 20 shows another illustrative system for generating patterns to be printed on layers of a light field print and printing the generated patterns on the layers of the light field print, in accordance with some embodiments of the technology described herein.

FIG. 20 shows an illustrative system 2000 for generating patterns to be printed on layers of a light field print and printing the generated patterns on the layers of the light field print, in accordance with some embodiments of the technology described herein. In FIG. 20, lines indicate the path of data through the system, and storage indicates parts of said data path where data may be stored. In some embodiments, the storage locations may be bypassed.

The input into the system pictured in FIG. 20 may comprise any one of a number of formats. In one embodiment, input 2001 may comprise a plurality of 2D views of a 3D scene, in some cases referred to as a light field. In some embodiments, input 2001 comprises a scene description including, but not limited to, geometry or texture information. In embodiments in which a scene description comprises the input, the input may be converted 2002 to a light field representation, comprising a plurality images representing views of the described scene 2003. When the input is already a plurality of images representing scene views 2004, the conversion step 2002 may be bypassed. In block 2006, the desired light field representation 2005 may be used to compute the target patterns 2007 for printing onto layers to be assembled into a light field print using any of the techniques described herein.

In some embodiments, geometry, color model, and resolution information 2008 may be incorporated into the computation of the target patterns 2007. In some embodiments, one or more of the characteristics of a printing press may be incorporated into the computation of the target patterns 2007. In some embodiments, the target patterns 2007 may be processed at act 2009 to compensate for properties of the printing process. Such properties may include, for example, physical properties of the medium, physical properties of the print process, dynamic properties of the print process, and fluid dynamic properties of the printer ink, and/or physical properties of printer toner. In some embodiments, processing 2009 incorporates a physical model of the properties to be compensated 2010. In some embodiments, computation blocks 2009 and 2002 may be combined into unified computational system or method 2012. The compensated patterns 2011 may be sent to a printing press, a printer, or print spooler, or otherwise reproduced in print.

In some embodiments, computation block 2002 generates a representation of a light field from a scene description, which scene description may comprise a 3D scene represented, for example, as a CAD file, a depth map, the OBJ file format, Collada file format 3D Studio file format, three.js JSON file format, or scene meant for ray tracing such as a POV-Ray scene or Nvidia Optix program. The resulting desired light field 2003 may be generated using any of numerous rendering techniques. For example, said rendering techniques may comprise a virtual multi-camera rendering rig to render an plurality of off-axis images from different perspectives, GPU shader-based rendering techniques, and/or ray-tracing techniques.

The light field generated by 2002 may be encoded in various formats. For example, the light field may be encoded as an ensemble of images corresponding to various desired views of the scene. In this representation, each pixel value corresponds to the desired color and/or intensity of a light ray to be emitted from a specific location and at a specific angle on the display surface. The importance of the particular light ray may also be encoded. In some embodiments, said encoding may be used to weight the error function used in the downstream processing 2006.

Several methods may be used for computing target patterns for printing 2006. In some embodiments, target patterns are computed for one printed layer that is monochrome and a second printer layer that is color. In some embodiments, target patterns that are binary in each ink channel may be computed. For example, the patterns may comprise binary Cyan, binary Magenta, binary Yellow, binary black (CMYK) channels. Similar considerations may also be made for other color combinations and ink sets, including without limitation light inks such as light black, light cyan, and light magenta, spot color inks, and inks intended to extend the color gamut of the printer. The computation of binary patterns may be done, for example, by introducing appropriate regularization into the computational methods used to compute the target patterns in accordance with the techniques described herein (e.g., using the techniques described in FIG. 5-16) disclosed herein. In some embodiments, patterns may be computed by operating on sub-blocks of the target patterns, and combining said sub-blocks to obtain the target patterns. In some embodiments, said sub-blocks may use associated partitions of the target light field. For example, the block processing may be done on each iteration of any iterative method for performing the computation.

Some embodiments may include techniques for compensate for print and medium dynamics in printing patterns for printed multi-view displays. The goal of said compensation is to obtain a compensated pattern from a target pattern, where said compensated pattern has been corrected for print and medium dynamics. For example, the compensated pattern may be corrected for any one or more (e.g., all) of ink bleed, dot gain, and the maximum allowable ink density of the print medium.

Techniques for compensating for dot gain in creating light field prints include, for example, linear spatial filtering of the target pattern such as Gaussian blur filtering, followed by an intensity threshold operation and/or the use of morphological processing methods. Prior to employing these techniques, the target patterns may be spatially upsampled. Dot gain compensation methods used in creating light field prints may be applied to individual color channels or to multiple channels jointly. The output patterns generated by dot gain compensation processing may be referred to as intermediate patterns.

Techniques for ink density compensation in creating light field prints include, but are not limited to, applying a structured pattern to the intermediate patterns, whereby a select number of individual pixels are eliminated so that ink, toner, dye, or other media, is not deposited on the medium at the locations of the eliminated pixels. In some embodiments, the choice of which pixels to eliminate may depend on the patterns upstream in the processing. In other embodiments, that choice may be independent of the patterns upstream in the processing. The result of ink density compensation, in some embodiments obtained by processing the intermediate patterns, becomes the compensated patterns utilized downstream in the printing.

Figure 21A:
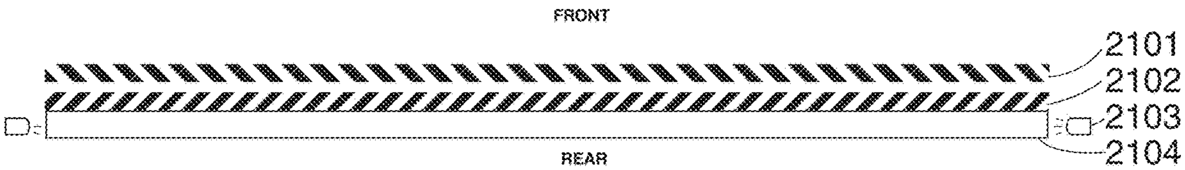
FIGS. 21A and 21B show illustrative examples of a light field print, manufactured in accordance with some embodiments of the technology described herein.
Figure 21B:
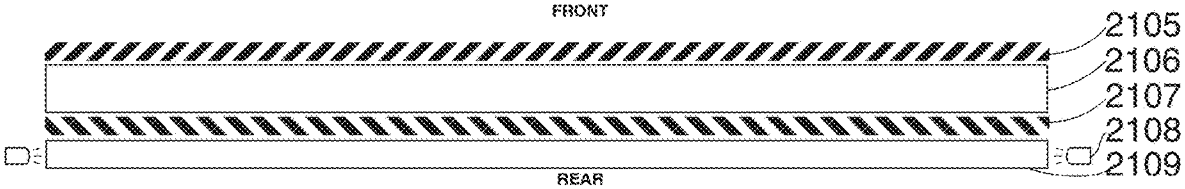

FIGS. 21A and 21B shows an illustrative example of a light field print, manufactured in accordance with some embodiments of the technology described herein. The light field print in FIG. 21A comprises a front printed layer 2101 sitting directly atop, so as to be in contact with, a rear printed layer 2102. The layers are lit by a backlight unit comprising lamps, including without limitation LEDs 2103 and a light guide 2104.

FIG. 21B illustrates a light field print comprising a front printed layer 2105, separated from a rear printed layer 2107 by a transparent spacer 2106. This embodiment can also be illuminated by a backlight identical in construction to that illustrated in FIG. 21A, comprising lamps 2108 and light guide 2109.

In some embodiments, the ink or emulsion may be on the front-facing surface of the printed layers 2101, 2102, 2105 and 2107. In some embodiments, the ink or emulsion may be on the rear-facing surface of the layer. In some embodiments, the entire layer may be a selectively transparent attenuator throughout the volume of the layer. In some embodiments, the particular mode of attenuation (e.g., top, bottom, or volumetric) may be distinct between layers 2101 and 2102. By choosing an appropriate mode of attenuation, the thickness of the transparent material onto which the pattern is printed may be used as a transparent spacer.

LEDs 2103 and light guide 2104 illustrate a side-illuminated backlight module. Alternative types of backlight modules may be used in other embodiments. The backlight modules may be based on electroluminescent, fluorescent or LED elements, organized in side-illuminating, front-illuminating, or rear-illuminating configurations. The same considerations apply to 2108, 2109.

Figure 22:
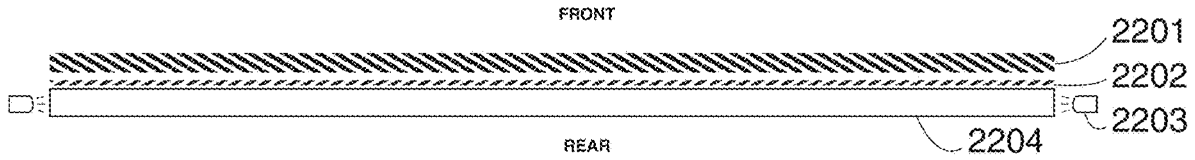
FIG. 22 shows another illustrative example of a light field print, manufactured in accordance with some embodiments of the technology described herein.

FIG. 22 shows another illustrative example of a light field print, manufactured in accordance with some embodiments of the technology described herein. Said light field print comprises a stack of emissive and attenuating layers. Said layers may correspond to associated methods disclosed herein for sequentially assembling the individual layers to form a stack of printed layers. A printed pattern 2202 is printed onto the surface of a backlight, comprising a lamp 2203 and light guide 2204. Illumination source 2203 may be, by way of example and not limitation, an LED. Frustrated total internal reflection results in the appearance of an illuminated region at any location where ink is deposited 2202 on the surface of the backlight medium 2204. An attenuating layer 2201 is then affixed to the rear emissive layer. In some embodiments, attenuating layer 2201 may be affixed directly to emissive layer 2204. In some embodiments, attenuating layer 2201 is separated by a spacing layer. The target and compensated patterns on layer 2201 and ink layer 2202 may be computed according to techniques described herein.

Figure 23:
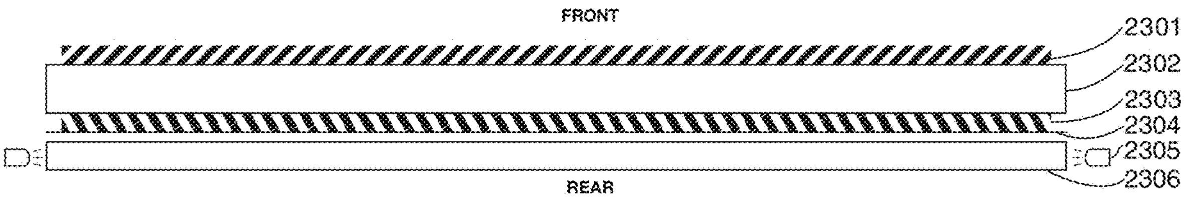
FIG. 23 shows an illustrative example of a light field print manufactured using a self-aligned printing method, in accordance with some embodiments of the technology described herein.

FIG. 23 shows an illustrative example of a light field print manufactured using a self-aligned printing method, in accordance with some embodiments of the technology described herein. Illustrated are a transparent layer 2304 onto which a rear pattern 2303 is printed. A transparent separator 2302 is affixed atop the printed pattern 2303. In some embodiments, the separator may be affixed using an optical adhesive. A front pattern 2301 is then printed on transparent separator 2302. In some embodiments, spacer 2302 is affixed without influencing the spatial location of transparent layer 2304. This may include performing assembly directly on the print bed or paten, and performing repeated print passes for multiple layers. In some embodiments, a UV cured flat-bed inkjet printer may be used. In this way, the alignment between layers and between each layer and the print head may be preserved. In some embodiments the stack of materials 2301-2304 may be placed on a backlight comprising edge-lit illumination source 2305 and light guide 2306.

Figure 24:
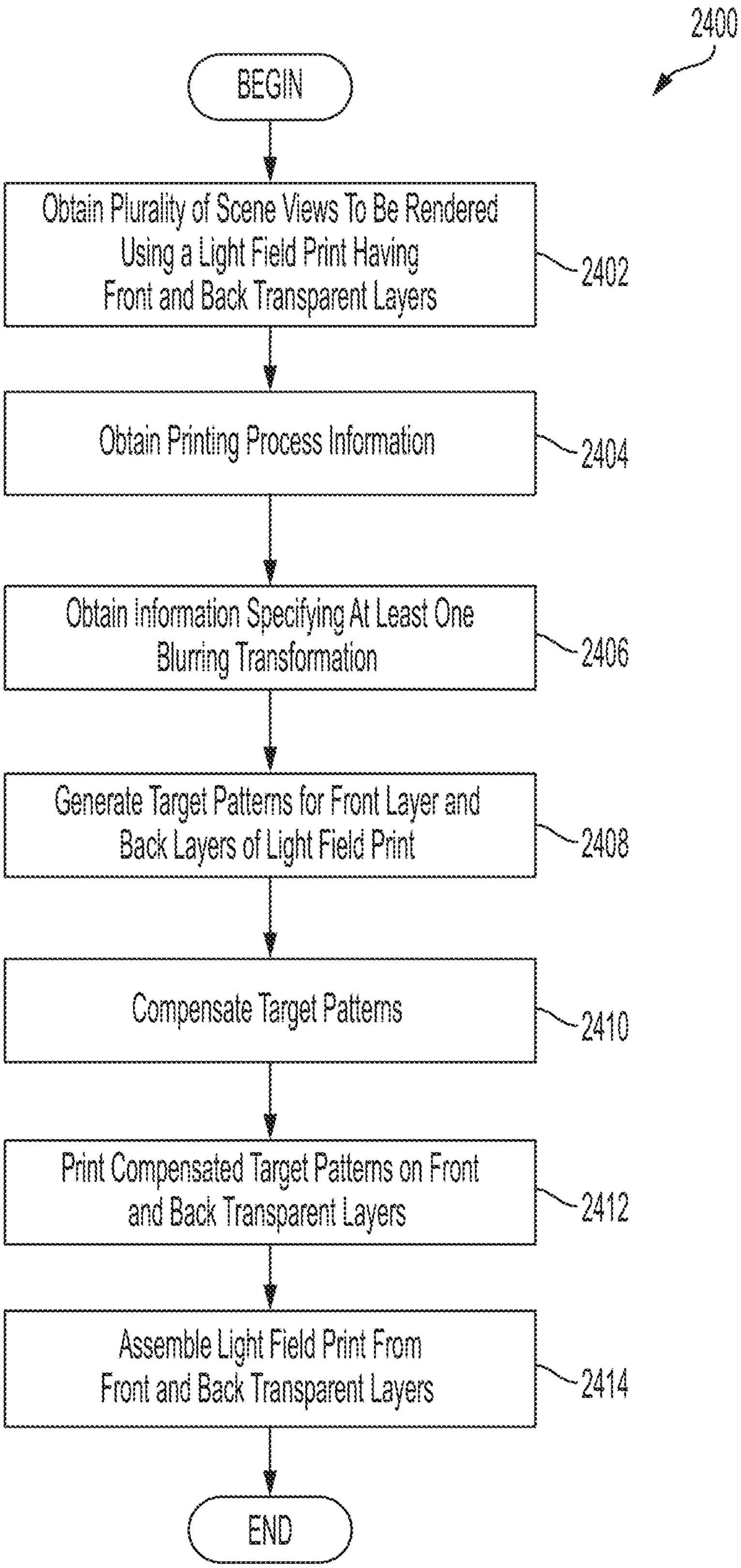
FIG. 24 is a flowchart of an illustrative process 2400 for manufacturing a light field print, in accordance with some embodiments of the technology described herein.

FIG. 24 is a flowchart of an illustrative process 2400 for manufacturing a light field print, in accordance with some embodiments of the technology described herein. Process 2400 may be performed by any suitable system including, for example, system 410 or system 2000.

Process 2400 begins at act 2402, where a plurality of scene views may be obtained, which scene views are to be rendered using a light field print being manufactured via process 2400. Each of the plurality of scene views may correspond to a location of a viewer of the light field print. As described herein, the scene views may be of a natural or a synthetic scene. Each scene view may comprise a grayscale and/or a color image of any suitable resolution for each of one or more (e.g., all) of the scene views. Any suitable number of scene views may be obtained at act 1802 (e.g., at least two, at least ten, at least fifty, at least 100, at least 500, between 2 and 1000, between 10 and 800, or in any other suitable combination of these ranges), as aspects of the technology provided herein are not limited in this respect.

In some embodiments, the scene views may be obtained by accessing and/or receiving one or more images from at least one image source (e.g., accessing stored images, receiving images from another application program or remote computing device). In some embodiments, the scene views may be obtained by first obtaining a description of a 3D scene (e.g., a 3D model of a scene) and then generating, as part of process 2400, the scene views based on the obtained description of the 3D scene.

Next, process 2400 proceeds to act 2404, where printing process information may be obtained. Printing process information may include any of the information 416 described with reference to FIG. 4B and, for example, may include layer geometry information, color model information, print resolution information, and/or any information that may be used for compensating the target patterns for print dynamics (e.g., at act 2410). In some embodiments, layer geometry information may include information describing the size, shape, and position of the layers relative to one another in the light field print to be assembled. For example, layer geometry information may indicated that each of the layers is a plane and 11 inches in width and 17 inches in height, and that the layers may be spaced apart 0.045 inches in the light field print to be assembled. As another example, the layers may be curved shapes that are to be spaced apart at a displacement of 0.06 inches relative to the surface normal in the light field print to be assembled. Layer geometry information may be expressed as a geometric model in a software package (e.g., AUTOCAD) or as a file (e.g., an OBJ file).

In some embodiments, color model information may specify a color model that represents the color channels available (e.g., the available ink channels and ink set in a set of print heads) and/or optical properties of an ink set (e.g., spectral properties, information about how colors interact with one another when ink of one color is overlaid on ink of another color). Additionally or alternatively, the color model may include any information embedded in a printer profile (e.g., an ICC device profile), and may contain information about how to map the device color space (e.g., in the language of PostScript, a DeviceN or DeviceCMYK space) to a standard color space (e.g., sRGB). The color model may describe the optical properties of ink colors, non-limiting examples of which include cyan, magenta, yellow, black, light cyan, light magenta, orange, green, red, violet, light black, light light black, matte black, glossy black, clear inks, emissive inks, gloss optimizers, and specific standardized colors such as Pantone colors.

In some embodiments, print resolution information may include the number of addressable dot centers per inch, both in the horizontal and vertical dimensions (e.g., horizontal and vertical DPI). Print resolution information may, additionally or alternatively, include the dot pitch or selection of dot pitches (dot radius or selection of dot radii) producible by the printing system (e.g., measured in inches or fractions thereof). An example dot pitch may be 1/800 inch.

Next, process 2400 proceeds to act 2406, where information specifying at least one blurring transformation may be obtained. The information specifying the at least one blurring transformation may specify one or multiple blurring transformations and may include information of any suitable type including, for example, any of information 414 described with reference to FIG. 4B.

Next, process 2400 proceeds to act 2408, where target patterns may be generated based on the plurality of scene views obtained at act 2402, printing process information obtained at act 2404, and information specifying at least one blurring transformation obtained at act 2406. This may be done in any of the ways described herein and, for example, by using any of the optimization techniques described herein with reference to FIGS. 5-16.

Next, process 2400 proceeds to act 2410, where the target patterns generated at act 2408 may be compensated for print and/or medium dynamics to obtain compensated target patterns (e.g., compensated for effects of dot gain, for effects of printing material bleed, and for effects of maximum allowable printing material density). The compensation may be performed in any of the ways described herein or in any other suitable way.

Next, process 2400 proceeds to act 2412, where the compensated target patterns are printed on the front and back transparent layers using a printer of any suitable type including any of the types described herein or any other technique for depositing the compensated target patterns onto the layers. After the target patterns are printed onto the layers, the layers may be assembled at act 2414 to create the light field print. Assembling layers into a light field print may include, for example, aligning the prints and adhering them to one another (e.g., using an adhesive or any other suitable means). After act 2414, process 2400 completes. It should be appreciated that process 2400 is illustrative and that there are variations. For example, in some embodiments, one or more of acts 2406 and/or 2410 may be omitted.

Figure 26:
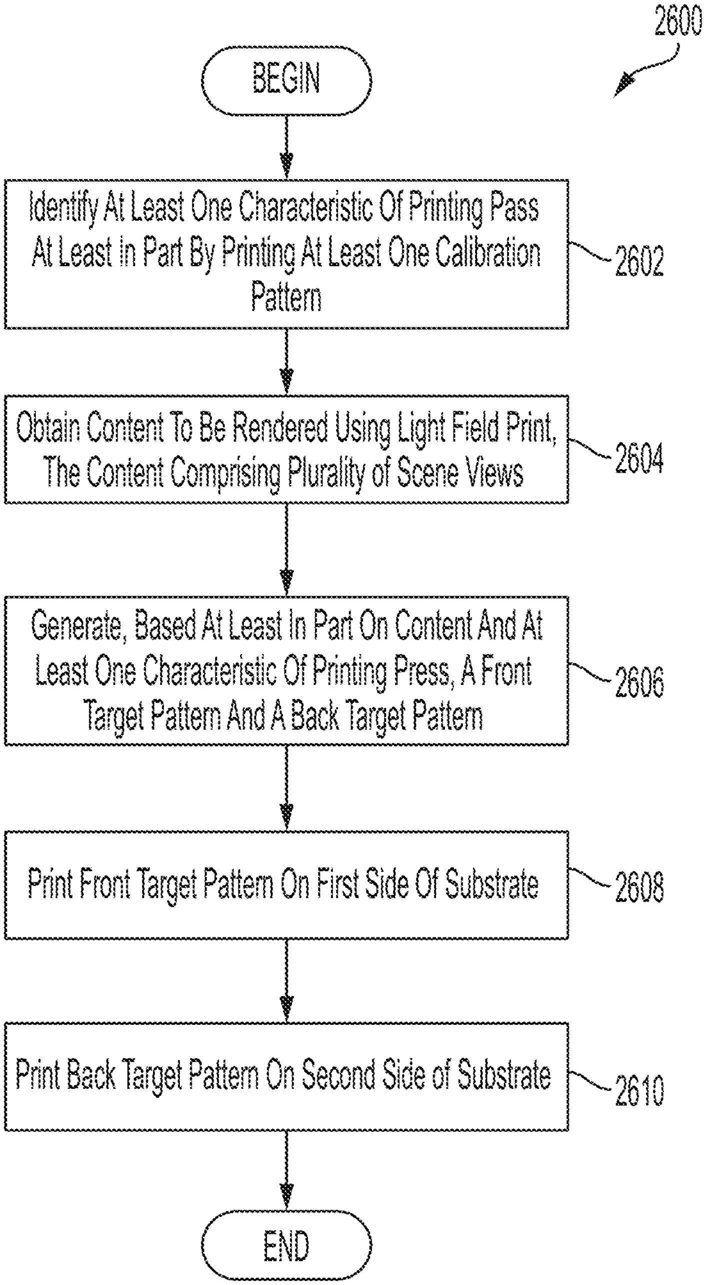
FIG. 26 shows an illustrative process 2600 for manufacturing a light field print, in accordance with some embodiments of the technology described herein.

Another process for manufacturing light field prints is described with reference to FIG. 26, which is a flowchart of an illustrative process 2600 for manufacturing a light field print using a printing press, in accordance with some embodiments of the technology described herein. Process 2600 may be performed by any suitable system including, for example, the computer system 2700 and printing press 2715 described with reference to FIG. 27A, or computer system 2705 and printing press 2730 described with reference to FIG. 27B.

Process 2600 beings at act 2602, where at least one characteristic of the printing press is identified at least in part by printing at least one calibration pattern using the printing press (or another printing press of a same type as the printing press). Examples of calibration patterns are described herein. Examples printing press characteristics that may be measured using calibration patterns include, but are not limited to, achievable registration tolerance in at least one direction along the substrate (e.g., along two orthogonal directions along the substrate such as, for example, the direction of movement of the substrate in the printing press and the direction orthogonal to the direction of movement of the substrate), a degree of alignment of the printing press, minimum line width in at least one direction along the substrate (e.g., along two orthogonal directions along the substrate), spectral attenuation of the substrate without any ink thereon, spectral attenuation of an ink on the substrate, spectral attenuation of a combination of inks on the substrate (e.g., the combination resulting from printing two different color inks on top of one other on the same side of the substrate, printing one ink on one side of a substrate and printing another in on the other side of the substrate at the same location), and dot gain for each of one or more channels of the printing press.

In addition, at act 2602, one or more characteristics of the printing press may be obtained without using calibration patterns. For example, some characteristics of the printing press may be obtained from documentation (e.g., a manual, a press specification, etc.) or an operator of the printing press. Non-limiting examples of such characteristics include: resolution of the printing press, resolution of the plate setter associated with the printing press, thickness of the substrate used by the printing press to print, index of refraction for the substrate, and the flexo distortion factor (sometimes termed the "dispro" factor) for the printing press. In some embodiments, the values of one or more characteristics (e.g., substrate index of refraction, flexo distortion factor, substrate thickness, etc.) obtained without using a calibration pattern may be verified by printing a calibration pattern.

Next, at act 2604, content comprising a plurality of scene views may be obtained. The scene views are ones to be rendered using a light field print being manufactured via process 2400. Each of the plurality of scene views may correspond to a location of a viewer of the light field print. As described herein, the scene views may be of a natural or a synthetic scene. Each scene view may comprise a grayscale and/or a color image of any suitable resolution for each of one or more (e.g., all) of the scene views. Any suitable number of scene views may be obtained at act 1802 (e.g., at least two, at least ten, at least fifty, at least 100, at least 500, between 2 and 1000, between 10 and 800, or in any other suitable combination of these ranges), as aspects of the technology described herein are not limited in this respect.

In some embodiments, the scene views may be obtained by accessing and/or receiving one or more images from at least one image source (e.g., accessing stored images, receiving images from another application program or remote computing device). In some embodiments, the scene views may be obtained by first obtaining a description of a 3D scene (e.g., a 3D model of a scene) and then generating, as part of process 2600, the scene views based on the obtained description of the 3D scene.

Next, process 2600 proceeds to act 2606, where front and back target patterns are generated based, at least in part, on the content obtained at act 2604 and at least one characteristic of the printing press identified at act 2602. Optimization techniques for generating the front and back target patterns are described herein including with reference to FIGS. 4A-16.

Next, process 2600 proceeds to acts 2608 and 2610, where the front and back target patterns are printed using the printing press on first and second sides of a substrate, respectively. In some embodiments where a digital printing press is used, printing the target patterns using the printing press may include: (1) sending the front and back target patterns to the printing press; and (2) causing the printing press to print the front and back target patterns (e.g., by providing an electronic command to the printing press, by prompting an operator of the printing press to start printing the target patterns, etc.). In some embodiments where an analog printing press is used, printing the target patterns using the printing press may include sending the front and back target patterns to an imagesetter or platesetter to create press plates. In turn, the created press plates may be imprinted onto the substrate using the production configuration of the press to print.

In some embodiments, sending the front and back target patterns to the printing press (or an imagesetter or platesetter) may include sending the target patterns to the printing press in a particular format for which the printing press (and/or any computing device associated thereto) will not perform any color management, dithering, or other processing. For example, in some embodiments, the front and back target patterns may be sent to the printing press as pre-screened binarized data (rather than continuous tone data) using a 1-bit TIFF format so that the generated patterns are printed dot-for-dot on the printing press.

In other embodiments, however, the front and back target patterns may be combined with other 2D content to be printed. In some such embodiments, the additional 2D content may be processed (e.g., dithered) with appropriate color management software and combined with the front and back target patterns in one or more Device CMYK PDF files, which are subsequently sent to the printing press.

It should be appreciated that process 2600 is illustrative and that there are variations. For example, in the illustrative embodiment of FIG. 26, the front and back target patterns are printed on two different sides of the same substrate. However, in other embodiments, the front and back target patterns may be printed on different substrates that can be aligned and adhered after the printing process completes. Examples of such embodiments are described herein.

Figure 27A:
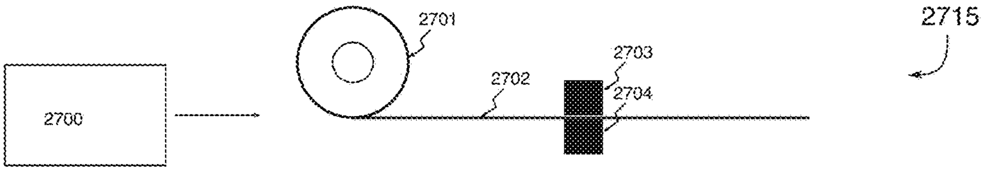
FIG. 27A illustrates a digital printing press system, in accordance with some embodiments of the technology described herein.
Figure 27B:
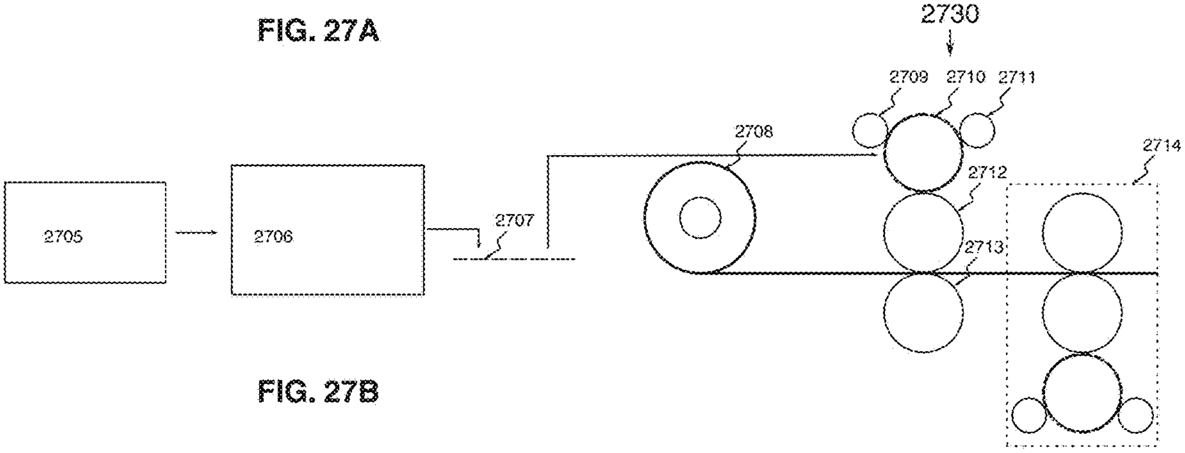
FIG. 27B illustrates an analog printing press system, in accordance with some embodiments of the technology described herein.

FIGS. 27A and 27B illustrate digital and analog printing press systems, respectively, used to create light field prints by imprinting patterns onto two sides of substrates, in accordance with some embodiments of the technology described herein. FIG. 27A illustrates an example digital duplexing printing press 2715 communicatively coupled (e.g., via a wired, wireless, and/or network connection) to computer system 2700. In some embodiments, printing press 2715 may be a two-sided Xeikon printing press or any other suitable type of duplexing printing press. The computer system 2700 may be of any suitable type and may include one or more computer hardware processors.

As illustrated in FIG. 27A, printing press 2715 may include a roll 2701 of printing substrate 2702, which may be clear film, for example. The printing press 2715 may be configured to pass at least some of printing substrate 2702 through front- and back-side imprinting mechanisms 2703 and 2704, respectively. The front- and back-side imprinting mechanisms may constitute a blanket printing mechanism, a toner printing mechanism, a photo-lithographic printing mechanism, and/or any other suitable mechanism for imprinting opaque patterns on clear materials. Although printing press 2715 is shown as having a single printing station with front- and back-side imprinting mechanisms 2703 and 2704, this is for clarity of exposition and not by way of limitation, as a digital printing press may have any suitable number of printing stations (e.g., multiple printing stations for printing with different colors). In some embodiments, printing press 2715 may include a visual servoing system (not shown) that is configured to align the printing press (e.g., by performing front-to-back alignment and/or station-to-station alignment).

In some embodiments, the computer system 2700 may send digital data to the digital printing press 2715 causing it to feed printing substrate 2702 from roll 2701 through the front- and back-side imprinting mechanisms 2703 and 2704, respectively. In turn, the digital printing press 2715 may produce a clear substrate patterned with light field target patterns, aligned on either side of the substrate 2702, thereby manufacturing one or more light field prints.

In some embodiments, computer system 2700 may be configured to perform one or more acts of process 2600 described herein. For example, in some embodiments, the computer system 2700 may be used to identify one or more characteristics of the digital printing press 2715. Examples of such characteristics are provided herein. For example, computer system 2700 may cause the printing press 2715 to print one or more calibration patterns, which in turn may be used to identify one or more characteristics of the printing as described herein. As another example, computer system 2700, may compute front and back target patterns based on the values of the one or more identified characteristics and the content to be rendered using a light field print. The computational techniques for generating the front and back target patterns are described herein.

Regardless of whether computer system 2700 generates the target patterns or obtains them from another source, in some embodiments, computer system 2700 may send target patterns to the printing press 2715 for manufacturing a light field print. The target patterns may be sent to the printing press using 1-bit TIFF format, Device CMYK format, or any other suitable format.

FIG. 27B depicts an analog duplexing printing press 2730 communicatively coupled (e.g., via a wired, wireless, and/or a network connection) to computer system 2705. In the illustrative embodiment of FIG. 27B, the printing press 2730 is a web offset printing press. However, in other embodiments, the printing press 2730 may be an intaglio printing press, a flexographic printing press, a sheet-fed press, and/or any other suitable type of analog printing press. Computer system 2705 may be of any suitable type and may include one or more computer hardware processors. The printing press 2730 includes platesetter 2706 configured to create press plates 2707, roll of printing substrate 2708, plate cylinder 2710, water roller 2709, ink roller 2711, impression cylinder 2713, and reversing stage 2714.

In some embodiments, the computer system 2705 commands platesetter 2706 to create press plates 2707 appropriate for use on the press for each side of the desired light field print. The press plates 2707 may comprise a first plate representing the patterns generated for the first side of the light field print and a second plate representing the patterns generated for the second side of the light field print. A press operator loads the first plate 2707 onto plate cylinder 2710. The press operator causes the press to feed clear substrate material from roll 2708 through the press. The substrate is imprinted by imprinting cylinder 2712 and impression cylinder 2713. Water and ink rollers 2709 and 2711 are shown to prepare and ink the plate cylinder, following the same process as when printing 2D content on an offset press. The second plate is loaded in a corresponding way into reversing stage 2714 to imprint the second side of the substrate. The reversing station 2714 is shown for simplicity as an inverted station, but may employ a more complex media path in order to imprint the back side of the substrate without flipping the substrate over. Alternatively, a turn bar may be used in some embodiments, or the substrate may be re-spooled at the end of the press and fed through inverted in a second pass. On a sheet-fed press the sheet maybe flipped and passed through a second time if a duplexing sheet fed press is not available. One or more additional stations may be used to imprint additional color channels. In some embodiments, printing press 2730 may include a visual servoing system (not shown) that is configured to align the printing press (e.g., by performing front-to-back alignment and/or station-to-station alignment). The output of the depicted analog printing press system will be a light field print comprising light field generating patterns on two sides of a clear substrate.

In some embodiments, the computer system 2705 may send target patterns to the platesetter 2706 causing it generate print plates 2707 to be used for imprinting the clear substrate on roll 2708, thereby manufacturing one or more light field prints.

In some embodiments, computer system 2705 may be configured to perform one or more acts of process 2600 described herein. For example, in some embodiments, the computer system 2705 may be used to identify one or more characteristics of the analog printing press 2730. Examples of such characteristics are provided herein. For example, computer system 2705 may cause the platesetter 2706 to generate plates for printing one or more calibration patterns, which in turn may be used to identify one or more characteristics of the printing as described herein. As another example, computer system 2705, may compute front and back target patterns based on the values of the one or more identified characteristics and the content to be rendered using a light field print. The computational techniques for generating the front and back target patterns are described herein.

Regardless of whether computer system 2705 generates the target patterns or obtains them from another source, in some embodiments, computer system 2705 may send target patterns to the platesetter 2706 for manufacturing printing plates for printing a light field print. The target patterns may be sent to the printing press using 1-bit TIFF format, Device CMYK format, or any other suitable format.

Security and Authenticity Applications—Creating Security Features Using Light Field Printing Light field prints manufactured in accordance with techniques described herein may be used for the creation of high security documents including, but not limited, to passports, identification (ID) cards, tax stamps, and banknotes. In the applications described below advantageous or exemplary configurations for printing production and finishing are given. These are non-limiting descriptions, and the inventors recognize that many of the methods described herein apply broadly. The methods shown in FIGS. 24 and 26, wherein light field patterns are optimized in one pass or subject to post-optimization compensation are both applicable to the below applications.

Tamper Evident Sticker

In some embodiments, the techniques described herein may be used to manufacture tamper-evident stickers. The goal of a tamper-evident stickers is to make it apparent when a product package or case has been opened, or an authenticity decal has been moved, removed or replaced. Towards these ends, a tamper-evident sticker should be difficult to reproduce, readily recognizable by untrained persons, and be fragile enough that available mechanical or chemical means of removing the sticker will destroy it irreparably. Conventional approaches to creating tamper-evident stickers typically employ adhesive-backed foils and films, such that when removed the foil or film will tear, or delaminate, destroying the film and/or leaving a visible residue on the product.

The inventors have developed a way to create a multilayer light field print that can serve the role of a tamper-evident sticker, which will make apparent efforts to remove, replace or otherwise tamper with the sticker, in order to satisfy the above conditions.

Figure 28:
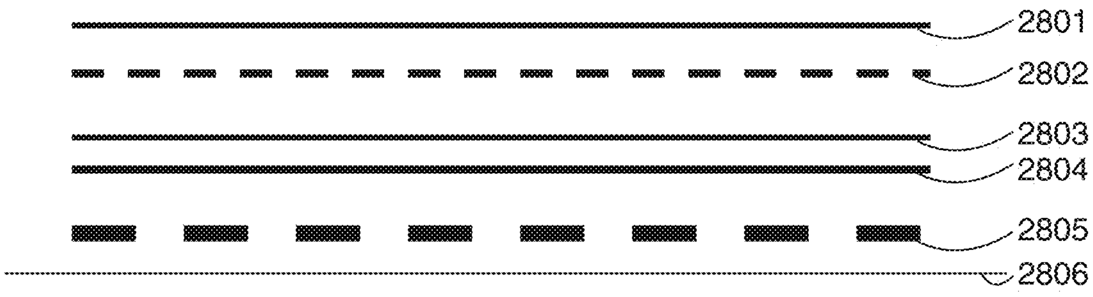
FIG. 28 illustrates a light field print designed to function as a tamper evident sticker, in accordance with some embodiments of the technology described herein.

In some embodiments, a tamper-evident sticker comprises two patterned layers backed by two adhesive layers. For example, FIG. 28 shows patterned layer 2801, with transparent adhesive backing 2802, patterned layer 2803, diffuse layer 2804, and transparent adhesive backing 2805 placed atop product surface 2806. Layers 2801 through 2805 comprise the security sticker, and would ideally be manufactured separately from product surface 2806. Patterned layer 2803 and diffuse layer 2804 may be combined into a single patterned diffuse layer, or may be adhered together with an additional adhesive layer (not pictured). The spacing of the layers is not drawn to scale. The separation between layers 2801 and 2803 is critical for light field reproduction. There are many options in the described embodiment to achieve a desired spacing. 2801 and 2803 may be either front-printed or back-printed, and the material thickness may be adjusted to achieve the desired spacing. Alternatively, another spacing layer (not pictured) may be placed in the stack between 2802 and 2803, with appropriate adhesive layers added.

In some embodiments, creating a tamper-evident sticker involves creating a rear patterned layer 2803/2804 that is difficult to remove from product surface 2806, resists chemical degradation, and holds its shape rigidly under mechanical stress. On the other hand, the top patterned layer 2801 may created using a soft, deformable, and easily dissolved material that is weakly adhered to the layer below it. To make patterned layer 2803 difficult to remove from product surface 2806, adhesive 2805 should have a bond strength greater than that of the tear resistance of patterned and diffuse layers 2803 and 2804. Patterned layer 2803 should be made from a transparent material with a high Young's Modulus, meaning it is not elastic, and retains its shape under stress. Materials such as acrylic, polycarbonate, or polyester are suitable for this, though there are many alternative materials known to those skilled in the art that can be substituted to create a tamper-evident sticker at different costs or with different material or chemical properties.

In some embodiments, the top patterned layer 2801 is made from a transparent material with a low Young's Modulus, such that it is easily deformed. Clear vinyl and similar materials are one such example. Thus, mechanical tampering will be evident as layer 2801 will deform. The patterns generated according to the methods discussed in this application are sensitive to small misalignments, meaning that small deformations of layer 2801 relative to 2803 will be evident. In some embodiments layer 2801 is also made from a material that is soluble in common solvents, including water, such that chemical treatment of the tamper-evident label will deform or destroy the top layer 2801. When top layer 2801 is deformed or destroyed, the tamper-evident sticker will lose its ability to create a light field image, meaning that a viewer will not see a floating image, and indicating that some form of tampering has occurred.

In some embodiments, adhesive layer 2802 may be made from an elastic, or gummy, adhesive such that it will not prevent the distortion or removal of layer 2801, while adhesive layer 2805 should be made from a strong, rigid adhesive that will prevent the intact removal of layers 2803 and 2804 from the product 2806.

Authenticity Sticker or Badge

In some embodiments, the techniques described herein may be used to manufacture authenticity stickers. An authenticity sticker or badge is similar to a tamper evident sticker and is intended to be difficult to reproduce. However, an authenticity sticker or badge should be more durable than a tamper-evident sticker. It is meant to identify a product as authentic, or coming from a trusted source. In this situation, the durability of the mark is desired.

Figure 29:
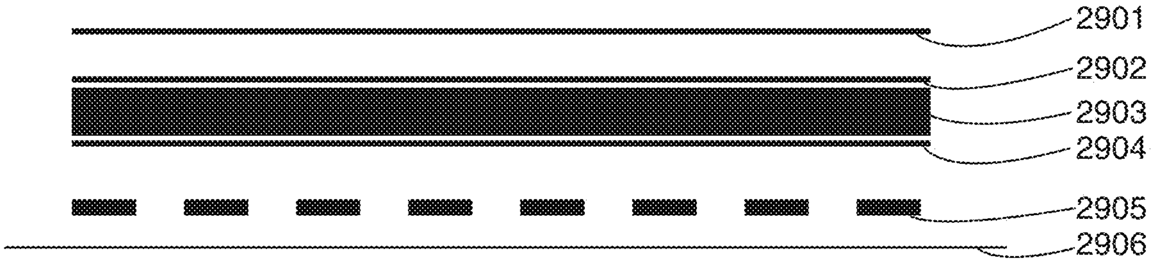
FIG. 29 illustrates a light field print designed to function as an authenticity sticker, in accordance with some embodiments of the technology described herein.

An illustrative authenticity sticker, created in accordance with some embodiments, is shown in FIG. 29. The process for manufacturing the authenticity sticker of FIG. 29 is simplified relative to that of manufacturing the tamper-evident sticker illustrated in FIG. 28. As shown in FIG. 29, the patterned layers of the multi-layer light field print comprise a single double-sided film 2903 printed on an offset press, with pigment 2902 and 2904 patterned on each side. A laminate layer 2901 is affixed atop the stack to afford an additional layer of protection from damage. Adhesive layer 2905 is used to adhere the optical stack to product surface 2906. In alternative embodiments the pigment layers 2902 and 2904 could be placed on independent layers (not pictured) and aligned during assembly, for example using the alignment marks described herein.

In some embodiments the product surface 2906 may be transparent or diffusely translucent and illuminated from behind by ambient light, or an active light source. In other embodiments, the patterns are designed to be reflective, and product surface 2906 may be a diffuse scattering surface.

Verifiable Pattern

In some situations, it may be advantageous to create two unique documents, such that one document can be used to verify the authenticity of the other. In some embodiments, one set of documents may be printed with one verification pattern, and a second set of documents may be printed with a second verification pattern. When the first and second verification patterns are aligned, they may reveal an image allowing a viewer to visually confirm the authenticity of the first set of documents given that the authenticity of the second set of documents has been verified. This approach may be used to verify the authenticity of tickets, identification documents, and other credentials.

The technology described herein may be used to create such verifiable patterns such that the revealing image is a light field image, which appears to an observer to be a floating hologram-like 3D image. The pair of verifiable patterns may be the two layers of a multi-layer light field print created using the methods disclosed herein.

Figure 30:
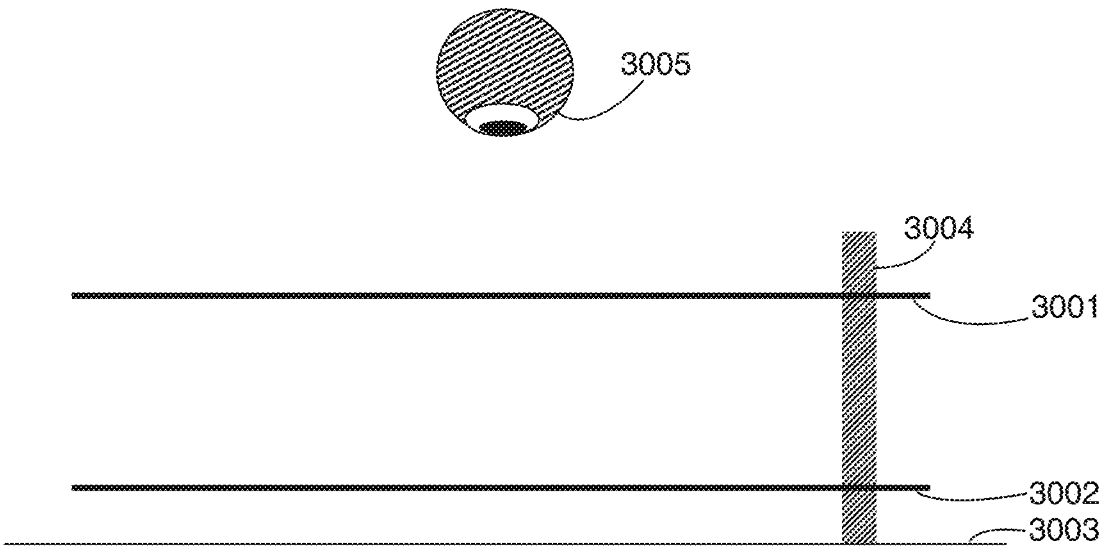
FIG. 30 illustrates a light field print designed to function as a verifiable pattern, in accordance with some embodiments of the technology described herein.

One illustrative embodiment is shown in FIG. 30, which shows verifiable pattern 3001 placed atop verifiable pattern 3002, where said patterns 3001 and 3002 are a pair of patterns generated using the light field print techniques described herein. The patterns are reproduced on clear plastic films, and placed in a viewer apparatus comprising an illumination source 3003 and alignment pin 3004, which slides into physical holes in the plastic films containing patterns 3001 and 3002. A human viewer (or camera system) 3005 can then verify the authenticity of the unknown document by observing the presence of a known light field image.

Variations to the arrangement of the patterns and composition of the viewer device are possible. For example, in some embodiments, natural light can be used for the light source, or the pin alignment may be exchanged for an edge alignment. In some embodiments, the patterns may be spaced apart by a spacing layer (not illustrated).

Product Packaging Exterior

Presenting an eye-catching 3D image on the outside of a consumer packaged good can have a strong influence on sales. Such visual effects may be achieved using the light field technology described herein. In opaque packaging, one of the printed patterns, generated using the methods disclosed herein, can be printed directly on the diffuse surface of the package, such as paper or white plastic. A second patterned layer may be aligned and laminated atop the first layer to achieve the desired light field effect.

Figure 31:
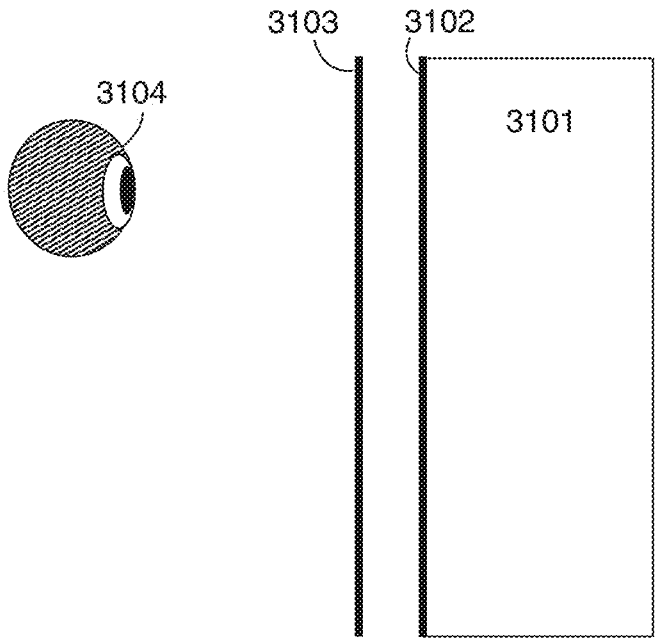
FIG. 31 illustrates an opaque product package box, in accordance with some embodiments of the technology described herein.

FIG. 31 illustrates an opaque product package box 3101 with pattern 3102 printed on one side, in accordance with some embodiments. A sheet of transparent plastic 3103 with a second printed pattern is aligned and laminated atop pattern 3102. Said printed patterns are created according to the methods disclosed herein, such that said printed patterns are designed to create a reflective multi-layer light field display. Viewer 3104 may be viewing the package from an off-axis location (e.g. the package is designed to be placed on a particular shelf). Patterns on layers 3102 and 3103 may be created in order to optimally direct the light field imagery generated by the patterns towards the expected viewer location 3104. In other embodiments, a single sheet of dual printed film may be laminated to the package surface.

Product, Packaging, Clear, One Side

Figure 32:
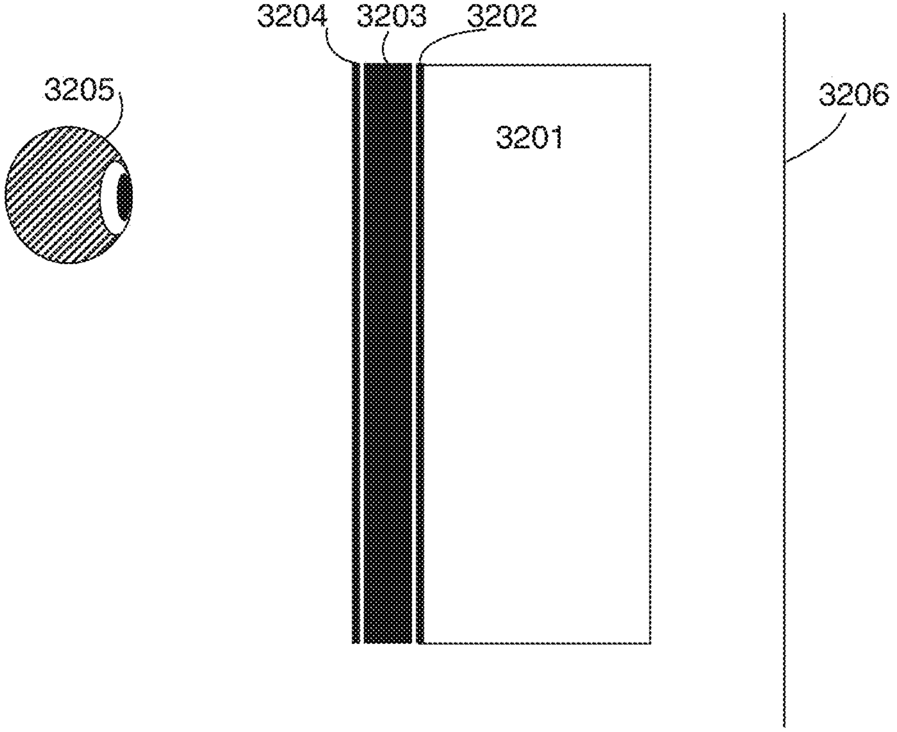
FIG. 32 illustrates the creation of light field prints for clear product packaging, in accordance with some embodiments of the technology described herein.

In cases where consumer packaged goods are packaged in clear packaging, it is possible to use transmitted light and translucent or transparent labeling, combined with the methods disclosed herein, to create light field imagery. FIG. 32 illustrates the creation of light field prints for clear product packaging, in accordance with some embodiments. Product package 3201, which is constructed so that areas of the package are transparent or translucent, is covered with a dual-printed film 3203, wherein one side of the film has been printed with a first target pattern 3202 and the other side of the film has been printed with a second target pattern 3204. The aligned patterns 3202 and 3204 are spaced apart by the thickness of plastic layer 3203 create a light field image at viewer location 3205. Optionally, an illumination source 3206 built into the shelving unit displaying the package provides additional illumination to make the light field image more visible.

The illustrative embodiment of FIG. 32 may be modified in any of numerous ways. Multiple layers of plastic may be printed with the printed patterns, aligned, and laminated to the package. Or, one printed pattern may be printed directly on the packaging material, while the other printed pattern is printed on a sheet laminated atop the first printed pattern. Alternatively both printed patterns can be printed on the product packaging, one on either side of the clear packaging material. Another advantageous embodiment comprises printing one pattern on the front of a clear package which contains a clear or transparent product such as juice, alcohol, oil or water. A second pattern can be printed on the back, thus creating a light field when viewed from an appropriate angle. Apparent 3D images can be made to float inside the package using this method, for example. All aforementioned patterns may be generated in accordance with the disclosed methods. Some embodiments may use corona treatment in order to achieve the desired degree of ink adhesion to form patterned layers.

Ticketing and Currency Applications

It is advantageous, in ticketing and currency applications, to have a unique mark intended to frustrate would-be counterfeiters. The light field printing techniques developed by the inventors and described herein may provide such a unique mark and serve as a transparent window in a ticket or monetary note.

Figure 33:
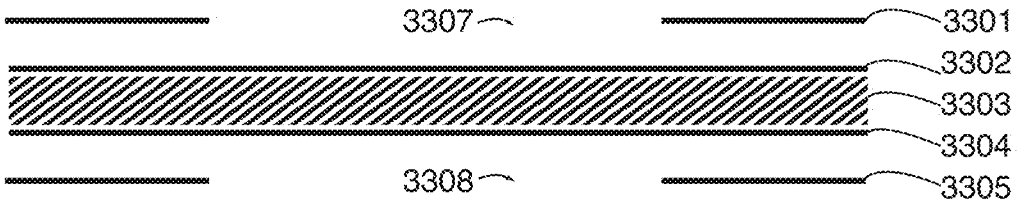
FIG. 33 illustrates a light field print designed to function as a part of a ticket, in accordance with some embodiments of the technology described herein.

One illustrative embodiment is shown in FIG. 33, which depicts a multi-layer light field print comprising a single double-sided print 3303, with patterned pigment layers 3302 and 3304. Said patterned pigment layers may be created by an offset press or similar printing press in some embodiments. In the case of tickets, currency, and similar documents, it is often desirable to have a transparent security feature appear in an aperture within an opaque document, potentially combined with other security features. In FIG. 33, this situation is depicted. Opaque layers 3301 and 3305 contain apertures 3307 and 3308 on the front and back of the document, allowing the light field print to be visible within the aperture region. Layers 3301, 3303, and 3305 may be assembled in one pass or in subsequent passes of a printing press.

In some embodiments, patterns 3302 and 3304 may be prepared such that the print is suitable for reflective, rather than transmissive display. In such cases, apertures 3307, 3308 are not required. Hybrid designs, are also possible, for example where backing layer 3305 is translucent, and aperture 3308 is removed and front opaque layer 3301 is not present. Most such combinations that logically allow light to pass unobstructed through the front patterned layer 3302 can create unique floating hologram-like images within the document, which will prove challenging to replicate. In other embodiments, corona-treated plastic materials may be used on tickets and banknotes.

Banknotes

In some embodiments, the target patterns used for creating a light field print are printed on either side of a clear film. Because many banknotes are printed on bi-axially oriented polypropylene (BOPP), printed with high-resolution presses, and printed with tight registration tolerances between the front and back of the note and each of the color channels of the note, there is excellent technical alignment between light field printing and banknote production.

In some embodiments, light field print patterns are supplied to multiple plates and used in a SIMULTAN press, designed for printing banknotes with accurate front-back registration. The press should be characterized as described in the section herein concerning press characterization. In some embodiments, the pattern generation process used to generate the front and back target patterns may be tuned to create the desired effect on a substrate that is between and 100 microns (μm) thick, using a print resolution between 1200 and 15000 DPI.

However, while some banknotes are printed on clear substrates amenable to direct printing of light field generating patterns, much of the world uses banknotes with opaque substrates. In order to create printable light field features that are compatible with these banknotes, the inventors have developed a number of options described below.

In some embodiments, printed light field images may be integrated with banknotes that use opaque substrates by integrating a clear window into the opaque banknote substrate. There are several types of clear windows that can be used. In some embodiments, the window forms a "thread" or narrow strip of clear material that is first printed with optimized light field patterns according to the steps outlined herein on an offset or flexo press, then cut, as is possible with a die cutting or other suitable machine, and subsequently incorporated into a paper or other opaque substrate at the time of manufacture.

In other embodiments, rather than incorporating the window into a paper substrate at the time of manufacture of the paper, a hole can be laser cut or die cut in the paper and then a clear film printed with light field patterns can be stamped into the hole. Clear window materials for these applications are targeted at 50 to 100 micron thickness and print resolutions for this application range from 1200 to 15000 DPI.

Some banknotes are being produced today using a clear substrate coated with paper or other opaque materials. In some embodiments of the technology described herein, the paper coating is omitted on both sides over a region of the note allow for a clear window over which light field generating patterns can be printed.

Another technique for integrating printed light field images with banknotes using opaque substrates, in some embodiments, is to create a reflection mode light field print designed to be laminated on top of an opaque substrate, or a transmission mode light field print designed to be laminated on top of a transparent substrate. In either case, when creating printed films designed to be laminated on top of another substrate it may be desirable to create very thin substrates, in some embodiments as thin as 25 microns (μm). Creating patterned materials at this thickness that can create light field effects also requires printing at high resolutions. For the above 25 micron (μm) film the minimum patterning resolution required to create light field effects is 4000 DPI. Patterning the film at higher resolutions up to 15000 DPI will enable more dramatic effects.

In order to create patterned films thin enough to be laminated on top of another substrate it is advantageous to employ nanofabrication techniques. In some embodiments, for example, a NANOSCRIBE may be used to create a relief plate with very small features that can be imprinted on a clear 25 micron (μm) film such as a clear polyimide film, polycarbonate film, or polyester film. In other embodiments, a NANOOPS nanofabrication printer is used to create patterned film on a silicon substrate. A clear sacrificial layer from a clear material such as SU-8 photoresist is first deposited on the silicon substrate, metal layers are deposited to create the opaque regions of the print, and the metal layers are separated by a layer of clear material such as SU-8 photoresist.

In some embodiments, features comprising the bottom layer of a light field may be printed on top of a clear substrate. The pattern may then be overprinted with a clear varnish layer at a later stage in the print process. Subsequent steps include: laying down the desired thickness of varnish to create the desired spacing between the layers of the printed light field pattern, then at a third later stage, printing the features from the top layer of the light field pattern on top of the varnish layer.

Figure 34:
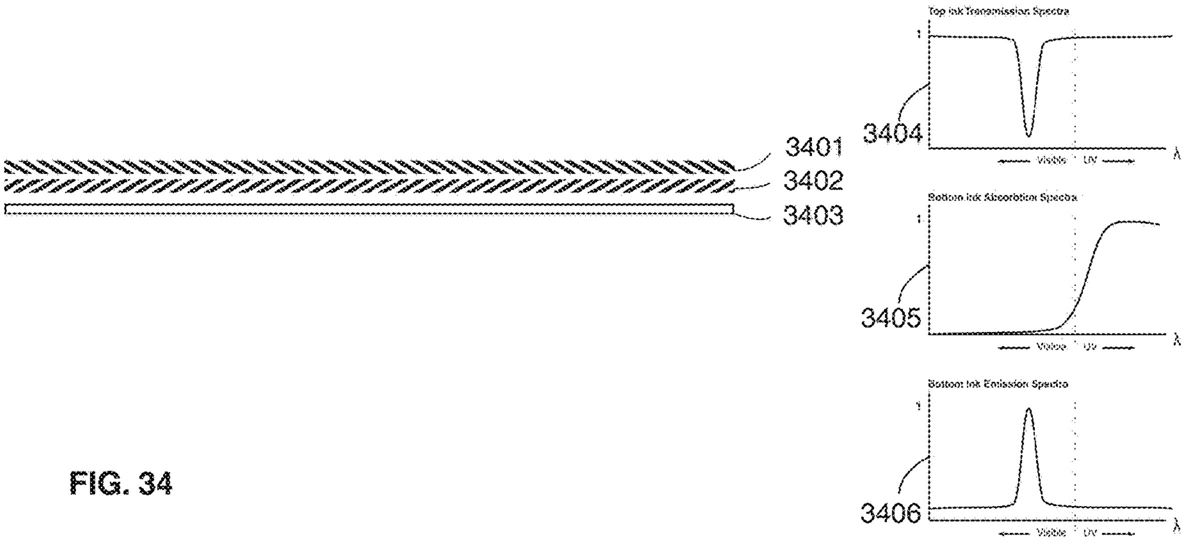
FIG. 34 illustrates a light field print designed to function as a banknote security feature that will appear only in the presence of ultraviolet illumination, in accordance with some embodiments of the technology described herein.

In some embodiments, a light field pattern may be created on top of an opaque or transparent substrate (3403) such that it is only visible under UV illumination, as illustrated in FIG. 34. To this end, in some embodiments, a first layer of the light field print (3402) may be patterned using a UV absorbing phosphor, with example absorption spectrum 3406 that emits light in the visible spectrum with example emission spectrum 3405. A second layer of the light field print (3401) may be patterned using a transparent ink that has an absorption notch matched to the fluorescence wavelength of the phosphor comprising the rear layer with example absorption notch 3404, as shown in FIG. 34. The above embodiments may be achieved using any of the fabrication methods available for creating light field prints. In particular, in the case of transparent substrates the first and second layers may be printed on either side of the substrate, while in the case of an opaque substrate this embodiment advantageously allows the first and second layers to be printed on top of one another, with an optional transparent varnish layer separating them, on a single side of the substrate.

In some embodiments, optimized light field prints may be used to create dichroic features. Such features have the appearance of being one color when light is reflected from the front and a different color when light is transmitted through the print from the back. For example, when illuminated reflectively from the front side using a white light source and measured by a calibrated camera, the measured chromaticity values differ from the measured values obtained by illuminating the same print transmissivity from the back, using the same light source. Dichroic features have been demonstrated on publicly-available banknote specimens and may be used, for example, on other secure documents such as stamps, personal ID documents, labels, packaging and other secure documents.

With an optimized light field print, one way to realize dichroic effects is to produce such a print where the top layer is patterned with an opaque, reflective material instead of a black ink material, affecting the reflective chromaticity of the print, and where the transmissive chromaticity is affected by the modifying the chromaticity of the media itself, and additionally or alternatively, by applying a layer of color ink printed underneath the reflective material on either side of the print. For example, the top layer may be printed with a reflective metallic silver ink or by selectively depositing a metallic silver layer, and this top layer could be produced on top of a transparent blue substrate. Alternatively, the top layer could be produced using these methods, e.g. by printing or depositing on top of a clear substrate, and a rear printed layer would contain a transparent blue "flood fill" ink that visually colors the print blue in transmissive mode. In some embodiments, the rear layer would be printed underneath all other layers using standard inks or alternatively, could also be printed using an opaque metallic ink. These specific examples pertain to an optimized print that produces a silver color in reflective mode and a blue color in transmissive mode, and other sets of chromaticities may be realized by using alternative materials have other chromaticities, for example, a gold metallic ink on the front layer of a purple transparent substrate, or a gold metallic ink on the front layer of clear substrate and a purple rear "flood fill" ink applied to color the print purple in transmissive mode.

Additionally, the specific patterns optimized for dichroic prints may be computationally designed so that the front layer, or each individual layer, has a constant average value after having applied a blurring transformation to the layer patterns. For example, in the design process the front layer image may be designed to have a constant value after spatial averaging. This would create the appearance of a dichroic print where, when illuminated reflectively, the front metallic layer would have minimal visible structure. In such embodiments, the visible content of the light field print, such as a 3D image, animation or color-changing effect, would appear only in transmissive mode.

Identification Documents

Identification documents are an area in which high security and variable printing intersect. The inventors have recognized that optimized light field prints are transformative for this application area, as the ability to print arbitrary light fields on a digital press allows varying hologram-like images to be printed on a per-document basis.

Identification cards are often printed using a special purpose standalone printer. In some embodiments, a portion of the substrate of the ID card or document is left transparent, and the custom ID card printer is adapted to be a high-precision duplexing printer. The printer is equipped to talk to a network-accessible API that serves customized target patterns to the printer.

In other embodiments, the card substrate used for printing IDs comes pre-printed with customized light field patterns and is inserted into the ID card printer. In some embodiments, the card has an embedded code that allows the ID card printer to create patterns specific to the ID card blank that is being printed.

Government issued IDs such as drivers licenses and passports are also a prime application for printed light field security features. The above-described techniques for banknotes and ID cards generally apply to passports and licenses equally well. These documents may have clear windows bearing light field prints, may be entirely clear, or may have reflective prints either directly printed or laminated on top of them.

Brand Protection Features for Product Packaging

The inventors have appreciated that light field prints can create novel and attractive patterns that are well suited for grabbing the attention of a viewer and providing an obvious mark that can distinguish one brand from another. Such brand protection applications overlap with many pure security applications as well, enabling a consumer to identify an authentic product over a generic or counterfeit product. A non-exhaustive list of common label and packaging features than are presently printed on clear substrates and are therefore amenable to creating printed light field images is as follows: hang tags for clothing and other soft goods, gift cards and other stored value cards, credit cards, bottles and jars, toys and novelty items, such as branded giveaway items.

Figure 35:
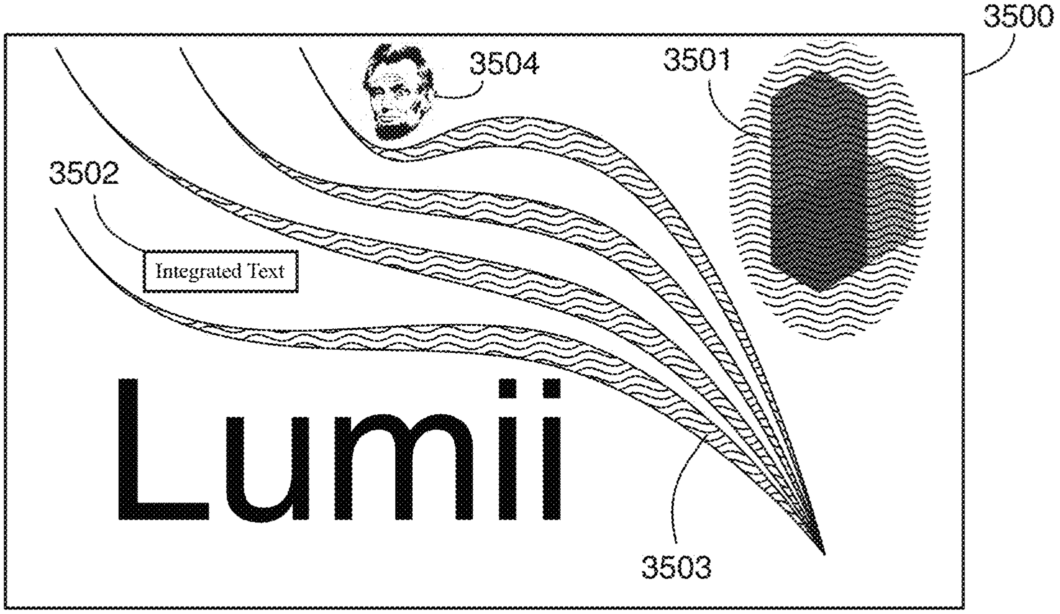
FIG. 35 illustrates a combination of 2D printed images and light field printed patterns intertwined across a single printed document, in accordance with some embodiments of the technology described herein.

In some embodiments, the light field generating patterns may be intertwined with other printed content such that cutting apart the label to remove the light field feature for counterfeiting is hard or impossible, as illustrated in FIG. 35. Printed security label 3500 contains light field generating patterns that are contained in region 3501. However it also contains light field generating patterns (3503) throughout the label, intermixed with 2D text 3502 and graphics 3504.

In some embodiments, the product packaging includes a light field print that shows a QR code only from specific angles. The QR code is pre-distorted so when viewed from the preferred angle it is rectangular in the view of a cell phone camera or other code reader.

Often commercial printing systems represent a constrained production environment in which the resolution of high-security printing presses is not available, or the alignment accuracy between color stations or sides of the print is not sufficient to achieve a full range of light field effects. The inventors have developed a variety of techniques to create useful features with resolution and alignment constraints. The following types of features can be specified to an optimized light field solver, listed in decreasing need for accurate printing and registration: 3D, 3D repeating, and color shifting.

In scenarios where a press can create small features but the layers of the print cannot be reliably aligned with sufficient accuracy to achieve a 3D effect, creating a repeating 3D pattern over a wider area can allow for tolerance of large layer misalignments.

In an illustrative example, consider two printing presses. Press A and Press B are both capable of imprinting a 2400 DPI pattern onto clear 4 mil media. The size of a feature created by each press is 1/2400 inches. However, Press A is capable of registering the front and back impressions within 1/1200 inch, considered a high accuracy press, while Press B does not have a servo-controlled reversing station, and instead is only capable of aligning the layers to within 1/200 inch. Without some additional insight it would not be possible to use the high resolution printing ability of Press B to create high quality light field prints. One would need to print at an effective resolution of between 200 and 400 DPI, greatly reducing the achievable pop-out/depth of field and increasing the apparent blurriness of the resulting images.

Figure 36:
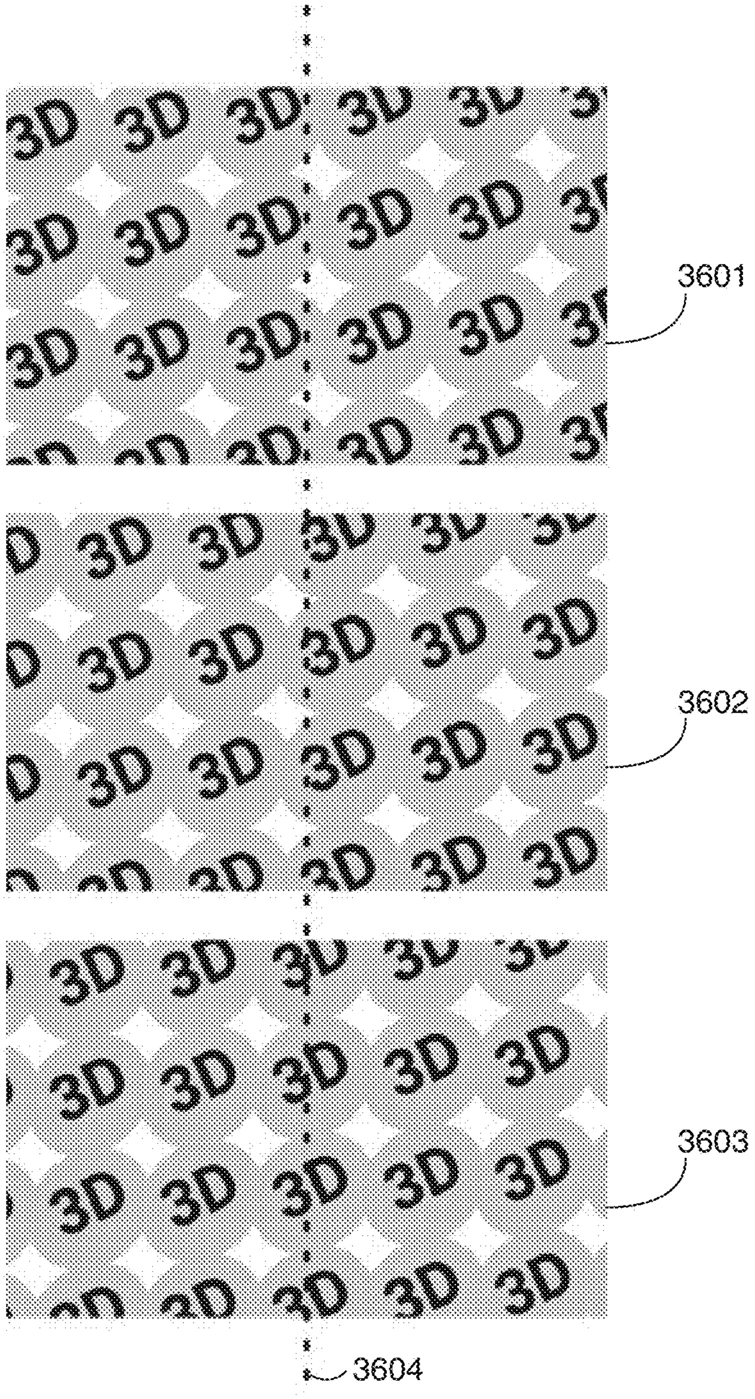
FIG. 36 illustrates a light field effect wherein a 3D pattern appears to repeat continuously, in accordance with some embodiments of the technology described herein.
Figure 37:
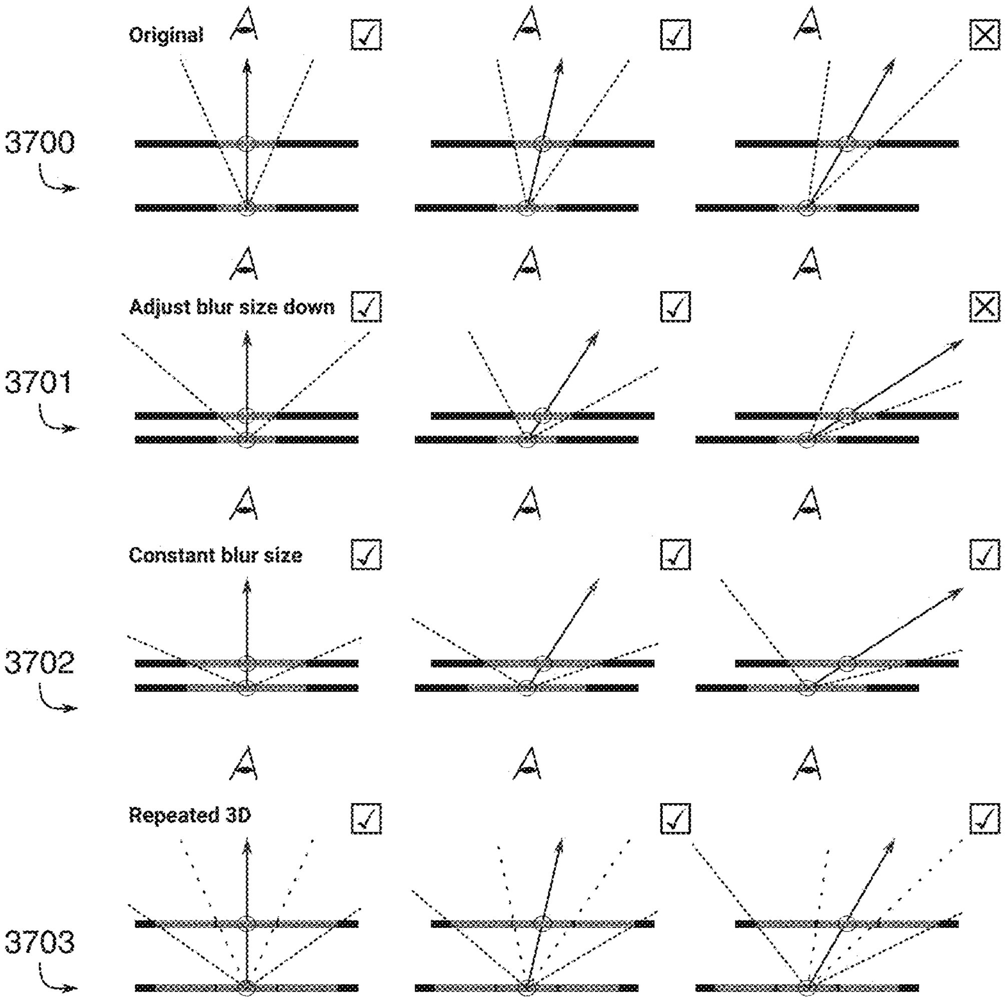
FIG. 37 illustrates the tolerance to patterned layer misalignment of various methods of creating light field prints, in accordance with some embodiments of the technology described herein.

FIG. 36 provides an example of a light field print that is designed to create a repeating pattern in both space and angle. In some embodiments, it is possible to create an optimized light field pattern that results in a repeated 3D pattern, where misaligned layers create views that appear visually similar to the central views. The different tradeoffs that are useful for managing misalignment are indicated in FIG. 37 and discussed below. Creating repeated views is recognized by the inventors as an advantageous method for managing misalignment. Even in cases where alignment can be precisely controlled it may be advantageous to use repeated views to extend the field of view of a print without changing the physical spacing of the layers or the blur size. The tradeoff being made is one of redundancy—the repeated 3D scene, if correctly represented, can create redundancy that is easy to represent in the format of a two layer light field print made with barriers. The key insight in specifying views to an optimized light field solver such that the data being represented by the printed light field display is highly redundant is that repeated images are cyclical, but for a small shift between repeats of the scene. This is shown in FIG. 36, where the 3D pattern 3601 is both repeating spatially, and repeating and offset by a shift equal to the blur size used in the pattern formation, when the pattern formation uses the bandlimited optimization technique described herein. 3602 and 3603 represent the central views of neighboring angular repeats of the 3D pattern. Note that a spatial shift occurs with reference to central line 3604, between central views 3601, 3602, and 3603. The spatial shift is magnified for instructional purposes and would not be as visually significant as depicted. When not using a bandlimited optimization the image shift may be equal to the fundamental sample period in angle, such as the spacing of the pinholes in a pinhole-based display.

FIG. 37 illustrates the tolerance to patterned layer misalignment of various methods of creating light field prints. In order to increase the tolerance to layer misalignment, as stated above, multiple approaches are possible. These methods include the pictured methods of (3702) decreasing the spacing between the patterned layers while maintaining the same blur size, which has the effect of causing 3D images to appear flatter than the original (3700), and (3704) creating a repeating 3D image as described above. FIG. 37 demonstrates that adjusting the blur size in proportion to the patterned layer spacing (3701) will not change the misalignment tolerance of the print.

Optical Stacks and Applications

General Formulation

The general formulation of the multi-layer light field displays disclosed in this section comprises two patterned layers placed atop one another and offset by a small distance. The patterned layers are made selectively transparent according to the methods described herein, such that a specific alignment and depth offset visually reproduces a plurality of views of a scene, which scene may appear to have three-dimensional structure, and float in front of or behind the physical plane of the print.

There are a multitude of specific configurations for said patterned layers and optional additional layers that afford various advantages when employed in a variety of applications. The sections below enumerate a few particularly advantageous configurations for multi-layered light field prints and displays as applied to specific applications. Such applications are broadly separated into categories by intended use case ranging from aesthetic displays, to informative displays, to functional displays. However this does not imply that layer configurations and applications listed in one category are only useful for other purposes, or do not have secondary purposes. For example, security prints manufactured according to the methods disclosed herein have a primary functional purpose of ensuring the authenticity of a product. However, they may find commercial application due to the aesthetically pleasing nature of the light field images created by the prints.

Decorative and Informative Applications

Exterior Glass, New

In an architectural setting, it is often desirable to create attractive visual features in a building for the enjoyment of occupants, and to sell or promote products or services. Such messages can be artistic, informative, promotional, or serve other purposes. In the case of new buildings, where glass windows, doors, or wall mounted fixtures can be treated prior to installation, some embodiments of the technology described herein allow a user to create large-scale light field images that can be installed in a entryway, window, or other architectural setting to provide light field imagery at large sizes. One such illustrated embodiment, shown in FIG. 38 entails printing patterns 3801 and 3803 generated by the methods disclosed herein on either side of a section of architectural glass 3802. Ambient illumination from outside the building will cause occupants to observe a light field image as said illumination passes through patterns 3803 and 3801. In the illustrated embodiment, the patterns may be created on the glass using a Direct-To-Substrate UV curable inkjet printer. In other embodiments, encompassing pretreated architectural elements other methods of depositing patterns on glass or other transparent media may be used to achieve a similar effect. In yet other embodiments, rather than patterning glass, it is also possible to achieve a similar effect by machining apertures in metal or other opaque sheets, such that two patterned layers are created.

Exterior Glass, Retrofit

In cases where architectural elements such as glass windows have already been installed, it is possible to create a retrofit installation such that light field images can be observed through the glass. In one such embodiment, illustrated in FIG. 39, the patterns created by the methods disclosed herein cannot be directly printed on the glass without removing it from the building. Instead, in this case, the patterns 3903 and 3905 are printed directly onto either side of a clear sheet material 3904, which is adhered to window 3901 using an adhesive layer 3902.

Exterior Glass, Retrofit, Transient

Figure 40:
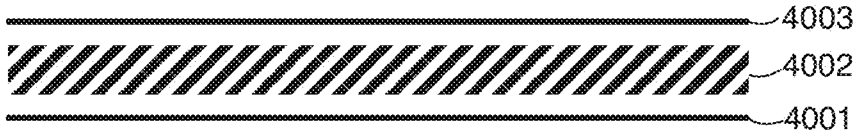
FIG. 40 illustrates a light field print created on architectural glass by printing on films laminated to the glass, such that the films can be removed at a later time, in accordance with some embodiments of the technology described herein.

In another embodiment illustrated in FIG. 40, the patterns 4001 and 4003 created using the techniques described herein are printed on a static cling vinyl material using a solvent printer or similar method. The vinyl material is aligned and adhered to either side of a window glass 4002. This arrangement requires careful manual alignment of the vinyl cling layers, as the layers can stretch and deform easily. The use of alignment marks as described in this document is particularly advantageous in this embodiment. The alignment marks may be placed in a bleed area which can be cut away after installation.

Interior Dividing Glass

Figure 38:
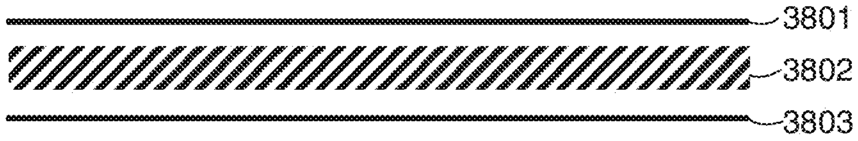
FIG. 38 illustrates a light field print created on architectural glass by printing directly onto the glass, in accordance with some embodiments of the technology described herein.
Figure 39:
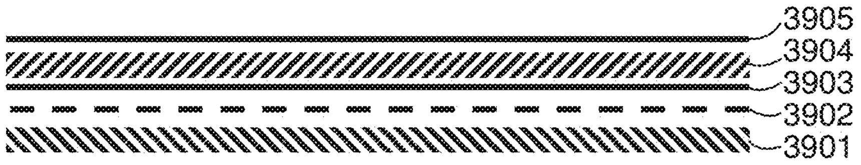
FIG. 39 illustrates a light field print created on architectural glass by printing on films laminated to the glass, in accordance with some embodiments of the technology described herein.

It should be appreciated that the above-described exterior installations, which were illustrated in FIGS. 38-40, can equally apply to interior dividing glass as is often found in conference rooms and open-plan offices.

Window Hanging

Figure 41:
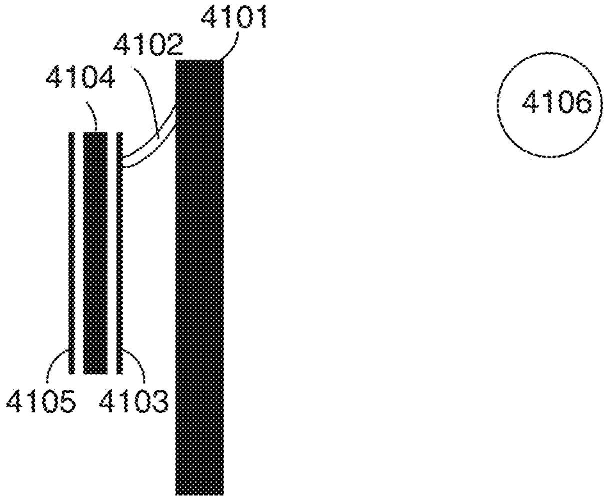
FIG. 41 illustrates a light field print designed to be hung in a window, in accordance with some embodiments of the technology described herein.

In some embodiments, a light field print may be suspended in a window to provide light field images from the interior when illuminated by ambient exterior light. An illustrative embodiment is shown in FIG. 41, which includes the following items: window 4101 has hanging fixture 4102 attached, with a light field print suspended from fixture 4102 and illuminated by exterior light source 4106. The light field print comprises two patterned layers 4103 and 4105 affixed to either side of the of substrate 4104. Said layers may be printed on a conventional aqueous inkjet printer, and affixed to plastic substrate 4104 using pressure sensitive adhesive. Alternative embodiments include printing patterns 4103 and 4105 directly on substrate 4104 using a Direct To Substrate printer, and using alternative materials for substrate 4104, such as glass.

Backlit Signage or Art Print

Figure 42:
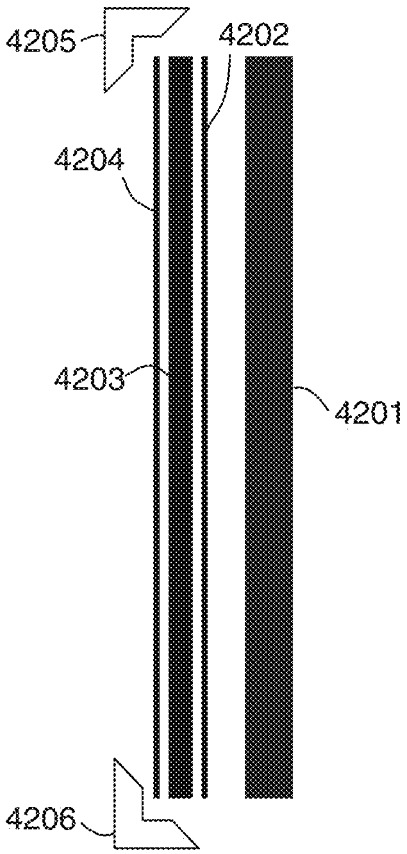
FIG. 42 illustrates a light field print designed to be used in a backlit signage application, in accordance with some embodiments of the technology described herein.

In some embodiments, the patterns generated using the disclosed methods may be used to create light field images used in backlit signage applications. FIG. 42 depicts a backlit signage applications. Backlight 4201 is found inside a backlit signage box (not pictured). The light field print comprises clear plastic substrate 4203, which can be PET, PETG, Acrylic, or another type of clear plastic, and patterned plastic layers 4202 and 4204. The patterns printed on layers 4202 and 4204 can be created using an aqueous inkjet printer, such as an Epson SureColor P9000. Retaining clips 4205 and 4206, which may be snap rails, keep the light field print pressed against backlight 4201. Alternative embodiments include using a Direct To Substrate printer such as a Canon Oce Arizona to print patterns 4202 and 4204 directly to plastic layer 4203.

In such an application the light field print may be permanently or semi-permanently installed atop a backlight using an adhesive or other fasteners. In all examples patterns 4202 and 4204 are generated using the methods disclosed herein.

Backlit Desk Decorator

Figure 43:
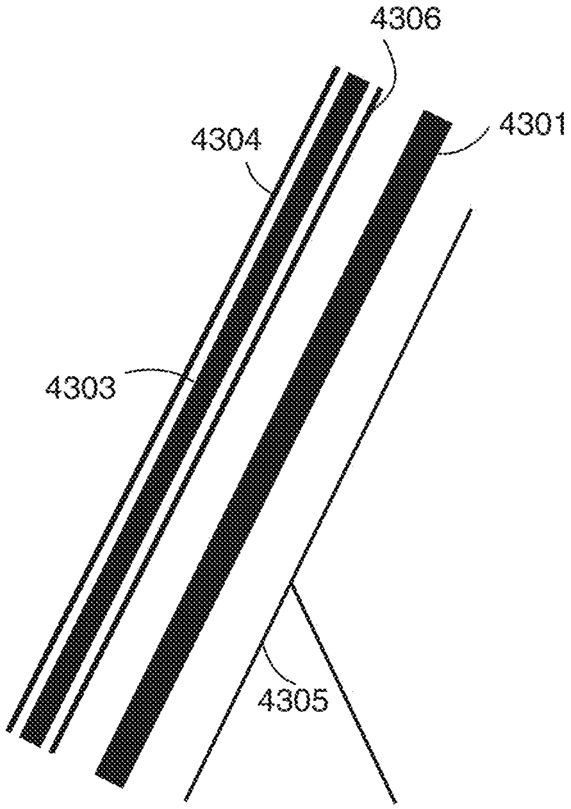
FIG. 43 illustrates a light field print designed to be used as a backlit desktop or table decoration, in accordance with some embodiments of the technology described herein.

In some embodiments, a light field print can be displayed on a desk or other flat surface. This application might allow an office worker to display a light field picture of her family. In the example embodiment illustrated in FIG. 43, a backlight 4301, suspended in a stand 4305, displays a light field print comprising substrate 4303, and patterned layers 4302 and 4304. The patterned layers may be printed on an aqueous inkjet printer, aligned, and laminated to clear substrate 4303. As in other scenarios, additional embodiments may change the materials, configuration of the stand, or patterning method, without fundamentally altering the innovation. The patterns 4302 and 4304 are created according to the methods disclosed herein. The patterns may alternatively be generated in such a way as to preclude the necessity of backlight 4301.

Handheld Photographic Print

Figure 44:
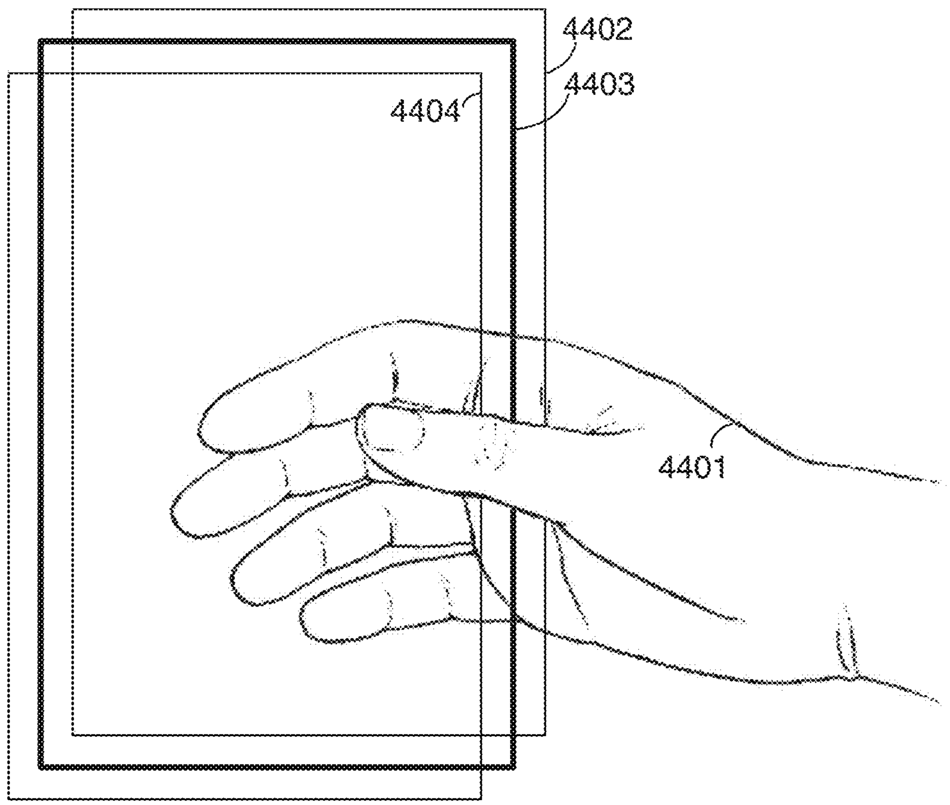
FIG. 44 illustrates a light field print designed to be used as a handheld photographic print, in accordance with some embodiments of the technology described herein.
Figure 45A:
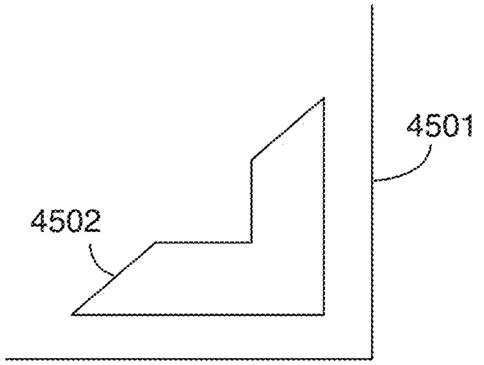
FIG. 45A, FIG. 45B, FIG. 45C and FIG. 45D illustrate methods for photographic print finishing for light field prints, in accordance with some embodiments of the technology described herein.
Figure 45B:
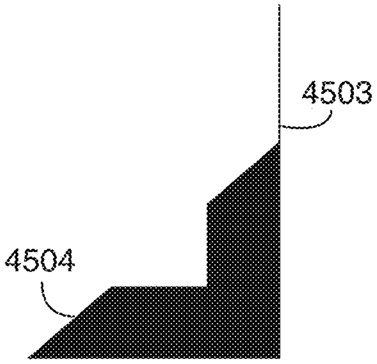
Figure 45C:
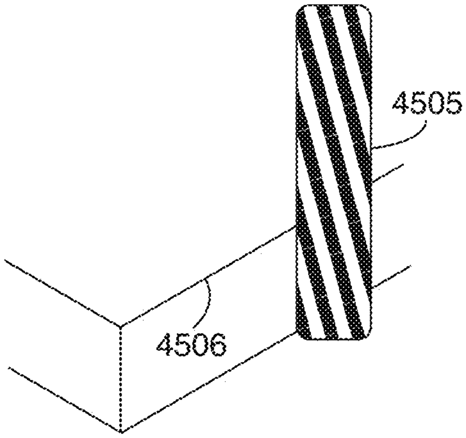
Figure 45D:
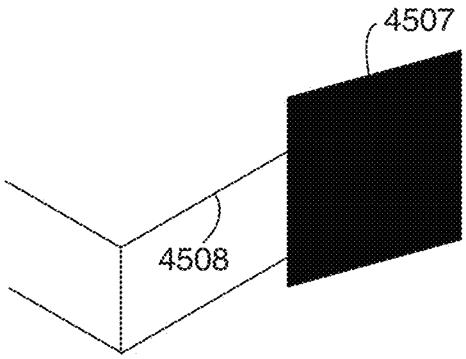

Some embodiments provide for creation of hand-held light field prints. An illustrative example of a handheld light field print is depicted in FIG. 44. The light field print may be translucent, transparent, or opaque. A user holds the print in his hand 4401. The light field print comprises clear substrate 4403, with patterned layers 4402 and 4404 aligned and laminated to either side. In other embodiments, various methods may be used to pattern patterns 4402 and 4404 onto a plastic substrate 4403. Said patterns are created in accordance with the methods disclosed herein, and may be tuned for various viewing conditions, e.g., with a bright rear illumination source, wherein the viewer holds the print up to a light source, or with ambient illumination, where the light field print works in a reflective mode.

Photographic Print Finishing

In some embodiments, one or more finishes may be applied to a light field print in order to create a professional and finished look on the light field print. For example, in the illustrative embodiment of FIG. 45A, FIG. 45B, FIG. 45C and FIG. 45D, a virtual frame 4502 is added to the print 4501. Virtual frame 4502 may include a 3D digital representation of a frame that, when reproduced as a light field, provides the illusion of a frame with depth. The patterns used to create the virtual frame 4502 are generated in accordance with the methods disclosed herein. In some embodiments, a flat black frame 4504 may be used to surround light field print 4503. In some embodiments, no frame whatsoever is used, which may provide an aesthetically pleasing effect.

The inventors have appreciated that the edge quality of a light field print is important in providing a pleasing package for a viewer. In some embodiments, the edge of a light field print may be finished using a mill bit—for example, the edge of print 4506 is depicted during a finishing pass with a mill bit 4505. Alternatively, the edge of a light field print may be cut with a knife, laser, waterjet, break, or other Computer Numeric Control (CNC) tool. The edge 4508 may also be treated with an adhesive seal 4507 to prevent degradation. If materials such as glass are used as the substrate for the light field print, special handling methods may be required, as will be known to those skilled in the art of handling specific materials. For example, glass may need to be scored with a glass cutter and polished after cutting.

Additional Implementation Detail

Figure 25:
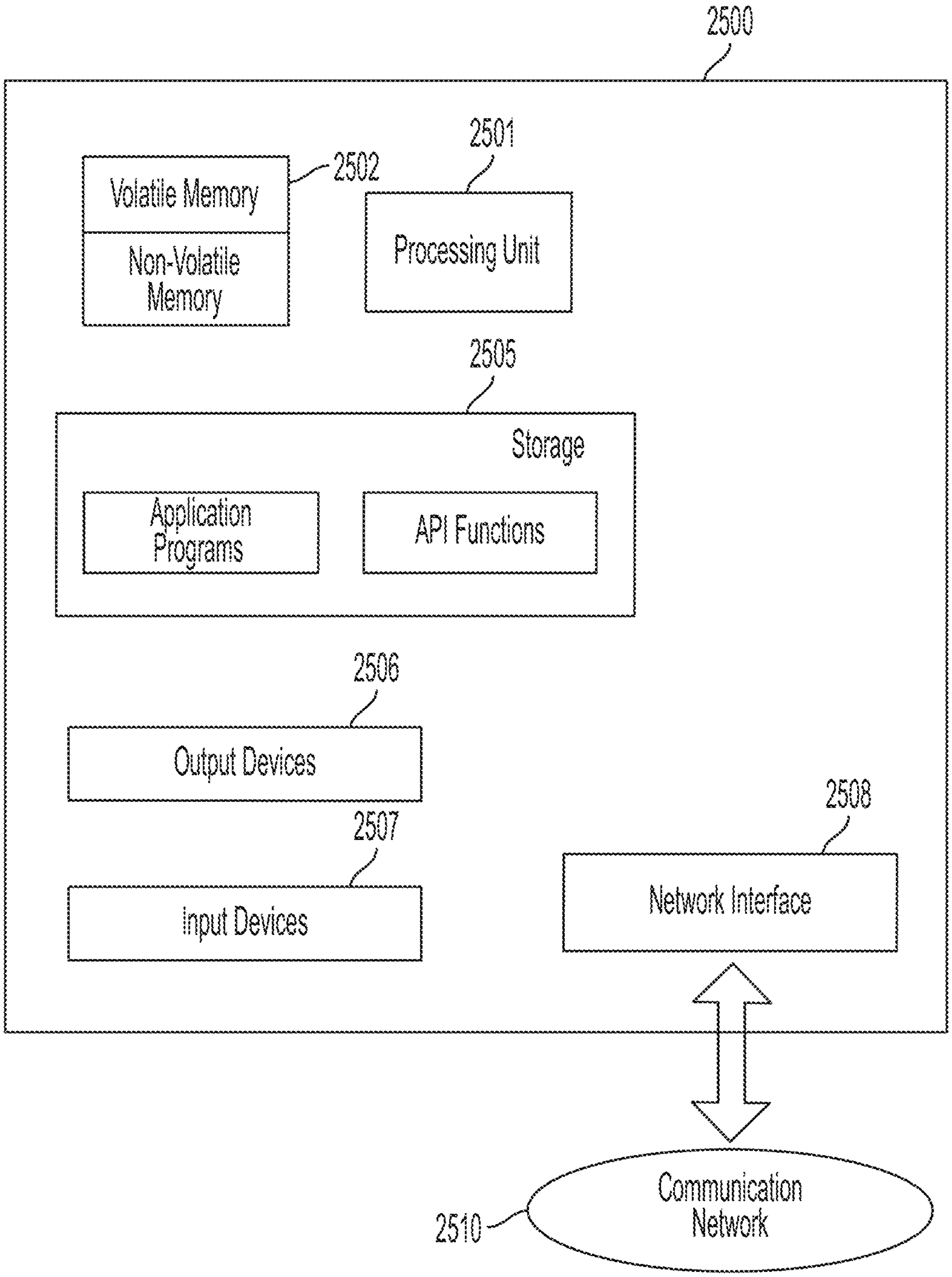
FIG. 25 shows, schematically, an illustrative computer 2500 on which any aspect of the technology described herein may be implemented.

In the embodiment shown in FIG. 25, the computer 2500 includes a processing unit 2501 having one or more processors and a non-transitory computer-readable storage medium 2502 that may include, for example, volatile and/or non-volatile memory. The memory 2502 may store one or more instructions to program the processing unit 2501 to perform any of the functions described herein. The computer 2500 may also include other types of non-transitory computer-readable medium, such as storage 2505 (e.g., one or more disk drives) in addition to the system memory 2502. The storage 2505 may also store one or more application programs and/or resources used by application programs (e.g., software libraries), which may be loaded into the memory 2502.

The computer 2500 may have one or more input devices and/or output devices, such as devices 2506 and 2507 illustrated in FIG. 25. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, the input devices 2507 may include a microphone for capturing audio signals, and the output devices 2506 may include a display screen for visually rendering, and/or a speaker for audibly rendering, recognized text.

As shown in FIG. 25, the computer 2500 may also comprise one or more network interfaces (e.g., the network interface 2508) to enable communication via various networks (e.g., the network 2510). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects some embodiments, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A method of manufacturing a light field print using a printing press, the method comprising:

identifying at least one characteristic of the printing press at least in part by printing at least one calibration pattern using the printing press;

generating, based at least in part on content to be rendered using the light field print and the at least one characteristic of the printing press, a front target pattern and a back target pattern; and using the printing press to:

print the front target pattern on a first side of a substrate; and print the back target pattern on a second side of the substrate.

2. The method of claim 1, wherein identifying the at least one characteristic of the printing press comprises identifying at least one characteristic selected from the group consisting of: achievable registration tolerance in at least one direction along the substrate, a degree of alignment of the printing press, minimum line width in at least one direction along the substrate, spectral attenuation of the substrate without ink thereon, spectral attenuation of an ink on the substrate, spectral attenuation of a combination of inks on the substrate, and dot gain.

3. The method of claim 2, further comprising identifying at least one characteristic selected from the group consisting of: resolution of the printing press, resolution of a platesetter associated with the printing press, thickness of the substrate, index of refraction for the substrate, and flexo distortion factor for the printing press.

4. The method of claim 1, wherein the identifying comprises:

identifying one or more values indicative of a dot gain for at least one color channel of the printing press using a printed version of the at least one calibration pattern.

5. The method of claim 4, wherein the at least one calibration pattern includes a set of oriented line sweeps for each of multiple different color channels of the printing press; and wherein the identifying comprises identifying a dot gain for each of the color channels of the printing press using the printed version of the set of oriented line sweeps that was printed by the printing press.

6. The method of claim 5, wherein the at least one calibration pattern includes a first set of oriented line sweeps for a first color channel of the printing press, wherein the first set of oriented line sweeps includes a first patch of lines with a first spacing and a second patch of lines with a second spacing different from the first spacing, and wherein the at least one calibration pattern includes a second set of oriented line sweeps for a second color channel of the printing press, wherein the second set of oriented line sweeps includes a third patch of lines with the first spacing and a fourth patch of lines with the second spacing.

7. The method of claim 1, wherein the identifying comprises:

identifying a degree of alignment of the printing press using a printed version of the at least one calibration pattern that was printed by the printing press, wherein the at least one calibration pattern includes at least one alignment mark designed to indicate front-back misalignment of the printing press.

8. The method of claim 1, wherein the content comprises a plurality of scene views, and wherein generating the front and back target patterns comprises:

generating initial front and back target patterns using the plurality of scene views; and obtaining the front and back target patterns at least in part by modifying the initial front and back target patterns using the identified at least one characteristic to compensate for effects of dot gain.

9. The method of claim 1, wherein the first side of the substrate and the second side of the substrate are a same side of the substrate, and wherein using the printing press to print the front and back target patterns further comprises printing a clear varnish layer between the front and back target patterns.

10. The method of claim 1, wherein generating the front target pattern and the back target pattern comprises generating the front target pattern using the content and the back target pattern using the at least one characteristic of the printing press.

11. The method of claim 1, wherein generating the front target pattern comprises using the content and the at least one characteristic of the printing press, and wherein generating the back target pattern comprises using the content and the at least one characteristic of the printing press.

12. The method of claim 1, wherein the content comprises a view of a synthetic scene.

13. A method of manufacturing a light field print using a printing press, the method comprising:

identifying at least one characteristic of the printing press using information obtained by printing at least one calibration pattern using the printing press or another printing press of a same type as the printing press;

generating, based at least in part on the content to be rendered using the light field print and the at least one characteristic of the printing press, a front target pattern and a back target pattern; and using the printing press to:

print the front target pattern on a side of a first substrate; and print the back target pattern on a side of a second substrate.

14. The method of claim 13, wherein the content comprises a view of a synthetic scene.

15. The method of claim 13, wherein the first substrate and the second substrate are a same substrate, wherein using the printing press to print the front and back target patterns comprises printing the front and back target patterns on different sides of the same substrate.

16. A method of manufacturing a light field print using a printing press, the method comprising:

obtaining information specifying at least one characteristic of the printing press, the information obtained by printing at least one calibration pattern using the printing press or another printing press of a same type as the printing press;

generating, based at least in part on the content to be rendered using the light field print and the at least one characteristic of the printing press, a front target pattern and a back target pattern; and causing the printing press to:

print the front target pattern on a side of a first substrate; and print the back target pattern on a side of a second substrate.

17. The method of claim 16, wherein the causing comprises sending the front target pattern and the back target pattern to the printing press.

18. The method of claim 16, wherein causing the printing press to print the front and back target patterns further comprises causing the printing press to print a rear layer that includes a flood fill ink.

19. The method of claim 16, wherein the first substrate and the second substrate are a same substrate.

20. The method of claim 16, wherein causing the printing press to print the front and back target patterns further comprises causing the printing press to print a clear varnish layer between the front and the back target patterns.

* * * * *